US012466087B2

(12) United States Patent
Golan et al.

(10) Patent No.: US 12,466,087 B2
(45) Date of Patent: Nov. 11, 2025

(54) ADHESIVE BASED GRIPPING OF OBJECTS

(71) Applicant: PICKOMMERCE AI ROBOTICS LTD, Meitar (IL)

(72) Inventors: Yoav Golan, Tel Aviv (IL); Amir Shapiro, Meitar (IL); Elon Rimon, Haifa (IL); Noam Moshe Hasson, Matan (IL)

(73) Assignee: PICKOMMERCE AI ROBOTICS LTD, Meitar (IL)

( * ) Notice: Subject to any disclaimer, the term of this patent is extended or adjusted under 35 U.S.C. 154(b) by 1023 days.

(21) Appl. No.: 17/595,824

(22) PCT Filed: May 24, 2020

(86) PCT No.: PCT/IL2020/050569
§ 371 (c)(1),
(2) Date: Nov. 24, 2021

(87) PCT Pub. No.: WO2020/240542
PCT Pub. Date: Dec. 3, 2020

(65) Prior Publication Data
US 2022/0339794 A1 Oct. 27, 2022

Related U.S. Application Data

(60) Provisional application No. 62/853,011, filed on May 26, 2019.

(51) Int. Cl.
*B25J 15/00* (2006.01)
*B25J 15/04* (2006.01)
*B25J 15/12* (2006.01)

(52) U.S. Cl.
CPC ......... *B25J 15/008* (2013.01); *B25J 15/0066* (2013.01); *B25J 15/0441* (2013.01); *B25J 15/12* (2013.01)

(58) Field of Classification Search
CPC .. B25J 15/008; B25J 15/0066; B25J 15/0441; B25J 15/12; B65G 47/912
See application file for complete search history.

(56) References Cited

U.S. PATENT DOCUMENTS 3,954,542 A 5/1976 Solomon et al.
4,279,687 A 7/1981 Buchholz et al.
(Continued)

FOREIGN PATENT DOCUMENTS

CN 2459276 11/2001
CN 202439329 9/2012
(Continued)

OTHER PUBLICATIONS

Apr. 14, 2023 Office Action issued in Chinese Patent Application No. 202080050153.0, pp. 1-23 [with partial translation].
(Continued)

*Primary Examiner* — Stephen A Vu
(74) *Attorney, Agent, or Firm* — Nixon & Vanderhye PC

(57) ABSTRACT

The present invention relates to a robotic maneuvering system for maneuvering objects by means of an adhesive attachment. The robotic maneuvering system comprises a gripper finger connected to a gripper arm. The gripper finger is configured to grasp an object to be manipulated, by means of an adhesive contact. The gripper arm maneuvers the object to a desired location and the gripper finger releases the object at the desired location. The present invention also relates to a corresponding method.

9 Claims, 29 Drawing Sheets

(56) References Cited

U.S. PATENT DOCUMENTS

| | | | |
|---|---|---|---|
| 6,514,373 B1 | 2/2003 | Hill et al. | |
| 9,704,126 B1 | 7/2017 | Wellman | |
| 10,464,218 B2 | 11/2019 | Golan et al. | |
| 10,906,186 B2* | 2/2021 | Takahashi | B25J 15/0616 |
| 11,999,069 B2* | 6/2024 | Kouno | B25J 9/1653 |
| 2002/0005259 A1 | 1/2002 | Malthouse et al. | |
| 2004/0200566 A1 | 10/2004 | Bellafore et al. | |
| 2005/0151385 A1* | 7/2005 | Autumn | B08B 17/06 |
| | | | 294/86.4 |
| 2015/0015008 A1 | 1/2015 | Mondano et al. | |
| 2015/0086791 A1 | 3/2015 | Browne et al. | |
| 2016/0052144 A1 | 2/2016 | Spicer et al. | |
| 2016/0137435 A1* | 5/2016 | Tanaka | B65G 65/00 |
| | | | 414/800 |
| 2019/0061169 A1 | 2/2019 | Jiang et al. | |
| 2019/0134826 A1 | 5/2019 | Hwang et al. | |

FOREIGN PATENT DOCUMENTS

| | | |
|---|---|---|
| CN | 202912025 | 5/2013 |
| CN | 203460184 | 3/2014 |
| CN | 104070528 | 10/2014 |
| CN | 204181081 | 3/2015 |
| CN | 106926264 | 7/2017 |
| CN | 106927251 | 7/2017 |
| CN | 207618141 | 7/2018 |
| CN | 108748244 | 11/2018 |
| CN | 108781044 | 11/2019 |
| DE | 102012001095 | 7/2013 |
| EP | 1 447 333 | 8/2004 |
| KR | 10-2019-0048994 | 5/2019 |
| KR | 10-2019-0052589 | 5/2019 |

OTHER PUBLICATIONS

Jun. 7, 2023 Search Report issued in European Patent Application No. 20814835.3, pp. 1-9.

Jan. 31, 2024 Office Action issued in Chinese Patent Application No. 202080050153.0, pp. 1-8.

International Search Report issued in PCT/IL2020/050569 dated Jul. 30, 2020 (6 pages).

Written Opinion of the International Searching Authority issued in PCT/IL2020/050569 dated Jul. 30, 2020 (5 pages).

Lin et al., "Robotic Label Applicator: Design, Development and Visual Servoing Based Control" *MATEC Web of Conferences*, vol. 56: pp. 1-6, EDP Sciences (2016).

Mar. 24, 2025 Search Report issued in IL Patent Application No. 288141, pp. 1-2.

* cited by examiner

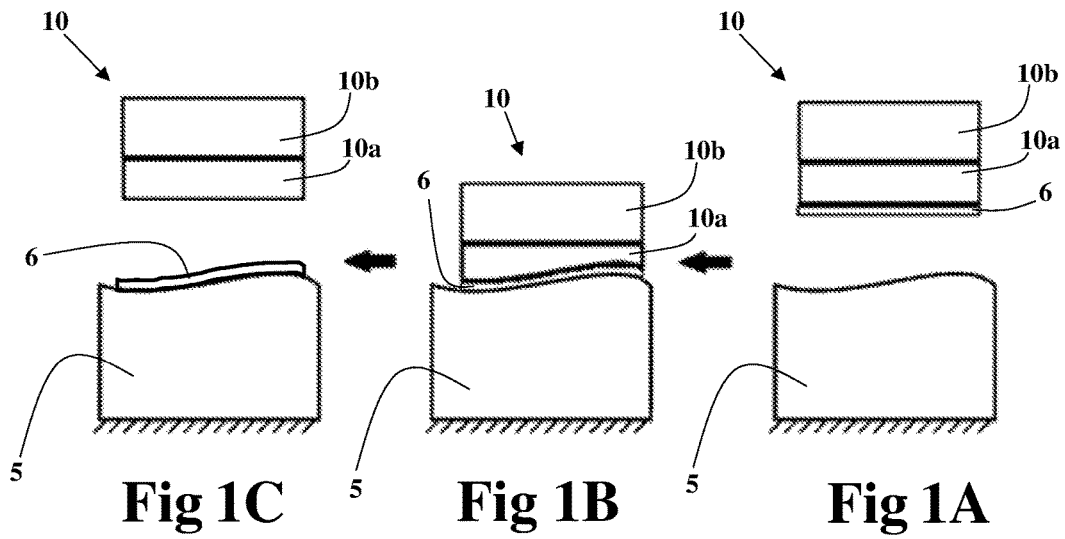
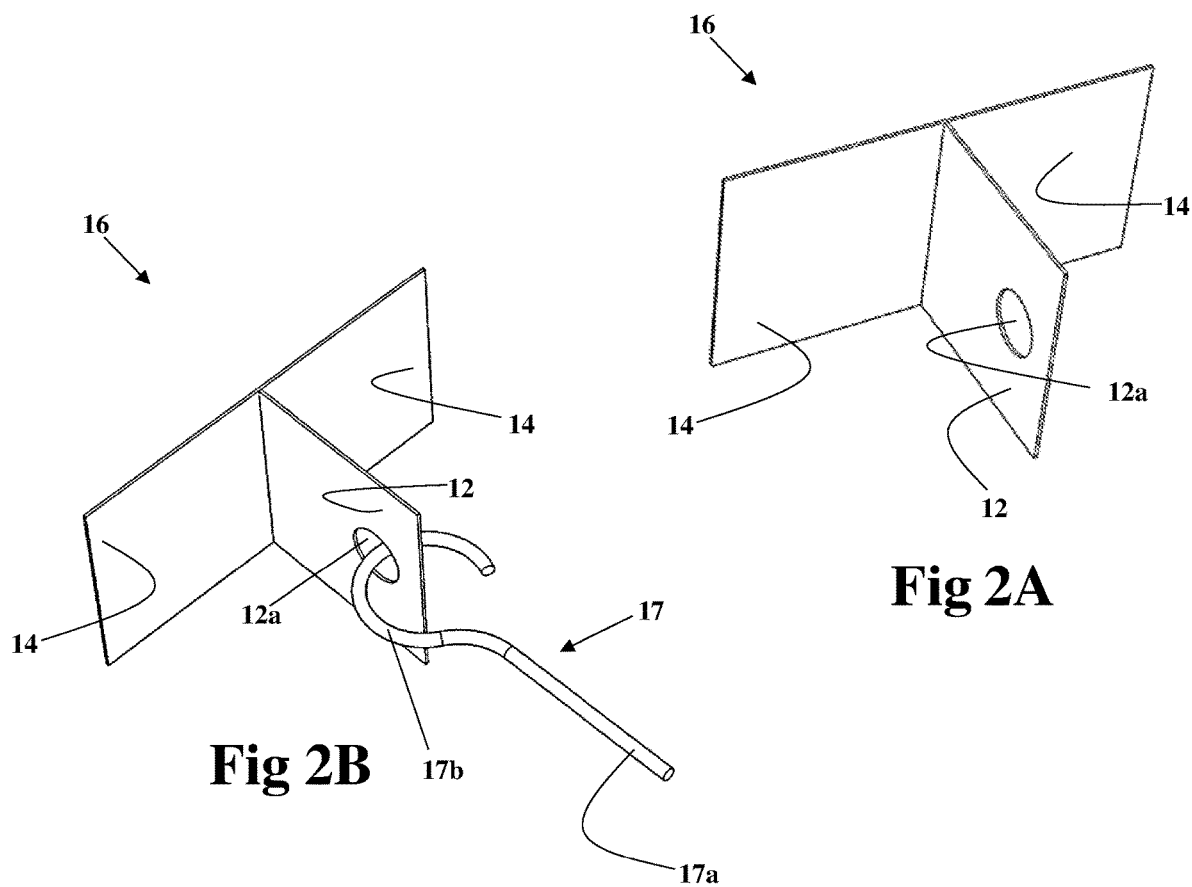

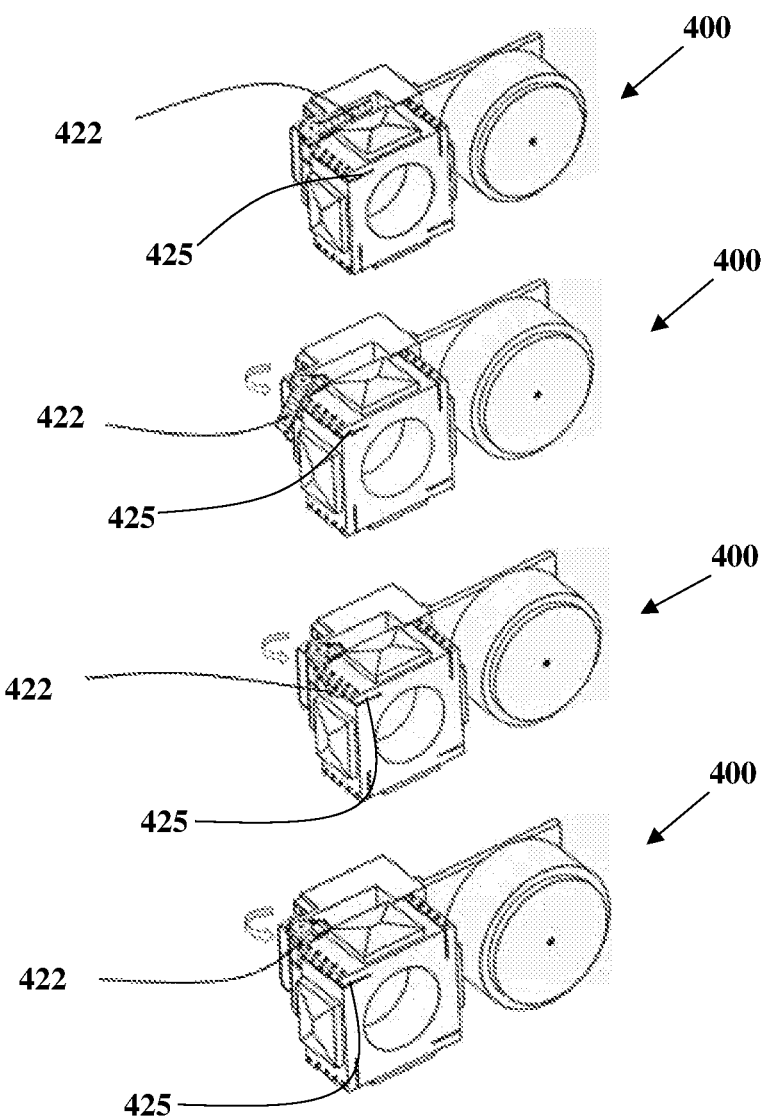

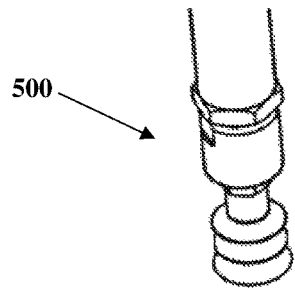
Fig 9A
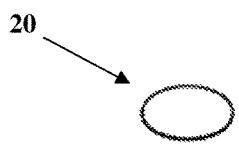
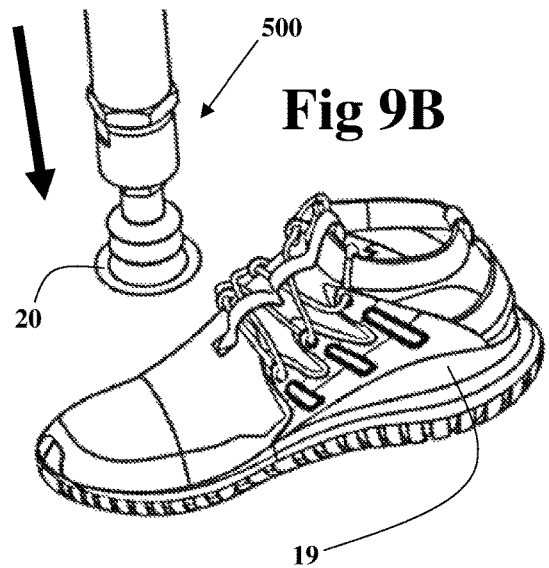
Fig 9B
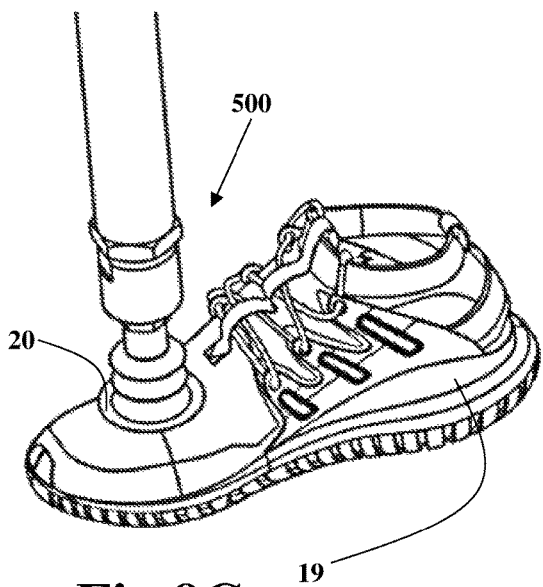
Fig 9C
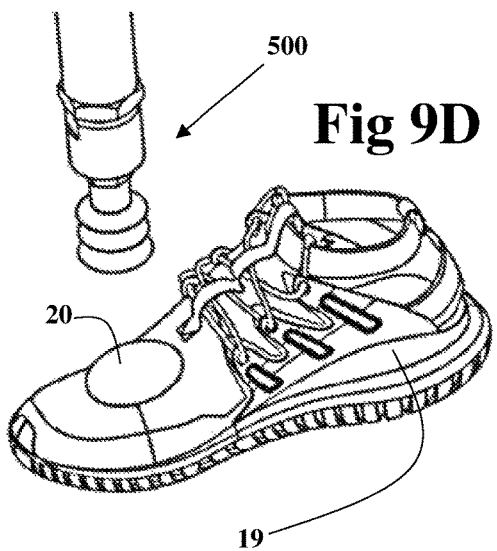
Fig 9D

ADHESIVE BASED GRIPPING OF OBJECTS

This application is the U.S. national phase of International Application No. PCT/IL2020/050569 filed May 24, 2020 which designated the U.S. and claims priority to U.S. Provisional Application No. 62/853,011 filed May 26, 2019, the entire contents of each of which are hereby incorporated by reference.

FIELD OF THE INVENTION

The present invention relates to the field of mechanical grippers. More particularly, the present invention relates to an adhesive based gripping of objects utilizing adhesive contacts to grasp and manipulate objects with a single or multiple adhesion points.

BACKGROUND OF THE INVENTION

Conventional mechanical grippers use several "fingers" that can be either rigid or non-rigid and retract upon an object to form a grasp. These "fingers" use contact forces to apply a wrench (force and torque) to the object, allowing it to be grasped and manipulated. This type of grasping applies a force that is "inward" (pushing) in relation to the object, and therefore at least two contacts are usually required for grasping as well as reliance on contact friction.

Rigid finger grippers can apply arbitrarily large forces on the grasped object, making them well-suited for grasping and manipulation. This grasping may be carried out for heavy and/or rigid objects. The placement of the fingers is important for the grasping function, and therefore not all objects can be grasped by any one mechanical gripper using its rigid fingers.

U.S. Pat. No. 10,464,218 relates to a gripper system comprising fingers. The gripper fingers are connectable to a gripper arm. The gripper fingers comprise a roller configured to spin around its central axis or a ball element rotatable in any direction; a stopper configured to stop and/or prevent the spinning of the roller or ball. This patent also relates to a corresponding method for grasping and displacing an object.

A major drawback of using rigid finger grippers is that they have difficulty grasping non-rigid (soft, deformable or delicate) objects, as the contact locations are in constant flux. Moreover, the planning of finger placement can be challenging for complex objects, even rigid ones, to the point where grasping in this manner becomes implausible. Delicate objects cannot be grasped with large forces, thus limiting the grasping force magnitudes. Therefore, rigid finger grippers are less suitable for these applications as well.

Another common type of gripping mechanism is a vacuum gripper, which uses a vacuum suction cup (usually made of a soft material) and a vacuum pump to adhere to an object using a vacuum force. This force is directly proportional to the vacuum cup surface area and the pressure difference between the vacuum cup interior and the ambient pressure. The force applied to the object by the vacuum gripper is "outward" (pulling), and therefore a single vacuum gripper is often used to lift and displace objects.

Vacuum grippers are popular in "pick and place" assignments, however, they have disadvantages as well. The vacuum gripper requires a smooth, relatively flat contact area for ideal vacuum conditions. This means that grasping porous objects or objects with textured surfaces (e.g. a fabric surface) can be inefficient. Some soft materials (such as plastics) can be deformed during suction, which may result in a good vacuum seal, but may also harm the grasped item. Moreover, if a vacuum cup is not properly placed on the object the vacuum quality decreases significantly. This means that even if most of the contact area is a smooth, suitable contact surface, a small portion of the suction cup exposed to atmospheric conditions renders the vacuum gripper practically useless. The grasping force is limited to the suction ability of the system, which is carried out by the atmospheric pressure differences applicable in the system. This means that the maximal force that can be applied by a vacuum gripper is dependent on the vacuum gripper contact surface area, and the difference in pressure applicable in the system. As a result, vacuum grippers are not suitable for lifting or pulling heavy objects, especially when there is a small area of suitable contact surface. For this reason, vacuum grippers cannot be effectively used in, for example, aerospace conditions, where the ambient pressure is zero. Zero-gravity space applications may be for example, space debris retrieval applications.

It is therefore an object of the present invention to provide a method and means for an efficient grasping and manipulation based on an adhesive attachment.

It is a further object of the present invention to provide a method and means for a robust grasping of a variety of objects using a combination of adhesion and rigid finger manipulation.

Other objects and advantages of the present invention will become apparent as the description proceeds.

SUMMARY OF THE INVENTION

The present invention relates to a robotic maneuvering system for maneuvering objects by means of an adhesive attachment. The robotic maneuvering system comprises a gripper finger connected to a gripper arm. The gripper finger is configured to grasp an object to be manipulated, by means of an adhesive contact. The gripper arm maneuvers the object to a desired location and the gripper finger releases the object at the desired location. The present invention also relates to a corresponding method.

The present invention relates to maneuvering/displacing objects by means of an adhesive attachment. The present invention relates to a gripper system having a gripper arm connectable to a robotic maneuvering system configured to maneuver said gripper arm. The gripper arm distal portion is connected to a gripper finger (various embodiments explained herein) capable of grasping an object to be manipulated, by means of an adhesive contact with said object. The arms are configured to manipulate by means of the gripper fingers grasping the object (by the adhesive grasp).

The gripper finger may secure a sticker element thereto and apply it on the object, and thereafter may manipulate the sticker with the object attached to it to a required location. After being placed at the required location, the sticker element is released from the gripper finger. Alternatively, the gripper finger may apply adhesive material to the object, engage the adhesive material, cure the adhesive material (e.g. wait for a specific cure time, apply curing force, emit curing UV light) thereby attaching the object to the manipulating member (that has engaged the adhesive material), and manipulate the adhered object to a required location. Thereafter, the object is released.

According to a preferred embodiment, the gripper finger comprises a securing/attaching/fixing unit which comprises means for securing the sticker element to the gripper finger. The securing/attaching/fixing unit comprises one or more securing element(s) (e.g. hooks) and elements that are configured to displace the securing element (or contribute to the displacement of the securing elements) e.g. rotating elements, side arms with hooks, solenoid units, motors. The displacing of the securing element may be for securing the sticker element to the gripper finger or releasing the sticker element from the gripper finger.

The present invention relates to a gripper finger system comprising any one of the gripper fingers as described herein and their corresponding fitting stickers as described herein.

The present invention further relates to a robotic maneuvering system comprising a gripper arm configured to maneuver an object, wherein said gripper arm comprises any one of the gripper fingers as described herein and optionally, their corresponding fitting stickers as described herein.

The present invention relates to a gripper finger comprising:
- a main body portion connectable to a gripper arm;
- a securing unit connected to said main body portion, wherein said securing unit comprises one or more securing element(s);
- wherein said securing unit is configured to displace said one or more securing element(s) into a first position such that said one or more securing element(s) is configured to secure a sticker element to said gripper finger; and
- wherein said securing unit is configured to displace said one or more securing element(s) into a second position such that said sticker element may be released from said gripper finger.

The main body portion may be a base element connectable to a gripper arm.

Preferably, the main body portion comprises a proximal rigid base portion and a distal flexible portion.

Preferably, the securing element is a rotatable hook having a circular portion with a gap;
- wherein the main body portion comprises a slit configured to receive a tab of the sticker element, said tab comprising an aperture;
- wherein the rotatable hook is configured to be inserted within said aperture in the first position.

Preferably, the securing unit comprises a rotating element; wherein the rotatable hook is fixed to said rotating element and rotatable therewith.

Preferably, the main body portion comprises an internal channel;
- wherein the rotatable hook is inserted within said internal channel and rotatable therewithin.

The present invention relates to a gripper finger system comprising:
a. a gripper finger as explained herein;
b. one or more sticker elements, each comprising:
  an object engaging portion that comprises a distal adhesive side;
  a tab extending proximally from the proximal side of said object engaging portion, said tab comprising an aperture;
  wherein the securing unit is configured to displace the rotatable hook into a first position such that the rotatable hook is inserted within said aperture thereby securing the sticker element to said gripper finger; and wherein said securing unit is configured to displace said rotatable hook into a second position such that said hook is removed from within said aperture, thereby releasing said sticker element from said gripper finger.

Preferably, the securing unit comprises two side tiltable arms, each comprising a hook facing inwards at their distal ends; wherein the securing elements are said hooks.

Preferably, the two side tiltable arms are each connected to the main body portion by means of a revolute joint.

Preferably, each side arm comprises a proximal portion proximal to the revolute joint and a distal portion distal to the revolute joint;
wherein the securing unit comprises two linear mechanical actuator units having an extended position and a contracted position, each connected to a corresponding side arm proximal portion and configured to move it sideways.

Preferably, the linear mechanical actuator units are electric solenoids.

Preferably, the gripper finger further comprises: a proximal head portion;
  a connecting rod extending distally from said proximal head portion having a spring engaging portion at its distal side;
  wherein the main body portion comprises a cylinder portion with a closed distal end and an open proximal end such that said connecting rod is inserted into said cylinder portion via said open proximal end; and
  a spring placed between the connecting rod spring engaging portion and the closed distal end.

Preferably, each side arm comprises a proximal portion proximal to the revolute joint and a distal portion distal to the revolute joint;
  wherein the securing unit comprises a rotating element and a motor configured to rotate said rotating element; and
  wherein each proximal portion is connected to said rotating element by means of a strap. This embodiment may be similar in size and materials, as the embodiment with the electric solenoids, mutatis mutandis.

Preferably, the rotating element is configured to be rotatably displaced between two positions:
  a) a first position wherein the straps do not pull the proximal portions towards each other;
  b) a second position wherein the straps pull the proximal portions towards each other, thereby distancing the hooks apart from one another in relation to said first position.

Preferably, the gripper finger further comprises one or more springs connected to the distal portions such that said one or more springs pull the distal portions towards each other when the rotating element is in the first position.

The present invention relates to a gripper finger system comprising:
a. a gripper finger as explained herein;
b. one or more sticker elements, each comprising:
  two side object engaging portions, each comprising a distal adhesive side;
  a connecting bridge portion that projects proximally;
  wherein each side of the bridge portion is attached to a corresponding inner side of the object engaging portions;
  wherein the bridge portion comprises two side notches bulged inwards;
  wherein the securing unit is configured to displace the hooks into a first position such that the hooks are inserted within said notches, thereby securing the sticker element to said gripper finger; and
  wherein said securing unit is configured to displace said hooks into a second position such that said hooks are removed from within said notches, thereby releasing said sticker element from said gripper finger.

Preferably, the bridge portion is in the shape of a distal end portion of the main body portion.

The present invention relates to a gripper finger comprising:
- an elongated main body portion connectable to a gripper arm;
- a sticker reel mounted on a proximal portion of the main body portion;
- a sticker tape dispenser having two side face surfaces and a plurality of external rectangular surfaces, said sticker tape dispenser being mounted on a distal portion of the main body portion such that said external rectangular surfaces are rotatable around an axis;
- a distal rotatable blade connected to a distal portion of said main body portion configured to cut a tape portion extending distally from said sticker reel;
- wherein each of said external rectangular surfaces comprises a plurality of protruding hook elements.

Preferably, each of the external rectangular surfaces comprises a slit.

Preferably, each of the external rectangular surfaces are similar;
- wherein at a certain sticker tape dispenser rotating position, a first external rectangular surface of said external rectangular surfaces comprises:
  - a plurality of the protruding hook elements placed near the distal edge of said first external rectangular surface and a plurality of protruding hook elements placed near the proximal edge of said first external rectangular surface;
  - wherein the slit is placed distally and adjacent to said plurality of protruding hook elements placed near the proximal edge of said first external rectangular surface.

Preferably, at the certain sticker tape dispenser rotating position, the blade is configured to be rotated and inserted within a corresponding slit of a second rectangular surface of said external rectangular surfaces; wherein said second rectangular surface is distally adjacent to said first rectangular surface.

Preferably, the sticker tape is wound around the sticker reel.

Preferably, the protruding hook elements taper in a direction away from the surface they protrude from, such that their end portions are sharp.

Preferably, the side faces of the sticker tape dispenser have the shape of a polygon with equal length sides.

Preferably, the side faces have the shape of a square.

Preferably, the slits extend inwards in a direction perpendicular to the surface that they extend from.

Preferably, the gripper finger comprises a first motor configured rotate the sticker tape dispenser.

Preferably, the gripper finger comprises a second motor configured to rotate the blade.

Preferably, the external rectangular surfaces each comprises a central bulging element.

Preferably, the plurality of the protruding hook elements placed near the distal edge are aligned and wherein the plurality of the protruding hook elements placed near the proximal edge are aligned.

The present invention relates to a gripper finger comprising:
- a main body portion connectable to a gripper arm, comprising an adhesive engaging member extending distally therefrom;
- an adhesive material applicator, connected to said main body portion, comprising an injecting nozzle coupled to an adhesive material reservoir;
- a pump configured to deliver the adhesive material from the reservoir to and out of the injecting nozzle.

Preferably, the adhesive material applicator is connected to the main body portion by means of an arm;
- wherein said arm is connected to said main body portion by means of a revolute joint.

Preferably, the adhesive material applicator is connected to the main body portion by means of an arm;
- wherein said arm is connected to said adhesive material applicator by means of a revolute joint.

Preferably, the reservoir comprises a mixer for mixing the adhesive material and/or a heater for heating the adhesive material.

The present invention relates to a robotic maneuvering system comprising a gripper arm configured to maneuver an object, wherein said gripper arm comprises a gripper finger as described herein, connected to the distal end of said gripper arm.

Preferably, the gripper arm comprises:
- two or more adjacent segments;
- one or more revolute joints;
- wherein each two adjacent segments are connected by a corresponding revolute joint of said one or more revolute joints;
- at least one motor configured to radially displace said one or more revolute joints; and
- a control unit.

The present invention relates to a method for grasping and displacing an object comprising:
- securing a sticker element to a gripper finger;
- maneuvering said gripper finger such that said sticker element engages the object to be displaced thereby adhering said sticker element to said object;
- maneuvering said sticker element and thereby said object to a required location;
- releasing said sticker element and thereby said object from said gripper finger.

Preferably, securing the sticker element to the gripper finger comprises inserting a hook into an aperture of a tab that extends proximally from an object engaging portion of said sticker element; and
releasing said sticker element comprises removing the hook from said aperture.

Preferably, the hook is a rotatable hook having a circular portion with a gap;
- wherein securing and releasing the sticker element comprises rotating said rotatable hook.

Preferably, securing the sticker element to the gripper finger comprises moving two hooks towards each other and inserting them into corresponding side notches of a proximally projecting connecting bridge portion, of the sticker element, that connects two sticker object engaging portions that have distal adhesive sides; and
- wherein releasing said sticker element comprises moving said two hooks away from each other.

Preferably, securing the sticker element to the gripper finger comprises:
A) stretching a sticker tape from a sticker reel and thrusting a plurality of protruding hook elements into a given portion of the stretched tape;
B) moving said given portion to a distal position on the gripper finger; and
wherein releasing said sticker element comprises cutting said given portion from said sticker tape.

Preferably, securing the sticker element to the gripper finger comprises:
engaging the gripper finger to the proximal side of an object engaging portion of the sticker element;
applying negative pressure from said gripper finger to said proximal side of said object engaging portion; and
wherein releasing said sticker element comprises terminating said negative pressure.

Preferably, securing the sticker element to the gripper finger comprises:
engaging the gripper finger to the proximal side of an object engaging portion of the sticker element wherein said proximal side comprises a portion configured to be magnetized;
applying a magnetic force from said gripper finger to said proximal side of said object engaging portion; and
wherein releasing said sticker element comprises terminating said magnetic force.

The present invention relates to a method for grasping and displacing one or more objects comprising:
securing a link, connecting two or more sticker elements, to a gripper finger;
maneuvering said link such that said two or more sticker elements engage the one or more objects to be displaced thereby adhering said two or more sticker elements to said one or more objects;
maneuvering said link and thereby said one or more objects to a required location;
releasing said link and thereby said two or more sticker elements and said one or more objects, from said gripper finger.

The present invention relates to a method for grasping and displacing an object comprising:
injecting adhesive material on an object;
engaging a finger gripper adhesive engaging member to the injected adhesive material;
securing the adhesive engaging member to the object by curing the adhesive material;
maneuvering said object to a required location;
releasing said object from said gripper finger by either:
a) removing the adhesive from the gripper finger;
b) cutting the adhesive off the gripper finger;
c) applying a positive air pressure from the finger gripper adhesive engaging member to the adhesive material.

The present invention relates to a method for applying a sticker element to an object comprising:
securing a sticker element to a gripper finger;
maneuvering said gripper finger such that said sticker element engages the object thereby adhering said sticker element to said object;
releasing said sticker element from said gripper finger.

Preferably, adhering the sticker element to the object is carried out by applying force from the gripper finger towards the object via the sticker element.

Preferably, the finger gripper comprises a distal flexible portion;
wherein securing the sticker element to the gripper finger comprises attaching said sticker element to the distal flexible portion; and
wherein when applying force from the gripper finger towards the object, the distal flexible portion conforms to the shape of the object.

The sticker elements as explained herein form another aspect of the present invention.

BRIEF DESCRIPTION OF THE DRAWINGS

The present invention is illustrated by way of example in the accompanying drawings, in which similar references consistently indicate similar elements and in which:

FIGS. 1A-1C illustrate an applicator embodiment of the present invention.

FIGS. 2A-2D illustrate an embodiment of the present invention.

FIGS. 8A-8D illustrate the gripper finger of FIG. 7, according to an embodiment of the present invention.

FIGS. 9A-9D illustrate a gripper finger according to an embodiment of the present invention.

DETAILED DESCRIPTION OF THE INVENTION

Figure 2C:
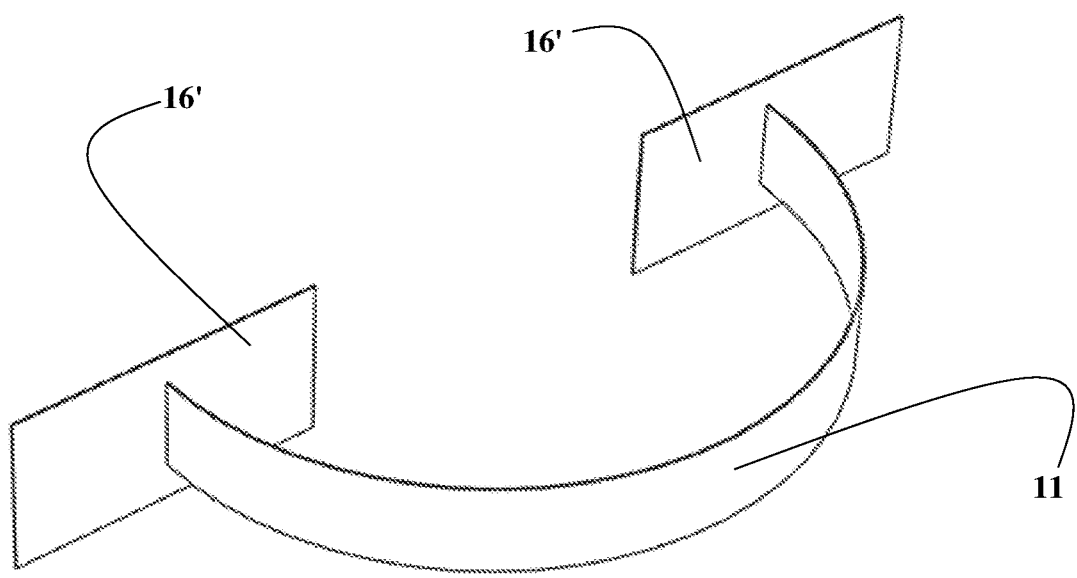

The present invention relates to a gripping system and method with adhesive contacts in conjunction with finger grippers manipulation. Adhesive contacts are advantageous as they can provide an efficient manipulation of objects that are difficult to manipulate according to prior art manipulation techniques.

According to an embodiment of the present invention, the present invention system relates to a single sticker (or multiple stickers) having adhesive on its contact side, where the contact side engages and is adhered to an object that is to be grasped and manipulated. After the application of the sticker, manipulation of the object is carried out by applying forces directly to the sticker by rigid or non-rigid mechanical fingers or other gripping mechanisms. In this way, forces from the manipulator are applied to the object via the sticker, as opposed to direct forces on the object as in the case of rigid mechanical finger grippers, or vacuum grippers.

Using this sticker manipulation approach enables to overcome several drawbacks of the prior art methods used today. Manipulating the sticker provides an effective manipulation of non-rigid (e.g. soft, deformable or delicate) objects without the threat of deforming or breaking them (e.g. by rigid mechanical fingers closing in on the object). Stickers may be applied for an effective manipulation, on complex objects such as objects having textured surfaces or non-flat surfaces (e.g. that are not capable of being manipulated by suction grippers).

The distal direction is defined herein as the direction towards the object, away from the gripper finger, e.g. the adhesive side of the sticker that engages the object is the distal side of the sticker. The proximal direction is defined herein as being opposite to the distal direction, e.g. the direction towards the grasping gripper finger base (e.g. towards the arm that the gripper finger is connected to).

According to one embodiment, a sticker is applied to the object by an applicator, which applies the sticker to the object with the adhesive distal side engaging the object by exerting force on the sticker from its proximal side (and thus on the object through the sticker). The applicator may be multi-layered, with a rigid proximal base and a flexible portion distal to the base and proximal to the sticker. In this manner, the sticker shape may conform to the object it is adhered to.

FIGS. 1A-1C show such an applicator 10 adhering a sticker 6 to an object 5. The applicator 10 comprises a proximal rigid portion 10b at the base of the applicator (the proximal direction being upwards in these three figures). The applicator 10 comprises a flexible portion 10a attached distally to the rigid portion 10b. The applicator 10 holds a sticker 6 at the distal end of the flexible portion 10a (shown in FIG. 1A). The adhesive side of the sticker is the distal side of the sticker facing away from the applicator 10. The applicator 10 is moved towards an object 5 (that is to be grasped by a gripper finger) and contacts the object 5 with the sticker 6 distal adhesive side. Further pressure is applied (including force through the sticker to the object). The sticker 6 and flexible portion 10a of the applicator 10 conform to the shape of the object 5 (shown in FIG. 1B). According to one embodiment, the sticker 6 is released from the applicator 10 and the applicator 10 is moved away from the object (shown in FIG. 1C). The sticker 6 is left stuck to the object 5 and may be used for a gripper finger to grasp it and manipulate it (along with the object 5 stuck thereto). There are great advantages (explained herein) of the gripper finger holding the sticker and manipulating the object via the sticker. In some embodiments the applicator may also be the gripper finger manipulator, where manipulation of the object can be carried out, while the applicator 10 is still connected to the sticker 6, and the sticker 6 is connected to the object 5.

According to an embodiment of the present invention (shown in FIGS. 2A-2B), the sticker 16 comprises an object engaging portion 14 typically in the form of an adhesive sheet. The sticker 16 comprises a tab 12 extending proximally from said object engaging portion 14 where the proximal side of said object engaging portion 14 is typically non-adhesive. The distal side (not shown) of the object engaging portion 14 is adhesive. The tab may be used as a "handle" for manipulating sticker 16 (and the item object that it is stuck to). The tab 12 may comprise an aperture 12a. FIG. 2B shows a dedicated hook 17 connected to tab 12 and extending proximally therefrom. Hook 17 is configured to protrude aperture 12a thus connecting to sticker 16 and being configured to manipulate sticker 16 (and the item object that it is stuck to). Forces applied to the tab 12 are transferred to the object engaging portion 14 which is stuck to the item object. FIGS. 2A-2B show the sticker 16 having a rectangular shaped object engaging portion 14 and a rectangular shaped tab 12. Other embodiments may have tab 12 (or a multitude of tabs) being configured to be grasped by e.g. parallel-jaw grippers by pure frictional force (which in this case would not necessitate aperture 12a).

Thus Hook 17 and sticker 16 form a finger gripper system where the hook arm 17a forms the gripper finger main body portion and the hook curved portion 17b forms the gripper finger securing element.

According to an embodiment of the present invention (shown in FIGS. 2C-2D), a plurality of stickers may be connected to one cluster unit for various manipulation capabilities. Preferably, the plurality of stickers may be connected by a connecting link. According to this embodiment, a single object may be adhered to the linked stickers and manipulated, or a multitude of objects may be adhered (each to a single sticker of the linked stickers) and manipulated together as a unit while being connected by the link, as the link is connected to the manipulating unit. When the links are manipulated, all the connected objects are manipulated as a cluster.

Figure 2D:
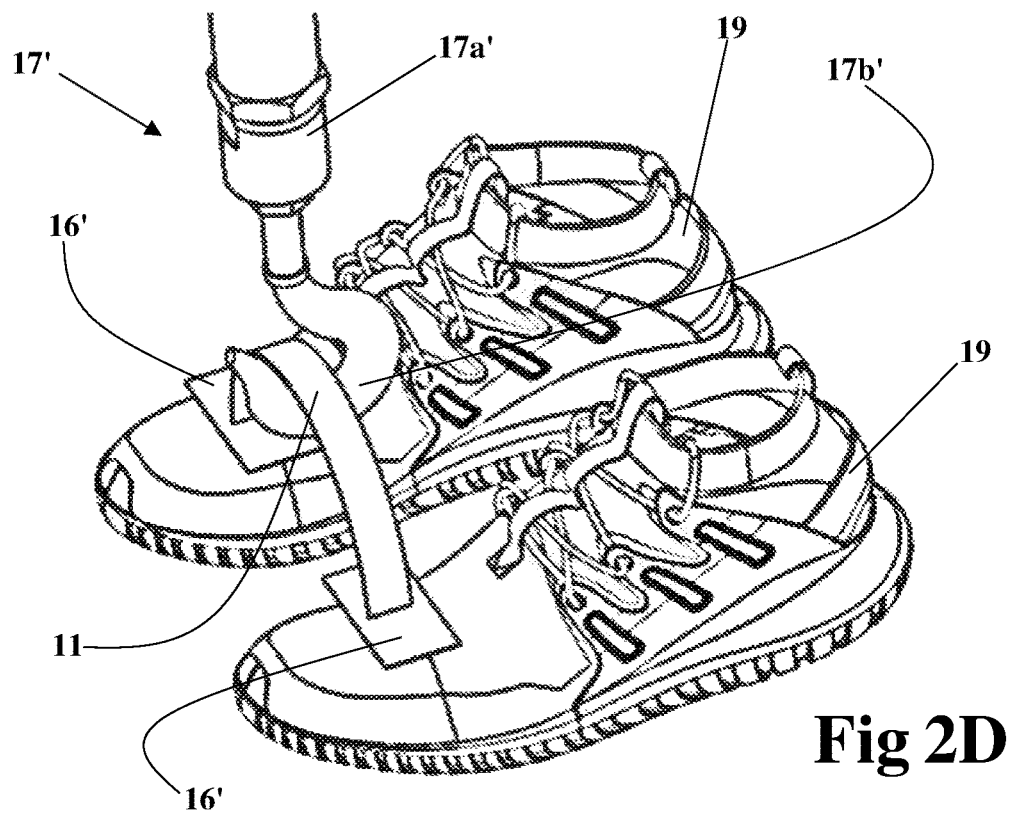

FIGS. 2C-2D show two stickers 16' interconnected by an arc shaped link 11 which is connected to the proximal sides of both stickers 16'. Each sticker 16' is in the form of an adhesive sheet. Each side of the arc link 11 extends proximally from its corresponding sticker 16' where the proximal side of said stickers 16' is typically non-adhesive. The distal side (not shown) of the stickers 16' is adhesive. The link 11 may be flexible (or rigid) but robust.

Accordingly, the stickers 16' may be independently placed on the object at different places. The link 11 may be grasped by a hook, a suction gripper or a mechanical gripper, and thus force may be applied to the stickers 16' through the link 11.

FIG. 2D shows a dedicated hook 17' connected to link 11 and extending proximally therefrom. The distal adhesive sides of stickers 16' each engage and are attached to a corresponding shoe 19. Hook 17' is configured to hook link 11 and thus manipulate both stickers 16' and thus both shoes 19 that they are stuck to.

Thus Hook 17', link 11 and stickers 16' form a finger gripping system where the hook arm 17a' forms the gripper finger main body portion and the hook curved portion 17b' forms the securing element.

Figure 2E:
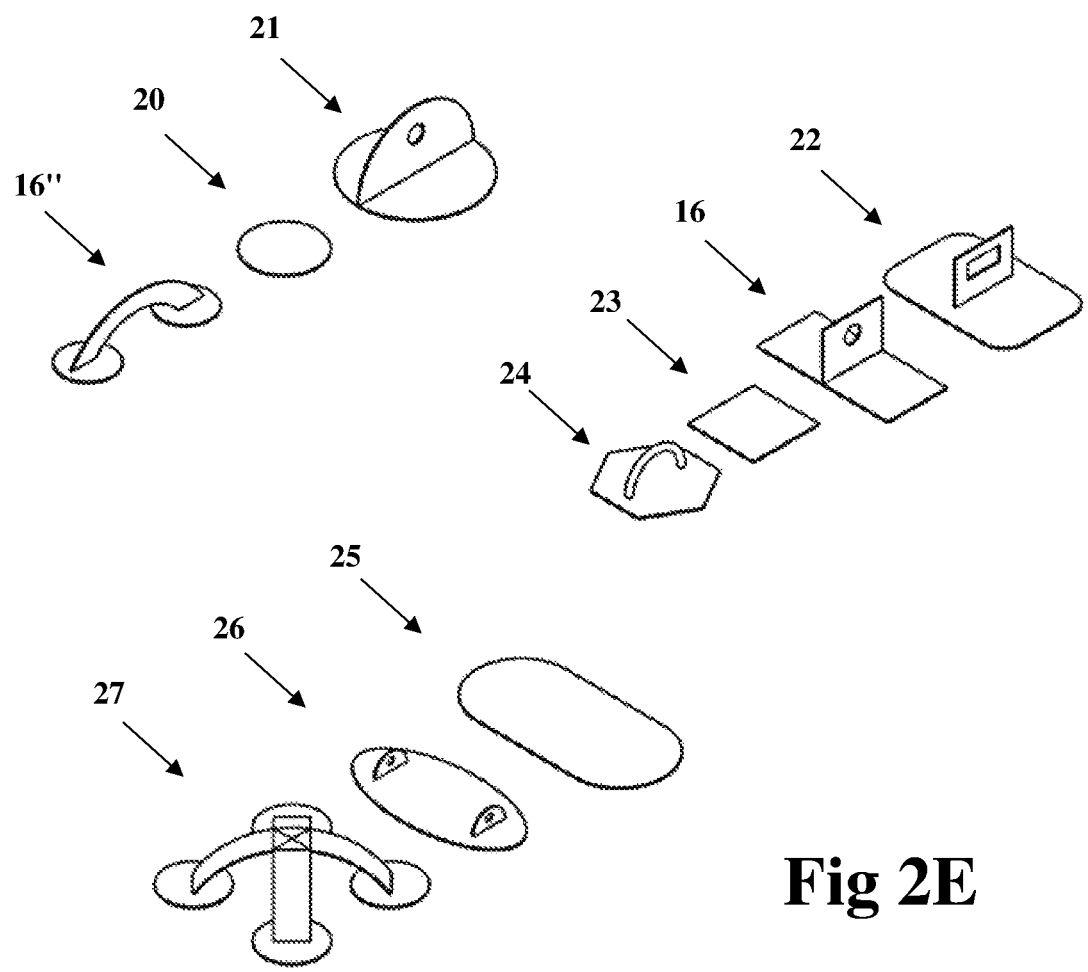
FIG. 2E illustrates various stickers according to various embodiments of the present invention.

FIG. 2E shows a variety of sticker types and shapes that may be used, emphasizing that the sticker geometry can be determined according to the intended use. Sticker types may be varying shapes (e.g. rectangular, circular, oval etc.), varying methods of grasping (e.g. tabs, links, flat surfaces), varying areas of adhesive contact (not necessarily covering the entire sticker surface area), and various sizes or configurations. Examples of sticker units are as follows. Sticker 16 is shown as explained herein. A linked unit 16" is shown similar to the linked unit of stickers 16' having circular stickers. Sticker 20 is a circular sticker. Sticker 21 is similar to sticker 16 only with a circular sticker and round tab. Sticker 22 is similar to sticker 16 only with a rectangular aperture in its tab. Sticker 23 has a square shape. Sticker 24 has a hexagon shape and arc tab. Sticker 25 has an elongated circle shape. Sticker 26 has an oval shape with two proximal tabs. A linked unit 27 is shown having 4 interconnected circular stickers with a link comprising two intersecting arcs such that each arc end is connected to one of the stickers.

According to an embodiment of the present invention, FIGS. 3A-3E show a finger gripping system comprising a gripper finger 100 having a gripper finger main body portion 110 configured to be used as a sticker applicator and optionally also configured to be used as a gripper finger manipulator. Optionally, the main body portion 110 is elongated. Preferably, the main body portion 110 comprises a proximal rigid base portion 110b and a flexible portion 110a attached distally to the rigid portion 110b. The sticker 116 comprises an object engaging portion 114 (typically in the form of an adhesive sheet) and a proximal tab 112 extending proximally from said object engaging portion 114. The proximal tab 112 comprises a tab aperture 112a. The distal side of the object engaging portion 114 is adhesive. The distal adhesive side of the object engaging portion 114 is shown in these figures. The sticker 116 may have the form of sticker 16 explained hereinabove.

Finger 100 comprises a securing unit connected to the main body portion 110. The securing unit comprises a securing element, wherein the securing unit is configured to displace the securing element into a first position such that it secures a sticker element to finger 100 and the securing unit is configured to displace the securing element into a second position such that the sticker element may be released from finger 100.

The finger gripping system securing unit comprises a round rotatable rigid hook 117 (the securing element) having a circular portion 117c (e.g. forming three fourths of a circle) and a straight portion 117s extending inwards towards the center of the partial circle formed, from one of the edges of the circular portion 117c. Thus, a gap 121 is formed (shown in a dotted line in FIG. 3B) from said one of the edges of the circular portion 117c (from which straight portion 117s extends from) and the other edge of the circular portion 117c (gap 121 being e.g. an imaginary quarter circle of the circle of circular portion 117c). The finger gripping system securing unit comprises a rotating element 119. The hook straight portion 117s is fixed to the rotating element 119 such that the center of the partial circle formed (117c) and the rotating axis of the rotating element 119, are congruent at the same point (overlap at the same point). The hook 117 and rotating element 119 are preferably placed at least partially within the main body portion 110.

According to one embodiment, the rotating element 119 has a cylindrical shape and is rotatable around its central (cylinder) axis (the rotating axis of the rotating element 119 is its cylindrical central axis). The hook straight portion 117s is fixed to the rotating element 119 e.g. by the straight portion 117s being inserted within a dedicated channel that is within the rotating element 119. The channel in rotating element 119 is typically placed across an interior portion of the cylinder shape (preferably in the middle of the cylindrical shape), along its diameter (parallel to a corresponding diameter of a base of the cylindrical shape).

The main body portion 110 comprises a slit 118 extending from its distal side through flexible portion 110a and terminates within the rigid base portion 110b. The sticker tab 112 is configured to be inserted within the slit 118 (preferably all the way in the slit 118). The sticker 116 is preferably in contact with the flexible portion 110a of the main body portion 110 prior to and during application. The main body portion 110 comprises an internal channel 120 (shown in FIG. 3C) configured to house the hook 117 such that the hook 117 travels therethrough when the rotating element 119 rotates, i.e. hook 117 is inserted within the internal channel 120 and rotatable therewithin.

Figure 3A:
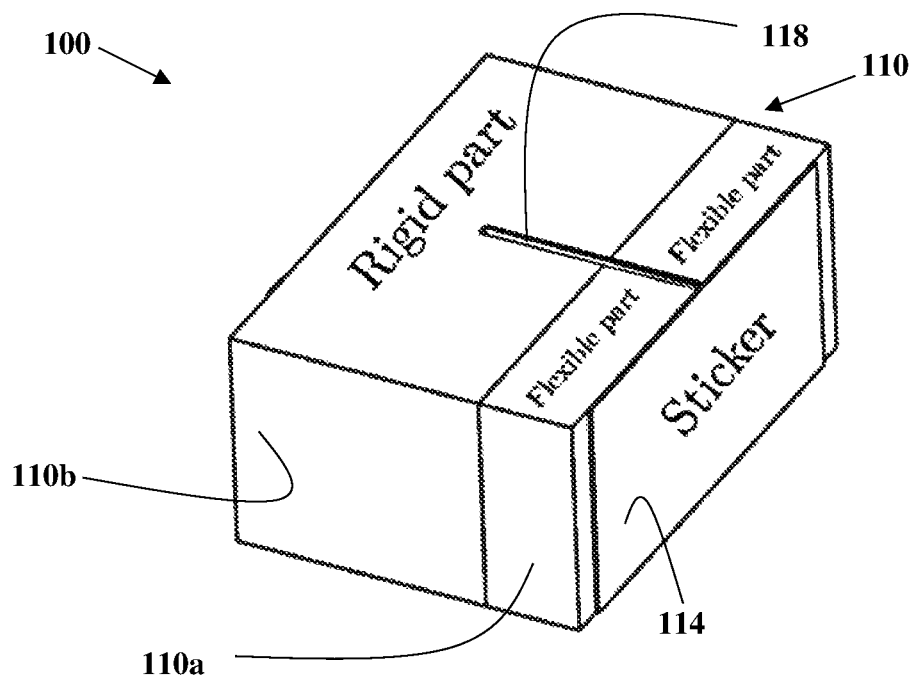
FIGS. 3A-3E illustrate a gripper finger according to an embodiment of the present invention.
Figure 3B:
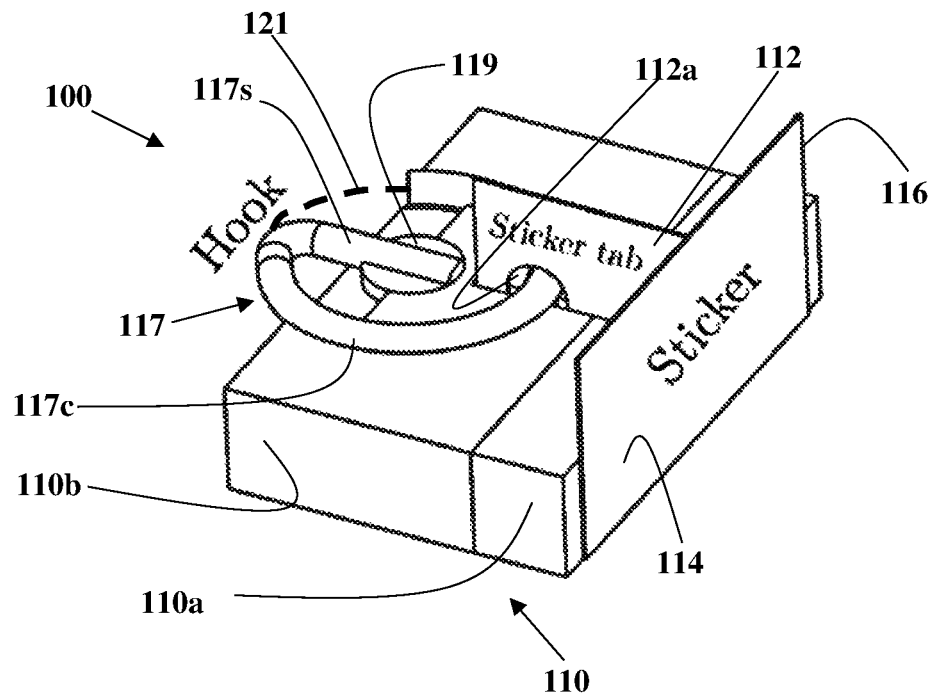
Figure 3C:
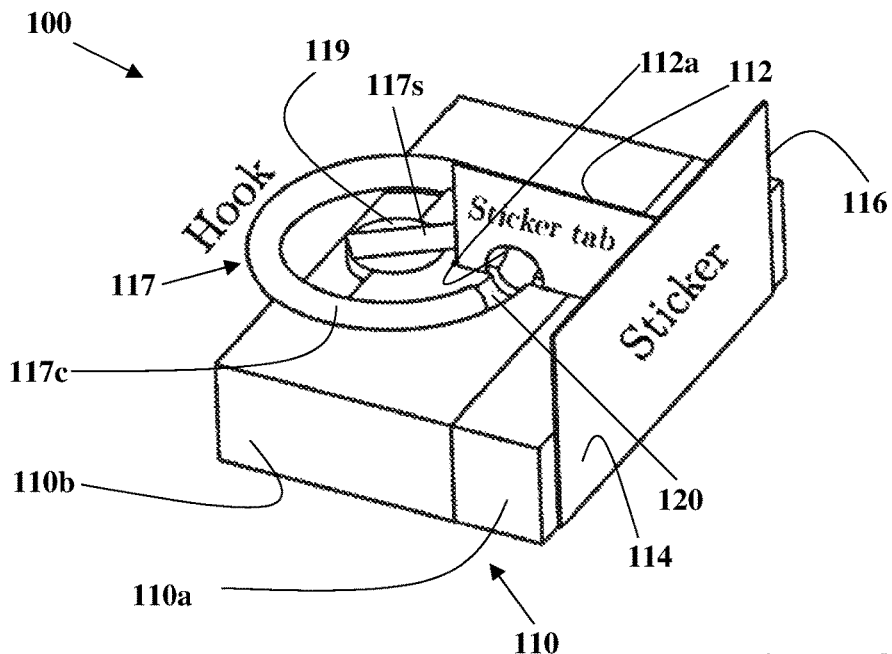
Figure 3D:
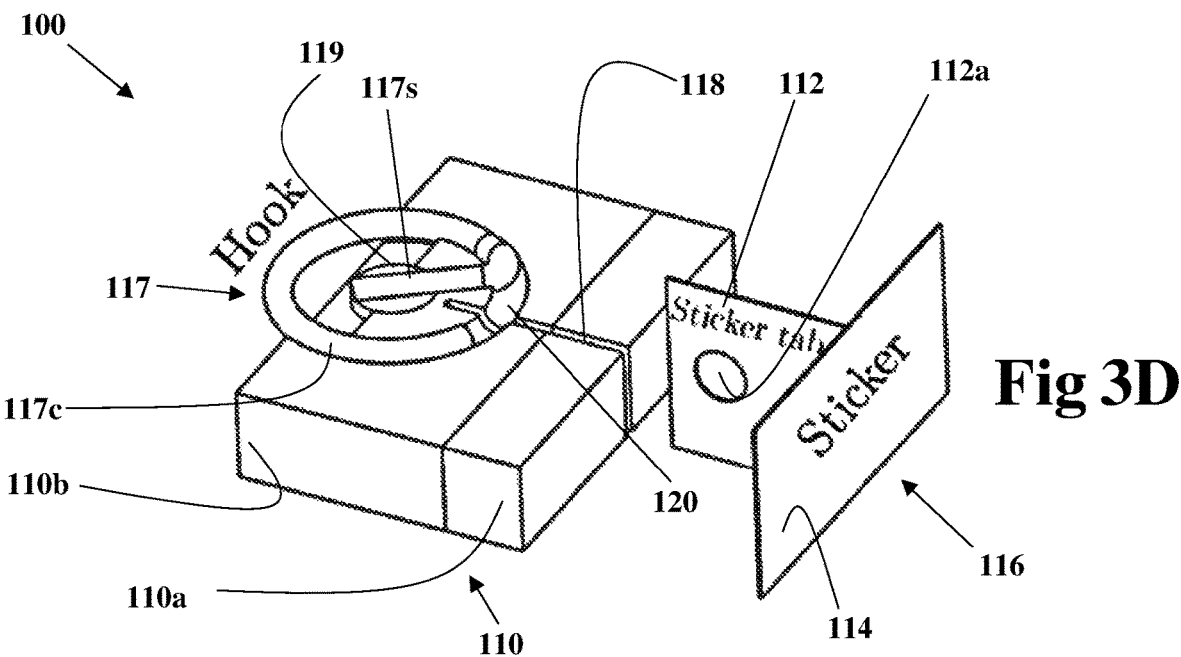
Figure 3E:
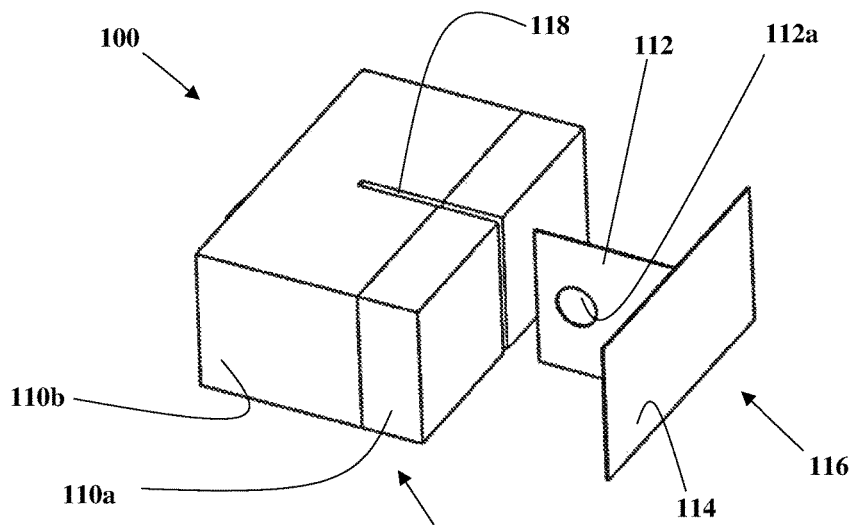

FIGS. 3A and 3E show the entire piece of the main body portion 110. FIGS. 3B-3D show a cross section of the main body portion 110 (showing half of the main body portion 110) but with the entire portions of hook 117 and sticker 116 (not sectioned) for a better understanding (to show that the sticker 116 is secured to the main body portion 110 by the hook 117 through the aperture 112a in the tab 112).

When the tab 112 is fully inserted the tab aperture 112a is in place at the channel 120 location such that hook 117 is configured to pass therethrough. The hook 117 is configured to move between two positions—(1) a securing fixation position where the hook 117 passes through a sticker tab aperture 112a, where in this position the sticker is attached to the main body portion 110 and moves with it accordingly; and (2) a releasing position where the sticker 116 is released from the main body portion 110, when the hook 117 is rotated such that gap 121 is positioned at the tab aperture 112a location, thus the main body portion 110 is configured to release sticker 116.

FIG. 3A shows the entire main body portion 110 with the sticker 116 fully inserted therein. The sticker 116 is inserted when the hook 117 is in position such that the slit 118 is within the gap 121 (the slit 118 also passes through channel 120). Then, the rotating element 119 rotates rotating the hook 117 such that the hook 117 is inserted within aperture 112a (shown in FIG. 3B) thus securing and fixing the sticker 116 to the main body portion 110. The sticker 116 may be manipulated and applied to an object. FIG. 3C shows the main body portion 110 after the rotating element 119 has rotated and the hook 117 is in position such that the slit 118 is within the gap 121 and the sticker may be released. FIG. 3D shows the sticker 116 released after the main body portion 110 has moved proximally. FIG. 3E shows the main body portion 110 and sticker 116 in the position of FIG. 3D only with the full portion (and not cross section) of main body portion 110.

According to an embodiment of the present invention the rotating element 119 is driven by a dedicated motor (not shown) within the main body portion 110. The motor is configured to rotate rotating element 119 around its central axis. For example, the motor is configured to rotate a rotatable axle (not shown) extending therefrom which is connected and fixed to the rotating element 119 such that it rotates rotating element 119 around its central axis.

According to one embodiment, the main body portion 110 may be just a sticker applicator for applying the sticker 116 on an object or may also be a gripper finger manipulator that manipulates the target object. According to the option of being just an applicator, the sticker 116 is inserted within main body portion 110, as explained herein. The hook 117 secures the sticker to main body portion 110 (as explained herein) and main body portion 110 moves to the target object (where the sticker is to be applied thereon). The main body portion 110 approaches the target object and engages the sticker 116 to the object and firmly sticks it thereto (e.g. according to as explained in relation to embodiments herein). The sticker 116 is then released from the main body portion 110 (the sticker 116 remains on the object) and the main body portion 110 moves on for inserting the next sticker to be applied on the next object.

According to the option where the main body portion 110 is also a gripper finger manipulator of the stuck object, the sticker 116 is inserted within main body portion 110, as explained herein. The hook 117 is a securing element which secures the sticker to main body portion 110 (as explained herein) and main body portion 110 moves to the target object. The main body portion 110 approaches the target object and engages the sticker 116 to the object and firmly sticks it thereto (e.g. according to as explained in relation to embodiments herein). The main body portion 110 then manipulates the object by moving the sticker 116 that is still attached thereto and target object stuck to the sticker 116 to the location where the object is to be placed. Thereafter, the sticker 116 is released from the main body portion 110 (by the hook 117 rotating) and thus the object is also released at the requested location (wherein the sticker 116 remains on the object). Thereafter, main body portion 110 moves on to the next sticker location, the next sticker is inserted therein and the main body portion 110 moves to the next object to be manipulated.

According to another embodiment of the present invention, FIGS. 4A-4F show a finger gripping system comprising a gripper finger 200 having a gripper finger main body portion 210, configured to be used as a sticker applicator and also configured to be used as a gripper finger manipulator. The main body portion 210 is elongated.

The gripper finger 200 comprises a securing unit connected to the main body portion 210, wherein the securing unit comprises two side tiltable arms with distal securing elements (two distal hooks as explained herein). The securing unit comprises means (e.g. solenoid units) for tilting the tiltable arms, such that the securing unit is configured to displace the distal hooks into a first position securing a sticker element to finger 200 and displace the distal hooks into a second position such that the sticker element may be released from finger 200.

The main body portion 210 is connected to two elongated tiltable side arms 230, configured to tilt sideways. Each side arm 230 is connected to the main body portion 210 at a corresponding middle point by means of a revolute joint connection 232 such that the arms 230 are each rotatable around a corresponding axis of the corresponding revolute joint 232 (the rotation axis of the arms being the rotation axis of the revolute joint 232). For example, each of the side arms 230 is mounted (in a revolute joint manner) on a corresponding axis fixed between two corresponding side protruding parallel surfaces 235. Each corresponding parallel pair of protruding side surfaces 235 protrude from the sides of the main body portion 210.

Each side arm 230 comprises a proximal portion 230$p$ proximal to the revolute joint 232, and a distal portion 230$d$ distal to the revolute joint 232. The side arm proximal portions 230$p$ are each connected to a corresponding linear mechanical actuator unit with two positions (extended or contracted). This linear mechanical actuator may be pneumatic, e.g. a two-position pneumatic cylinder. FIGS. 4A-4F show an embodiment where the linear mechanical actuator is electric, specifically, a two-position electric solenoid 240 (e.g. that utilizes electromagnetic induction to apply force for extending a rod, and typically a spring to return the rod). Each electric solenoid 240 comprises a displaceable rod 240$r$ such that when the rod 240$r$ is pushed outwards the electric solenoid 240 is in an extended position and when the rod 240$r$ is pulled inwards the electric solenoid 240 is in a contracted position. Each rod 240$r$ has an end portion fixed to a proximal portion (e.g. the proximal end) of its corresponding proximal portion 230$p$. The rod 240$r$ is configured to move the proximal end of the proximal portion 230$p$ in a linear direction sideways and perpendicular to the distal-proximal direction.

The side arm distal portions 230$d$ each comprise a hook 217 at their distal ends. Each hook 217 faces inwards. The electric solenoids 240 are phased together (e.g. both in contact with a common control unit) and configured to push the proximal portions 230$p$ outwards (when the electric solenoid rods 240$r$ are extended) simultaneously, and also configured to pull the proximal portions 230$p$ inwards (when the electric solenoid rods 240$r$ are contracted) simultaneously, thus tilting the side arms 230 simultaneously in a manner such that the hooks 217 move towards each other simultaneously or move away from each other simultaneously. When one side arm 230 tilts clockwise the other side arm 230 tilts counterclockwise.

The gripper finger 200 is configured to secure a sticker element 216 (shown in FIG. 4G) thereto by means of a securing element (hooks 217 in this embodiment). The sticker element comprises two side object engaging portions 214 typically in the form of an adhesive sheets. The sticker element 216 comprises a connecting bridge portion 212 (typically in the form of a sheet) that projects proximally. Each side of the bridge portion 212 is attached to a corresponding inner side of the object engaging portions 214. The bridge portion 212 comprises two side notches 212$n$ typically near said attachments to the object engaging portions 214. The side notches 212$n$ are bulged inwards and when the hooks 217 move towards each other (when the arms 230 are displaced by the electric solenoids) the edges of the hooks 217 are configured to engage the notches 212$n$ (with the edges of the hooks 217 being inserted therein) thus securing the sticker element 217 to the main body portion 210. When the main body portion 210 is moved the sticker element 217 secured thereto moves with it. When the hooks 217 move away from each other (when the arms 230 are displaced in the opposite direction by the electric solenoids) they exit the notches 212$n$ and the sticker element 217 is released from the main body portion 210.

The bridge portion 212 is preferably in the shape of the bottom (proximal end) of the main body portion 210 (which preferably bulges in proximally). This assists in securing the sticker element 216 at the precise correct location, when the bottom of the main body portion 210 engages the bridge portion 212.

According to a preferred embodiment, finger 200 comprises a proximal head portion 250 securable to a maneuvering arm (not shown) of the finger gripper system. The head portion 250 has a connecting rod 260 extending distally therefrom. The main body portion 210 comprises a cylinder portion 270 (aligned along the distal-proximal axis) with a closed distal end and an open proximal end such that the connecting rod 260 is inserted into the cylinder portion 270 via said open proximal end. The connecting rod 260 has a spring engaging portion at its distal side (not shown) configured to push a spring (not shown) placed between the connecting rod spring engaging portion and the closed distal end. In this manner the system maneuvering arm may move finger 200 roughly and may engage the sticker element 216 (at the securing position) even at a pressure more than needed since the spring will contract when additional pressure is applied while the sticker element 216 remains engaged to the main body portion 210 at the securing position. The spring mostly acts as a buffer, that allows small errors in placement without breaking the hand or object.

Figure 4B:
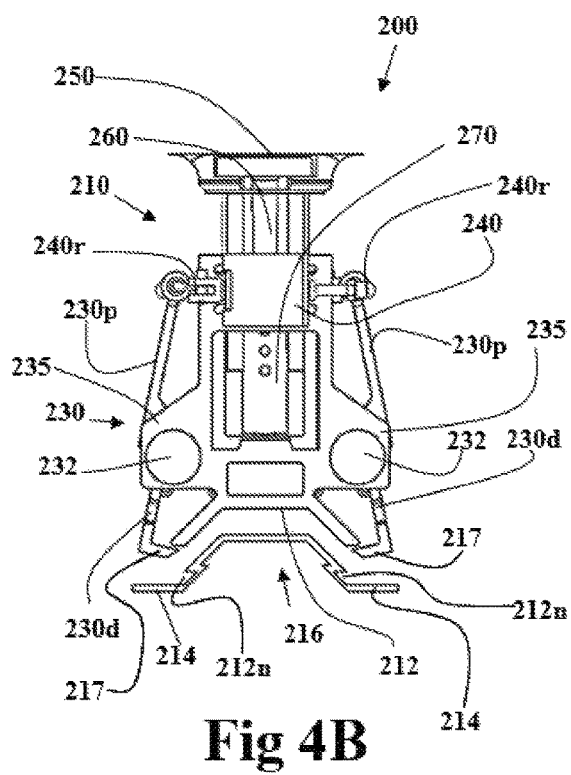
FIGS. 4A-4F illustrate a gripper finger according to an embodiment of the present invention.
Figure 4A:
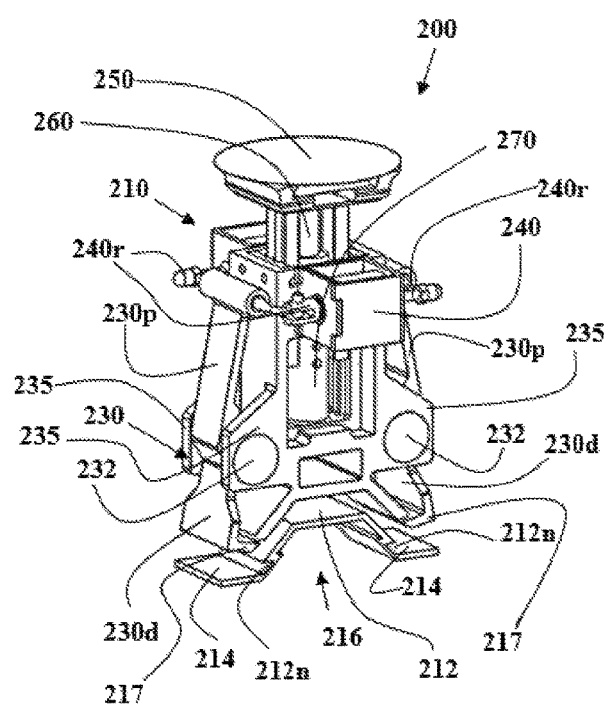
Figure 4D:
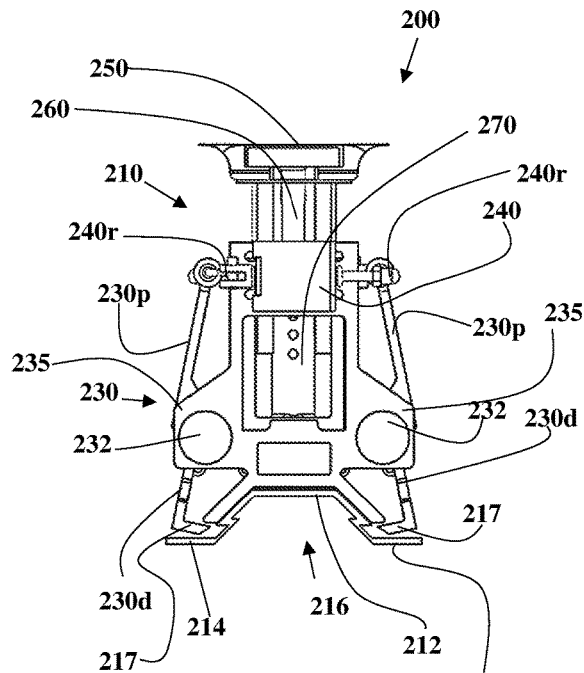
Figure 4C:
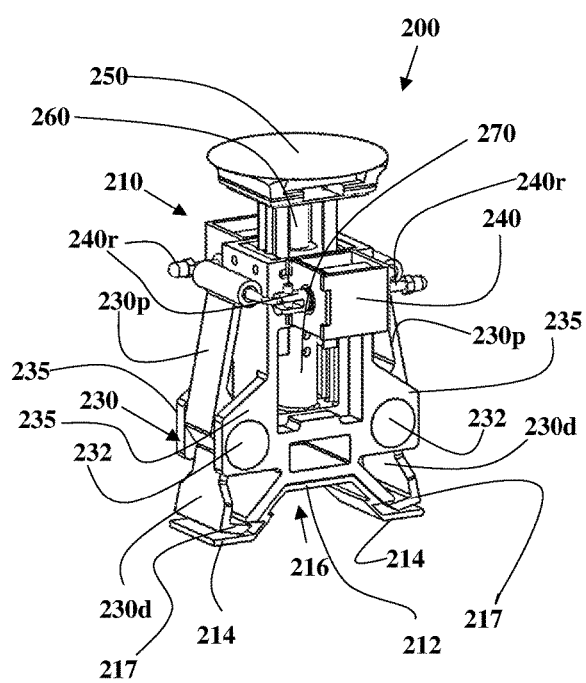
Figure 4F:
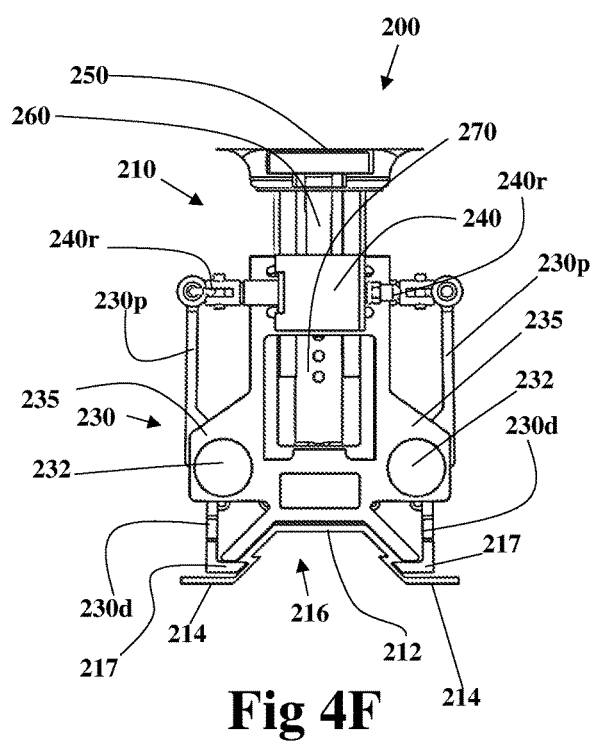
Figure 4E:
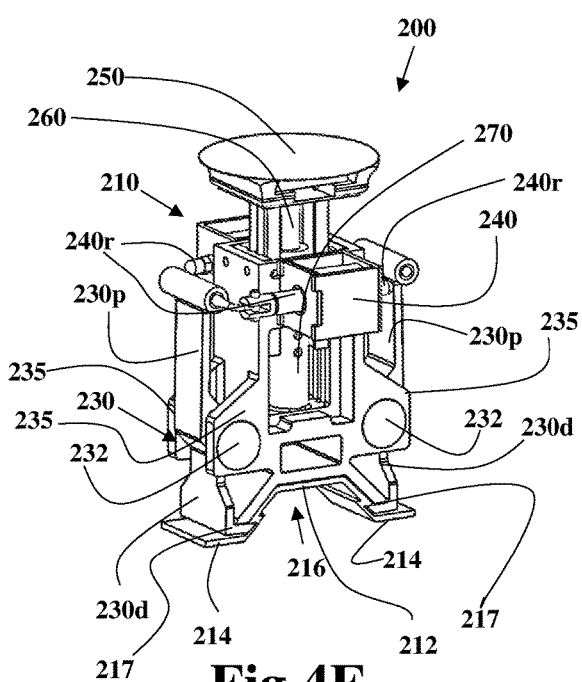
Figure 4G:
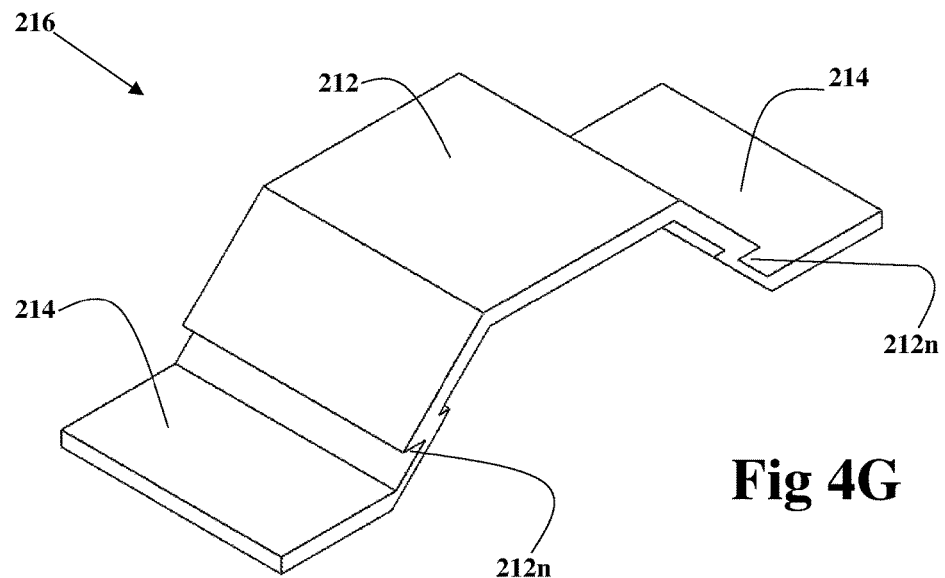
FIG. 4G illustrates a sticker according to an embodiment of the present invention.

FIGS. 4A, 4C and 4E show a perspective view of the gripper finger 200. FIGS. 4B, 4D and 4F show a front view of the gripper finger 200. The distal direction in this embodiment is downwards and the proximal direction is upwards. FIGS. 4A and 4B illustrate a scenario where the finger 200 travels downwards towards sticker element 216. FIGS. 4C and 4D illustrate a scenario where the finger 200 has traveled downwards, engages the sticker element 216 and is in the securing position (ready to be secured by the movement of the hooks 217). FIGS. 4E and 4F illustrate a scenario where the hooks 217 have moved inwards into the notches 212$n$ thus securing sticker element 216 to finger 200. Releasing the sticker element 216 is carried out in a reverse order, mutatis mutandis.

According to another embodiment of the present invention (similar to the embodiment of finger 200), FIGS. 5A-5H show a finger gripping system comprising a gripper finger 300 having a gripper finger main body portion 310, configured to be used as a sticker applicator and also configured to be used as a gripper finger manipulator. The main body portion 310 is elongated.

The gripper finger 300 comprises a securing unit connected to the main body portion 310, wherein the securing unit comprises two side tiltable arms with distal securing elements (two distal hooks as explained herein). The securing unit comprises means for tilting the tiltable arms, such that the securing unit is configured to displace the distal hooks into a first position securing a sticker element to finger 300 and displace the distal hooks into a second position such that the sticker element may be released from finger 300.

The main body portion 310 is connected to two elongated tiltable side arms 330, configured to tilt sideways. Each side arm 330 is connected to the main body portion 310 at a corresponding middle point by means of a revolute joint connection 332 such that the arms 330 are each rotatable around a corresponding axis of the corresponding revolute joint 332 (the rotation axis of the arms being the rotation axis of the revolute joint 332). For example, each of the side arms 330 is mounted (in a revolute joint manner) on a corresponding axis (e.g. on the sides of the main body portion 310). Each side arm 330 comprises a proximal portion 330p proximal to the revolute joint 332, and a distal portion 330d distal to the revolute joint 332. The side arm distal portions 330d each comprise a hook 317 at their distal ends. Each hook 317 faces inwards.

The main body portion 310 comprises a rotary motor configured to drive the rotating of a rotating element 340 (e.g. the rotating element 340 is mounted on an axle extending from the motor and rotatably driven by the motor). Two connecting straps 341 (e.g. cables, strings) are each attached at one end to a corresponding portion of the rotating element 340 and at the other end to a proximal portion (e.g. the proximal end) of a corresponding proximal portion 330p. The rotating element 340 is configured to be rotatably displaced between two positions. In the first position, the rotating element 340 is in a position such that the straps 341 do not pull the arms 330, and a spring (not shown) connected between the distal portions, pulls the distal portions 330d towards each other such that the hooks 317 are maintained in a closed manner relatively close to each other. Optionally, each arm may be attached to a dedicated spring (connected between the arm and the main body portion) that pulls the respective distal portions 330d inwards when the rotating element 340 is in the first position. When the rotating element 340 is rotated to the second position, the straps 341 pull the proximal portions 330p tilting the arms 330 such that the hooks 317 are driven apart from one another. Thus the arms 330 tilting is phased simultaneously in a manner such that the hooks 317 move towards each other simultaneously or move away from each other simultaneously. When one side arm 330 tilts clockwise the other side arm 330 tilts counterclockwise.

The gripper finger 300 is configured to secure a sticker element 216 (shown in FIG. 4G) thereto by means of a securing element (hooks 317 in this embodiment). The sticker element 216 has been explained herein. The hooks 317 connect and disconnect to sticker element 216 in a similar manner as hooks 217 connect to it, mutatis mutandis, and for the sake of brevity will not be explained again.

Figure 5B:
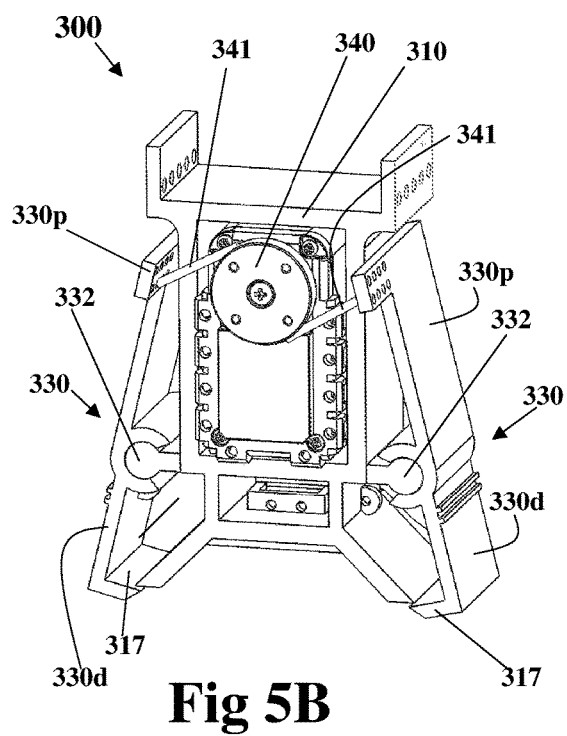
FIGS. 5A-5H illustrate a gripper finger according to an embodiment of the present invention.
Figure 5A:
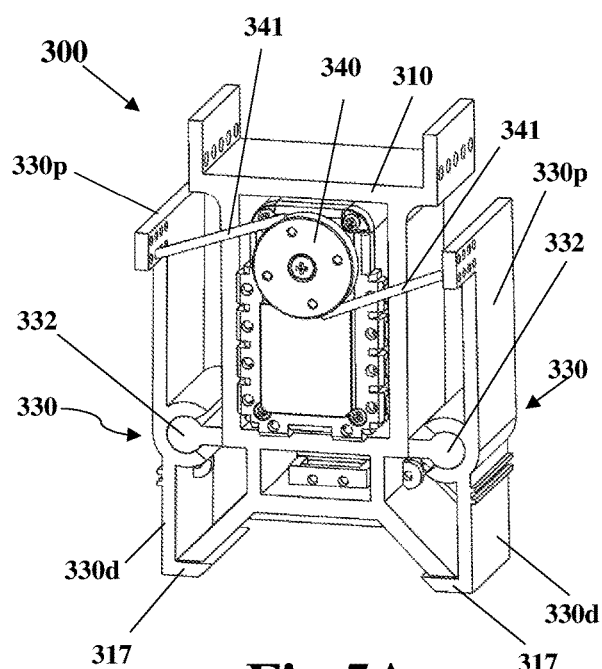
Figure 5C:
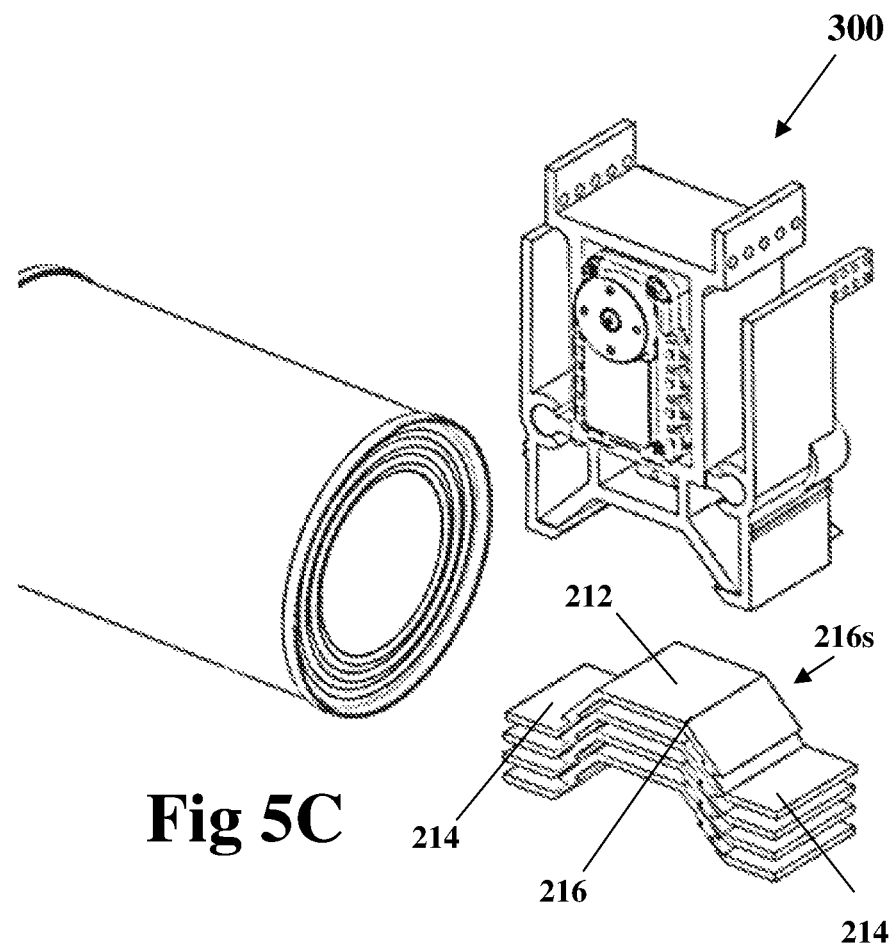

FIG. 5C shows an embodiment of finger 300 about to engage a stack 216s of sticker elements 216 (as explained hereinabove in relation to finger 200), one on top of the other. Preferably, the sticker elements 216 are semi-rigid. Finger 300 is ready to position itself to grasp a single sticker element 216 (the top most sticker) from the stack 216s. The stickers in the stack 216s do not adhere to each other because their proximal sides are non-adhesive, or because the geometry of the sticker elements 216 in the stack 216s is such that does not enable contact of a given sticker in the stack 216s with the adhesive portions of its adjacent stickers in the stack 216s (e.g. object engaging portions 214 of a given sticker in the stack 216s do not engage the object engaging portions 214 of an adjacent sticker in the stack 216s).

Figure 5D:
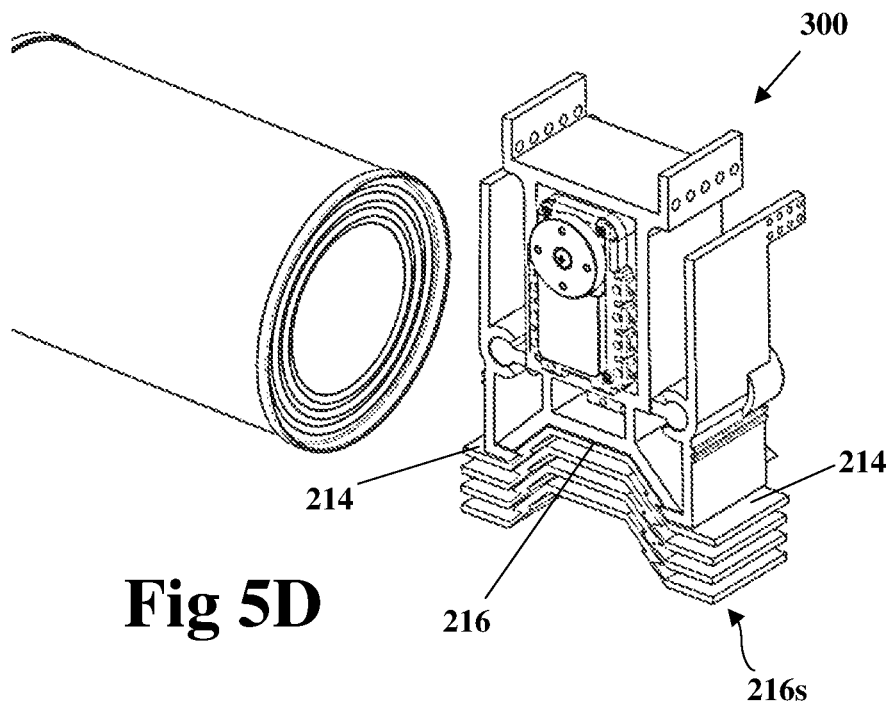

FIG. 5D shows the finger 300 descending upon stack 216s and engaging and securing the topmost sticker element 216 in the stack 216s.

Figure 5E:
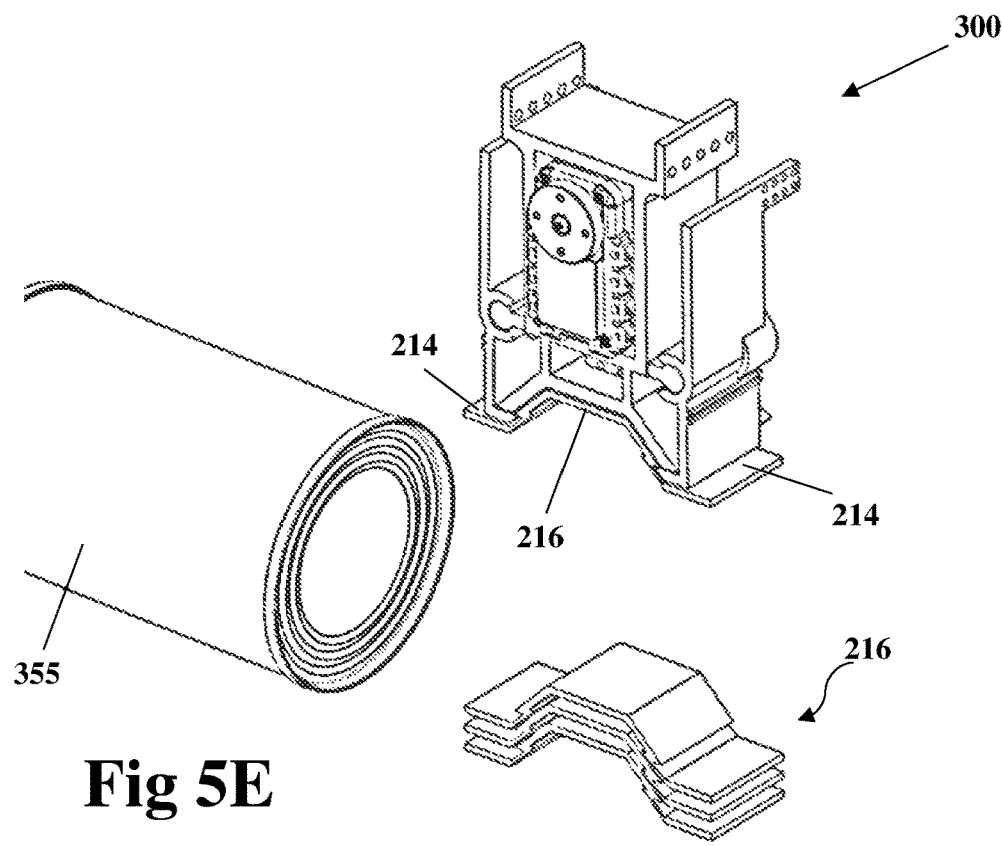

FIG. 5E shows the finger 300 manipulating the topmost sticker element 216 from the stack 216s. The next sticker (the following topmost sticker) is now ready to be removed from the stack 216s and manipulated.

Figure 5F:
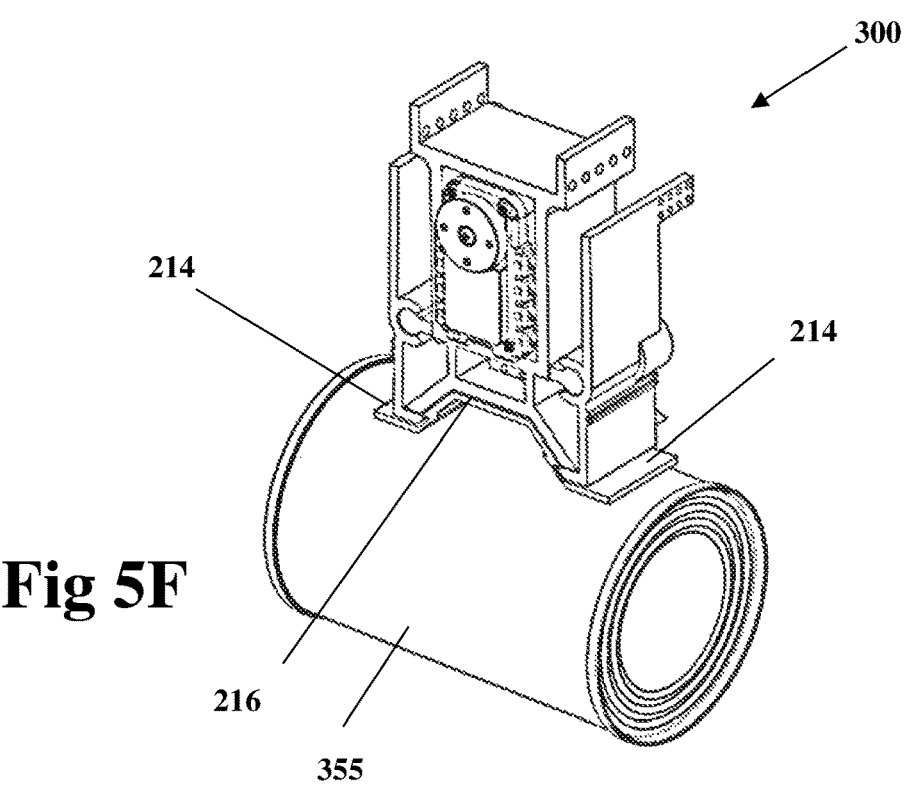

FIG. 5F. shows finger 300 directly adhering the sticker element 216 to an object 355 (a tin can) by applying force to it.

Figure 5G:
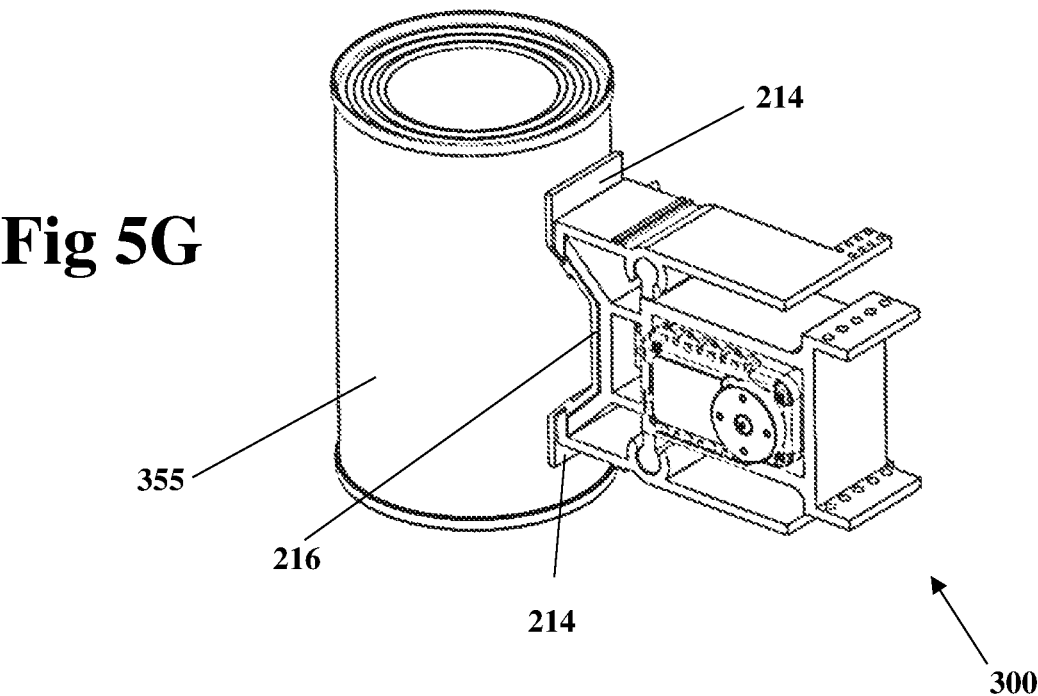

FIG. 5G. shows the object 355 being manipulated by finger 300. Since the sticker element 216 is rigidly attached to the object 355 by adhesion and rigidly attached to the finger 300 by the aforementioned securing, forces and torques can be applied to the object via the finger 300. The object 355 is manipulated to the desired location, in the desired position and orientation. When the finger 300 is repositioned in any way, so is the object 355 accordingly, with the sticker element 216 connected to it.

Figure 5H:
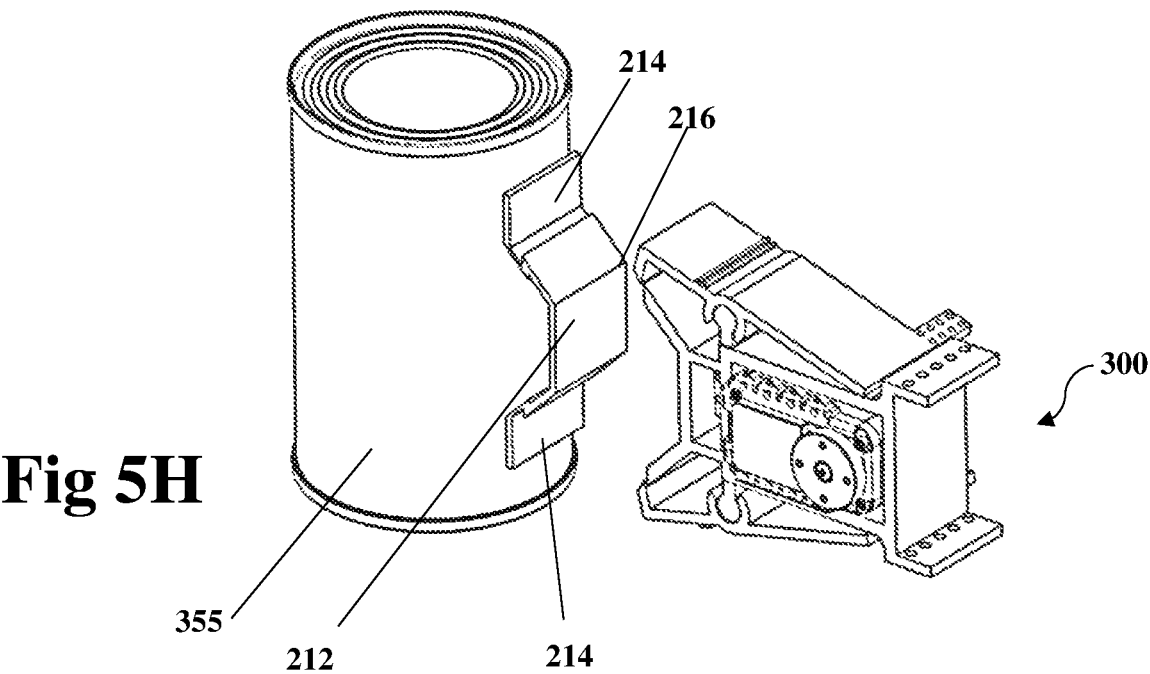

FIG. 5H shows the finger 300 releasing the sticker element 216 therefrom and retracting therefrom. The finger 300 moves its hooks 317 outwards, releasing itself from the notches 212n. The finger 300 then safely retracts from the sticker element 216 without applying further force to it. The sticker element 216 remains on the object 355 after the process is completed, and the finger 300 may repeat the stages as explained in FIGS. 5C-5H for the next sticker and next object.

Figure 6:
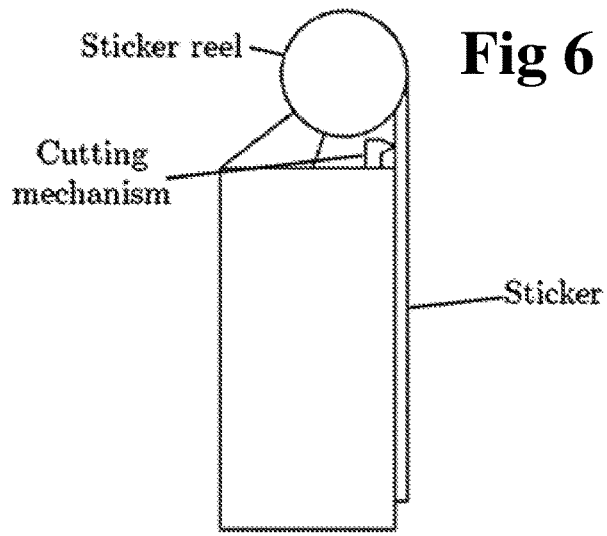
FIG. 6 illustrates a gripper finger according to an embodiment of the present invention.

According to another embodiment of the present invention (shown in FIG. 6), the finger gripper has a sticker reel with a long sticker tape wrapped around. In this configuration, there is a cutting mechanism which cuts the sticker tape at a requested location. The finger sticker reel provides a certain length of a sticker tape, engages an object to be manipulated, manipulates the object and cuts the tape leaving it on the object. Thereafter, a new length of tape is provided from the sticker reel for the next object to be manipulated.

Figure 7:
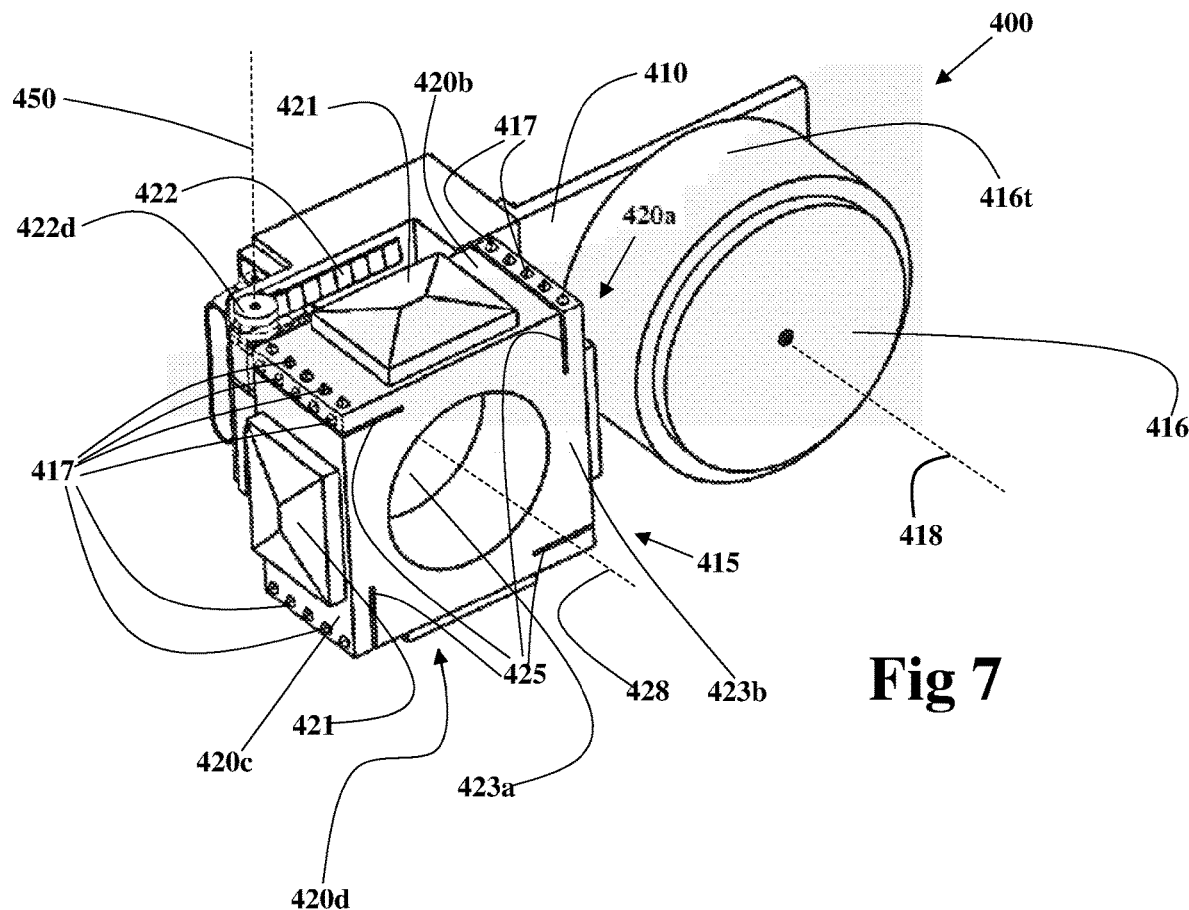
FIG. 7 illustrates a gripper finger according to an embodiment of the present invention.

FIG. 7 shows an example of such a finger gripping system, comprising a gripper finger 400 having a gripper finger main body portion 410 configured to connect to an arm of a gripper system. Finger 400 may be used as a sticker applicator and also configured to be used as a gripper finger manipulator. The main body portion 410 is elongated.

Gripper finger 400 comprises a sticker reel 416 on its proximal side and a sticker tape dispenser 415 on its distal side. The sticker reel 416 is round (typically circular) and has a sticker tape 416t wound around it. The adhesive side of the sticker tape 416t is the exterior side (and not the interior side as found in common tape rolls) as explained herein. The sticker reel 416 is mounted on a proximal portion of the main body portion 410, its center is fixed to an axle forming an axis 418 that it is freely rotatable around it. The main body portion 410 comprises a rotating blade 422 connected thereto at a distal portion thereof (typically at its distal end).

The sticker tape dispenser 415 has two side face surfaces and a plurality of "external" rectangular surfaces (as opposed to the side surfaces). The external rectangular surfaces are rotatable around an axis. The two side face surfaces may preferably have the shape of a polygon with equal length sides.

Since the external rectangular surfaces change positions (and directions, i.e. a "distal" direction in one position is a proximal direction at another), the present invention may be defined as follows:

The external rectangular surfaces are similar and therefore at a certain sticker tape dispenser rotating position, a first given external rectangular surface (substantially aligned with the tape portion extending from the reel 416) of the external rectangular surfaces comprises:
- a plurality of protruding hook elements placed near the distal edge of the first given external rectangular surface and a plurality of protruding hook elements placed near the proximal edge of the first given external rectangular surface;
- a slit placed distally and adjacent to the plurality of protruding hook elements placed near the proximal edge of the given external rectangular surface. The slits typically extend inwards in a direction perpendicular to the surface that they extend from.
- The external rectangular surfaces each preferably comprises a central bulging element.

The blade 422 is configured to be rotated and inserted within a corresponding slit of a second given rectangular surface of the external rectangular surfaces, wherein the second given rectangular surface is distally adjacent (i.e. the adjacent external surface generally in the distal direction) to said first given rectangular surface. The dispenser 415 will be more easily explained in relation to a square cuboid embodiment as follows.

According to a preferred embodiment, the sticker tape dispenser 415 has the form of a square cuboid (the square shape being at its two side faces). Optionally, the sticker tape dispenser 415 is hollow e.g. with a cylindric recess in its center (e.g. for saving use of material and for being light weighted). In any case, the hollow cylindric recess has an interior surface (part of inner face 423a) at its inner side which is connected to the main body portion 410. Thus, sticker tape dispenser 415 has a full inner side face 423a having a square shape, and an outer side face 423b (having a square shape possibly having said recess) on the opposite side, i.e. away from the main body portion.

The finger 400 comprises a first motor (not shown) and a rotatable axle (not shown) extending therefrom. The first motor is configured to drive and spin the axle. The interior surface 423a is mounted on a distal portion of the main body portion 410 at its square center, being fixed to the rotatable axle extending from the first motor, forming an axis 428 that it rotates around (rotating all of dispenser 415). Proximal axis 418 and distal axis 428 are parallel.

Besides the two square shaped side faces 423a and 423b, the sticker tape dispenser 415 has four rectangular face surfaces 420 that spin around axis 428. The face surfaces 420 are all equal (similar). The first motor is configured to move each external rectangular face surface 420 by 90 degrees for each manipulation cycle as explained herein.

Each of the spinning external rectangular face surfaces 420 may be in any one of four positions (shown in the related figures) as follows:
- The most proximal external face surface position 420a (direction indicated but not actually shown) facing proximally towards the proximal reel 416.
- The top external face surface position 420b facing upwards.
- The most distal external face surface position 420c facing distally.
- The bottom external face surface position 420d (direction indicated but not actually shown) facing downwards.

The following description will be of external face surface 420 in the top face surface position 420b, but as said, the faces 420 are all equal and when each face reaches the top position 420b at a specific manipulation cycle it will be indicated as face surface 420b. Face surface 420b comprises a plurality of protruding hook elements 417 near its distal edge and a plurality of protruding hook elements 417 near its proximal edge. The protruding hook elements 417 are preferably aligned at the distal and proximal edges in a straight line. The protruding hook elements 417 taper in a direction away from the surface they protrude from, such that their end portions are typically sharp, in other words for face surface 420b, the protruding hook elements 417 protrude upwards and taper upwards such that their top portions are sharp.

Preferably the protruding hook elements 417 are in the form of tacks. Face surface 420b comprises a central bulging element 421 that assists in pushing and fixing the tape 416t to an object to be manipulated (when in the position of face surface 420c explained herein). The tape is not shown in the figures being stretched on the external face surfaces 420b and 420c (as it is during maneuver operation). Preferably, central bulging element 421 is flexible. Face surface 420b comprises a proximal slit 425 placed distally (typically near and adjacent) to the protruding hook elements 417 that are near the proximal edge. The slit 425 extends downwards (perpendicular to the surface from which it extends from).

The finger 400 comprises a second motor (not shown) and a second rotatable axle (not shown) extending therefrom. The second motor is configured to drive and spin the second axle. The blade 422 is mounted at one of its ends (in a revolute joint manner) on said second axle such that it is configured to rotate around an axis 450 (typically being perpendicular to axes 418 and 428 and being perpendicular to the proximal-distal direction).

The distal end of the sticker tape dispenser 415 is placed distally such that when the face surface 420 is in the position of 420c, the blade 422 is configured to spin and enter slit 425 (of the distal face surface position 420c). FIGS. 8A-8D show the blade 422 in different positions while spinning. FIG. 8A shows the blade 422 in a position prior to spinning. FIG. 8B shows the blade 422 in a position while spinning. FIG. 8C shows the blade 422 in a position partially entering slit 425. FIG. 8D shows the blade 422 in a position fully entered within slit 425. The return of the blade 422 to the start position is carried out in a reverse order, mutatis mutandis.

The finger 400 may manipulate objects as follows. In the start position the edge of sticker tape 416t (that is wound around sticker reel 416) extends from the reel 416 and stretches such that it surrounds the two face surfaces 420 that are in positions 420b and 420c. The protruding hook elements 417 that are on surfaces 420 that are in positions 420b and 420c, are tacked/thrusted within tape 416t at their corresponding tape surrounding location. Furthermore, the (now) distal protruding hook elements 417 of surface 420 in position 420d (the ones that that are adjacent to slit 425 of 420d) are also tacked/thrusted in tape 416t near its furthest edge portion. The distal side of the tape 416t, thrusted between the now upper and lower protruding hook elements 417 of face surface 420 in position 420c, is the adhesive side of tape 416t. When finger 400 engages an object to be manipulated, said distal adhesive side of tape 416*t* (at 420*c*) firmly engages the object (with the assist of central bulging element 421 of 420*c*) thereby securing the object to the tape 416*t* and to finger 400. The finger 400 then manipulates the object to the requested location. When the object is at the requested location, the second motor drives the second axle such that the blade 422 rotates (and enters slit 425 of face surface 420 in position 420*c*), thus cutting the tape 416*t* during said rotation and releasing the object (and tape portion) from finger 400. Thereafter, the second motor drives the second axle such that blade 422 rotates in the opposite direction back to the start position and finger 400 retracts.

The edge portion of tape 416*t* that was cut off (the portion that was on face surface 420 in position 420*c*) stays on the object. The adhesive force of the cut off sticker tape 416*t* stuck on the object is stronger than the thrusting force of the edge portion of tape 416*t* that protruding hook elements 417 were thrusted therewithin (at the "bottom" of face surface 420 in position 420*c* and at the "distal" end of surface 420 in position 420*d*), especially as the protruding hook elements 417 retract generally away from the cut off tape.

Thereafter, the first motor drives the first axle and rotates the sticker tape dispenser 415 by 90 degrees, such that the face surface 420 in position 420*b* (near the blade 422) moves distally. Thus, what was face surface 420 in position 420*b* becomes face surface 420 in position 420*c*; what was face surface 420 in position 420*c* becomes face surface 420 in position 420*d*; what was face surface 420 in position 420*d* becomes face surface 420 in position 420*a*; and what was face surface 420 in position 420*a* becomes face surface 420 in position 420*b*.

As the tape portion 416*t* that was firmly connected (by means of the related protruding hook elements 417) to face surface 420 in position 420*b* (prior to the rotation of dispenser 415) also rotates along with its surface (420*b*) that it is connected to, thus the rotation causes the stretching and extending of tape 416*t* from the reel 416 onto the newly face surface 420 in position 420*b* (what was at position 420*a* prior to the rotation). The corresponding protruding hook elements 417 are thrusted into the new portion of stretched tape 416*t* at the corresponding locations (new position 420*b* after the rotation) as explained herein. The surfaces 420 now having the tape thereon along their lengths are the ones in positions 420*b* and 420*c* (formerly in positions 420*a* and 420*b* respectively). Thus, finger 400 is now ready to engage the next object for the next manipulation.

This embodiment has been explained in relation to a dispenser having a cuboid shape with two sided square faces, however, the present invention may be carried out with other shapes, e.g. with two side polygons with equal length sides, two sided faced triangles, two sided faced pentagons, hexagons, octagons, other polygons . . . ), mutatis mutandis.

The present invention relates to a vacuum gripper system in conjunction with adhesive stickers. The vacuum gripper may function as just a sticker applicator that applicates stickers on objects to be manipulated, or may also function as a gripper finger manipulator that also manipulates the object that the sticker is stuck to by applying a negative pressure to the sticker, attaching it (and the object that it is stuck to) thereto. The vacuum gripper then manipulates the object to its requested location and releases it (by stopping the negative pressure) leaving the sticker stuck to the object.

FIGS. 9A-9D show a vacuum gripper embodiment of the present invention. A smooth sticker having a proximal smooth side and a distal adhesive side may be used. FIG. 9A shows a suction gripper finger 500 engaging a sticker 20 (e.g. having a circular flat sheet form being the object engaging portion, with a distal adhesive side). The suction gripper finger 500 interior is coupled to a vacuum negative pressure system. The vacuum system is configured to apply negative pressure as known in the art. The negative pressure is typically between 0.1 and 1 atmospheres. The gripper finger 500 is typically elongated and comprises a distal opening coupled to the internal negative pressure system. The distal side of the sticker 20 is adhesive, and its proximal side is smooth and configured to be sucked and attached to the vacuum gripper finger 500 distal opening.

The negative pressure system applies negative pressure (suction force) when the vacuum gripper finger 500 distal opening engages the proximal side of sticker 20, as shown in FIG. 9B, thus firmly attaching sticker 20 to the distal opening of vacuum gripper finger 500. The vacuum gripper finger 500 along with the attached sticker then engages an object shoe 19. FIG. 9C shows the vacuum gripper finger 500 along with the attached sticker engaging object shoe 19, firmly pushing the sticker 20 such that it sticks to object shoe 19.

As the texture of the shoe is typically porous, soft, and curved a standard vacuum gripper would have had difficulty lifting this object shoe 19 directly without the sticker. The present invention provides such that the sticker 20 is firmly adhered to the soft, porous surface of the object shoe 19. The proximal smooth side of the sticker 20 provides an excellent surface for a strong vacuum attachment. As the sticker is also firmly attached to the shoe 19 on its distal side, the vacuum force applied to the sticker 19 is also effectively applied to the object shoe (the suction force is transmitted to the object shoe 19 through the sticker 20). The vacuum gripper 500 can now lift the object shoe 19 and manipulate it to a different location and at a required orientation. This is advantageous as it enables an effective vacuum-based manipulation of porous objects, non-flat objects, non-smooth objects or other objects that are initially not effective for a vacuum manipulation. The sticker 20 provides an excellent connection to these types of objects and provides an excellent surface for a strong vacuum attachment and manipulation. After the manipulation to the required location, the vacuum negative pressure system ceases the negative pressure and the object shoe 19 (and sticker 20 which remains attached to the shoe 19) is released from gripper finger 500. The gripper finger 500 then retracts away from the object shoe 19 (shown in FIG. 9D) for the next manipulation cycle of another object.

In other embodiments the gripper finger 500 may attach to a link (e.g. link 11 in FIG. 2C as explained herein), linking a multitude of stickers/objects, and manipulate the cluster, mutatis mutandis.

The present invention relates to a magnetic gripper system in conjunction with adhesive stickers. The magnetic gripper system has a magnetic gripper finger which may function as just a sticker applicator that applicates stickers on objects to be manipulated, or may also function as a gripper finger manipulator that also manipulates the object that the sticker is stuck to by applying a magnetic force to the sticker, attaching it (and the object that it is stuck to) thereto. The magnetic gripper then manipulates the object to its requested location and releases it (by stopping the magnetic force) leaving the sticker stuck to the object.

Appropriate stickers for use according to this embodiment may include stickers comprising a proximal portion configured to be magnetized, e.g. stickers with magnetic properties. Another example may include a sticker adhesive at its distal side and with a magnet attached to its proximal side. Other stickers used may be stickers with a metallic/magnetic proximal side. The magnetic gripper finger is typically elongated and has a distal electromagnetic element coupled to a magnetic application system as known in the art. The electromagnetic system may be activated such that the electromagnetic element applies a magnetic pulling force. The magnetic gripper finger engages a sticker. The distal side of the sticker is adhesive and its proximal side comprises a metallic/magnetic element. The magnetic application system applies a magnetic force when the magnetic gripper finger distal electromagnetic element engages the proximal side of the sticker, thus firmly attaching the sticker to the distal electromagnetic element of the magnetic gripper finger. The magnetic gripper finger along with the attached sticker then engages an object, firmly pushing the sticker such that it sticks to the object.

As the texture of the object may be porous, soft, and curved the present invention provides such that the sticker is firmly adhered to the soft, porous surface of the object. The metallic/magnetic element on the proximal side of the sticker provides an excellent means for a strong magnetic attachment. As the sticker is also firmly attached to the object on its distal side, the magnetic force applied to the sticker is also effectively applied to the object (the magnetic force is transmitted to the object through the sticker). The magnetic gripper can now lift the object and manipulate it to a different location and at a required orientation. This is advantageous as it enables an effective magnetic-based manipulation of porous objects, non-flat objects, non-smooth objects or other objects that are initially not effective for a magnetic manipulation. The sticker provides an excellent connection to these types of objects and provides an excellent proximal base for a magnetic attachment and manipulation. After the manipulation to the required location, the magnetic application system seizes the magnetic force (deactivating the electromagnetic element) and the object (and sticker which remains attached to the object) is released from the magnetic gripper finger. The magnetic gripper finger then retracts away from the object for the next manipulation cycle of another object.

In other embodiments the magnetic gripper finger may attach to a metallic/magnetic link (e.g. having the shape of link 11 in FIG. 2C as explained herein), linking a multitude of stickers/objects, and manipulate the cluster, mutatis mutandis.

The present invention relates to a direct application of adhesive material on an object, followed by adhering a rigid gripping finger to the applicated adhesive material and manipulating the object. Adhesion provides several advantages over suction, such as higher "pulling" forces for the same contact area, and the fact that adhesion does not require a smooth surface, pressure gradients, or gas impermeability. Manipulation of the object is carried out by applying forces directly to the adhesive material.

Figure 10A:
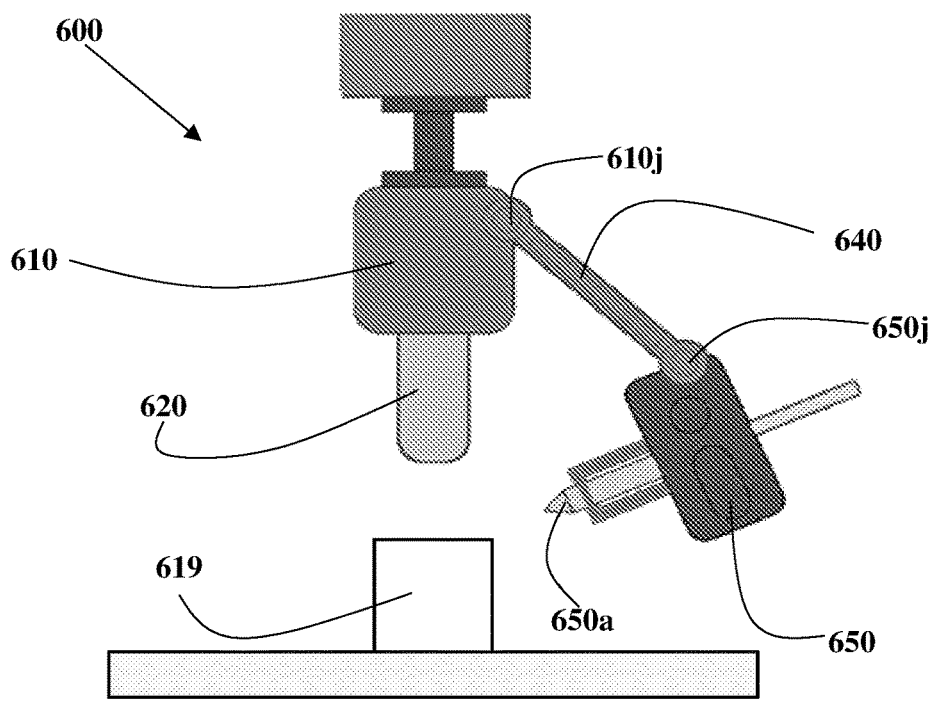
FIG. 10A illustrates a gripper finger according to an embodiment of the present invention.

FIG. 10A shows an example of this embodiment. FIG. 10A shows a gripper finger 600 comprising a main body portion 610. The main body portion 610 is connected to an adhesive material applicator 650 by means of a connecting arm 640. The connecting arm 640 is connected to the maim body portion 610 e.g. by means of a revolute joint connection 610j. The connecting arm 640 is connected to the adhesive material applicator 650 e.g. by means of a revolute joint connection 650j. The gripper finger 600 may comprise motors (not shown) to drive revolute joints 610j and 650j. The material applicator 650 is configured to apply adhesive material to the top (proximal side) of an object 619. The material applicator 650 comprises an injecting nozzle 650a coupled to an adhesive material reservoir (not shown). The reservoir may comprise means for preparing the adhesive material for application, e.g. a mixer for mixing the adhesive material, a heater for heating the adhesive material, or any other element that assists the process required for preparing the adhesive material for application. The injecting (e.g. comprising delivery of the adhesive material from the reservoir to the object) is typically powered by a motor or a dedicated pump (as known in the art). The pump is configured to deliver the adhesive material from the reservoir to and out of the injecting nozzle. The material applicator 650 is moved (by the joints 610j and 650j) such that the nozzle 650a engages the top (or a location near the top) of the object 619 and directly injects the adhesive material thereon.

Determining the desired grasp/contact points on the object is according to the object weight, shape, surface properties etc. The determined points should result in a robust grasp. At this stage, the type and size of the contacts is also determined, as one grasping mechanism may have the ability to use different types of adhesive, or amounts thereof, depending on the object and desired task.

The main body portion 610 comprises an adhesive engaging member 620 extending distally therefrom configured to engage the object 619 and/or the adhesive material thereon. The adhesive engaging member 620 engages the injected adhesive, thus (eventually) adhering the gripper finger 600 to the object 619. The adhesive engaging member 620 may be pushed distally towards the object 619 during the adhesion process. The adhesive can be cured (prior to manipulation) by several manners, such as passing a cure time period known for the specific adhesive material used, a change in temperature (e.g. for hot-melt adhesive), chemical reaction, pressure, exposure to UV light, drying, etc. The adhesive engaging member 620 may be a catalyst in the curing process. For example, if hot melt adhesive is used, the adhesive engaging member 620 may be cooled in order to remove heat from the adhesive, accelerating the curing process.

After the adhesive is cured, finger 600 manipulates the object (adhered to the adhesive engaging member 620 by the cured adhesive material). For example, manipulation forces may be applied to the adhesive by the adhesive engaging member 620, resulting in wrenches applied to the object via the adhesive contacts, manipulating the object 619. After manipulation is completed at the required location, the object 619 is released by the gripper finger 600. The releasing may be carried out e.g. by removing the adhesive from the gripper finger 600 or cutting the adhesive off the gripper finger 600, leaving the adhesive stuck to the object 619, etc. According to one embodiment, the adhesive is cut by a blade that is swingable under the finger, severing the glue from the finger (e.g. with a mechanism similar to that of rotating blade 422, placed near the distal end of the adhesive engaging member 620, mutatis mutandis).

According to another embodiment, a positive pressure may be directed to the adhesive material (e.g. glue) from the adhesive engaging member 620 to release itself from the adhesive material. The adhesive engaging member 620 may have an air output coupled to an air pressure system, configured to apply a positive air pressure and direct it to the adhesive engaging member 620 air output, thereby blowing the adhesive material and releasing itself therefrom.

Figure 10B:
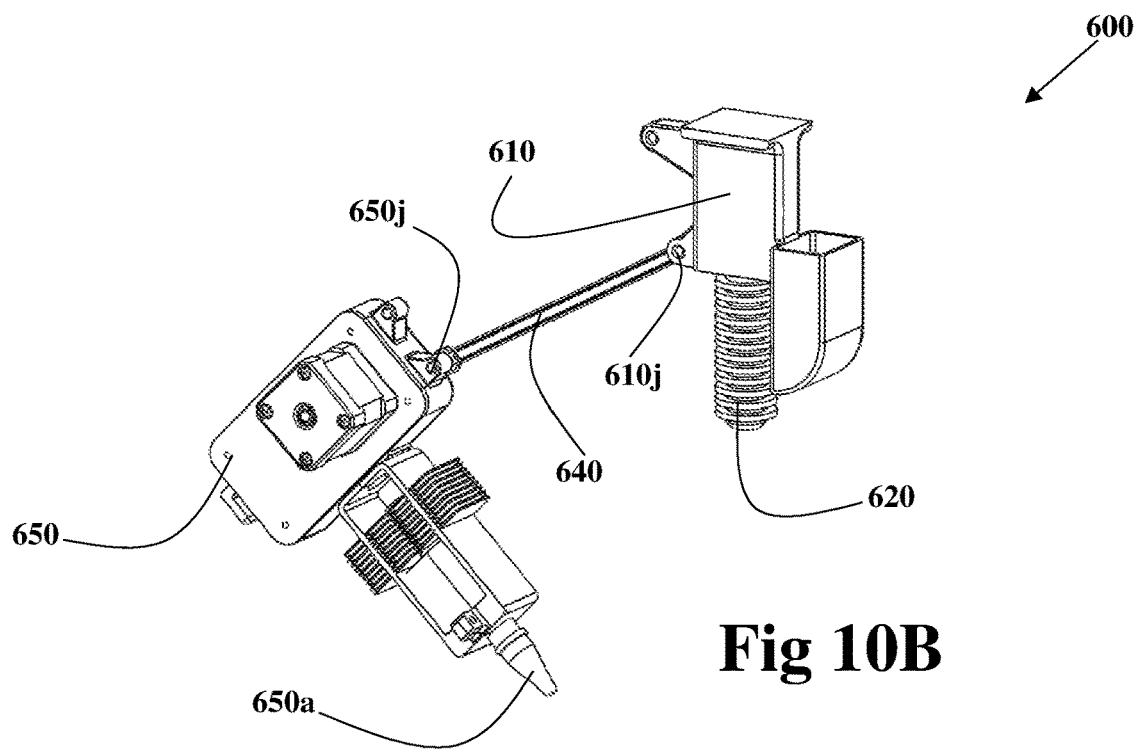
FIG. 10B illustrates a gripper finger according to an embodiment of the present invention.

In case of removal of the adhesive, it can be carried out by a change of temperature, exceeding the adhesive force threshold (the force that causes the adhesion to fail), chemical reaction, etc. The gripper finger 600 then retracts away from the object 619 for the next manipulation cycle of another object. FIG. 10B shows another example structure of the elements of finger 600.

This gripper finger 600 embodiment may be useful for manipulating objects that are porous, soft, non-flat objects, non-smooth objects, and other various types of objects.

Possible adhesive materials used according to this embodiment (but are not limited to) may be selected from the group consisting of: cyanoacrylate adhesives, thermoplastic hot-melt adhesive, food based (edible) hot-melt adhesive, pressure-sensitive adhesive (e.g. acrylic, rubber or silicone based with high-tack, permanent, peelable or freezer properties), epoxies, polyurethane, light curing adhesives, nano-fiber adhesive, hook and loop fasteners (Velcro), spray adhesives, medical-grade and bio-inspired adhesives. Another adhesive used may be, for example, VHB™ by 3M.

According to another embodiment, the adhesive engaging member may possibly have additional capabilities such as suction (being connected to a suction system) or magnetic pulling (being connected to a magnetic activating system, especially useful where the adhesive material is capable of being magnetized).

Adhesive gripping of finger 600 is also advantageous over the vacuum gripping systems. In order to increase the negative pressure of a vacuum system, one needs to pressurize the system workspace and therefore it is a limiting factor. Adhesion force, as explained in relation to finger 600, is independent of the ambient air pressure, as air pressure plays no factor in the adhesion process.

The present invention relates to a gripper system comprising a robotic arm with a distal gripper finger as explained herein. The robotic arm typically has between 3 to 6 degrees of freedom to maneuver an object by means of the distal fingers connected thereto, as explained herein, and by means of corresponding stickers. The robotic arm may comprise a plurality of adjacent segments (e.g. arms, bars, rods, etc., as known in the art), each two adjacent segments connected by a joint, e.g. a revolute joint. The system may comprise at least one motor configured to radially displace the revolute joints and a control unit (comprising a processor) coupled to the at least one motor and distal fingers and configured to provide operational commands to said arm and finger. The control unit operational commands to the finger may comprise control commands of all of the securing units as explained herein and all of the other element displacement functions or other functions (e.g. operating the negative pressure in relation to finger 500, positive pressure in relation to the adhesive detachment with respect to finger 600, magnetic force in relation to the magnetic attachment finger embodiment) as explained in relation to any one of the gripper fingers as explained herein.

Figure 11A:
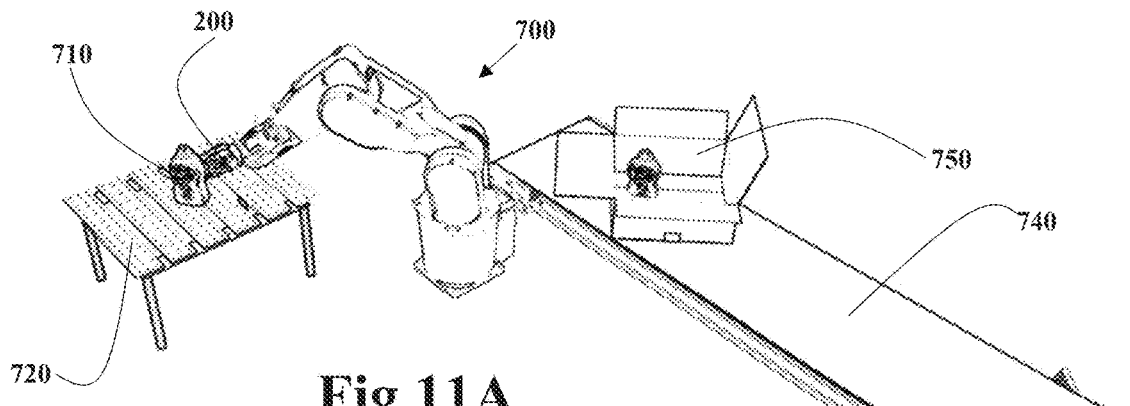
FIGS. 11A-11E show a packing station scenario according to an embodiment of the present invention.
Figure 11B:
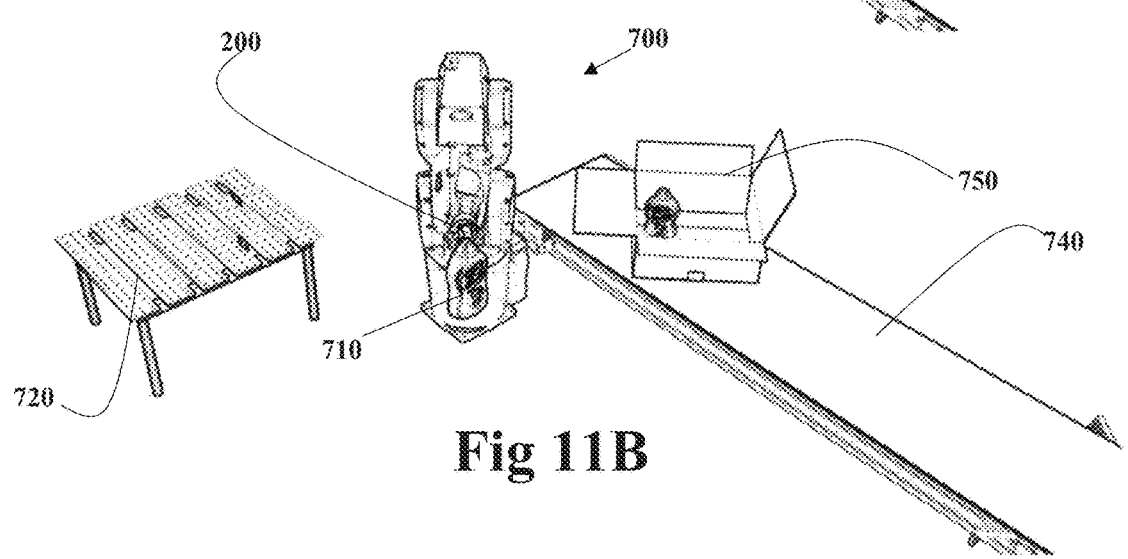
Figure 11C:
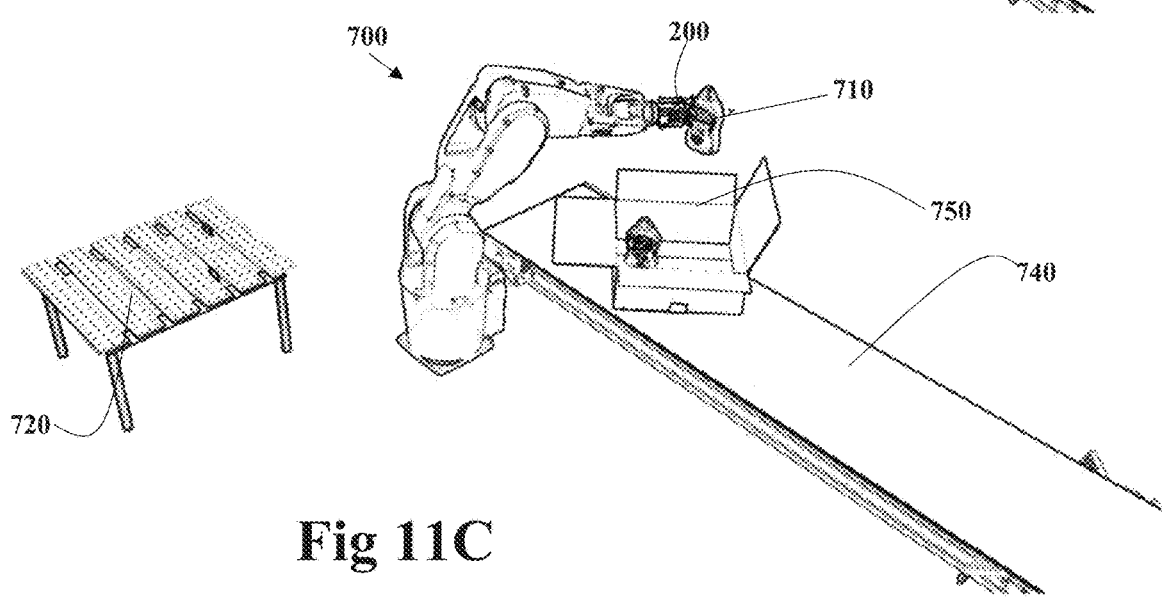
Figure 11D:
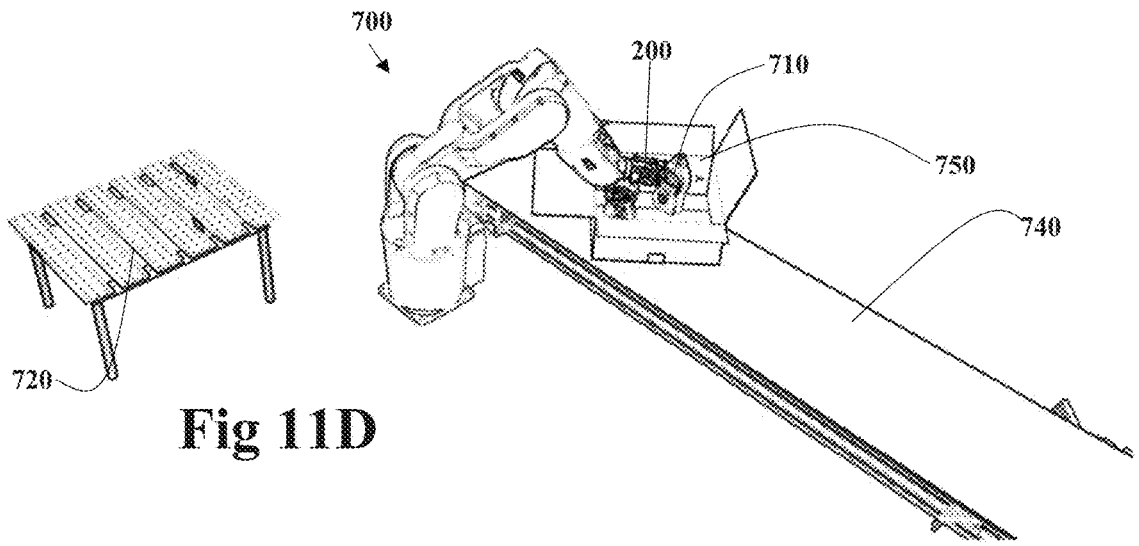
Figure 11E:
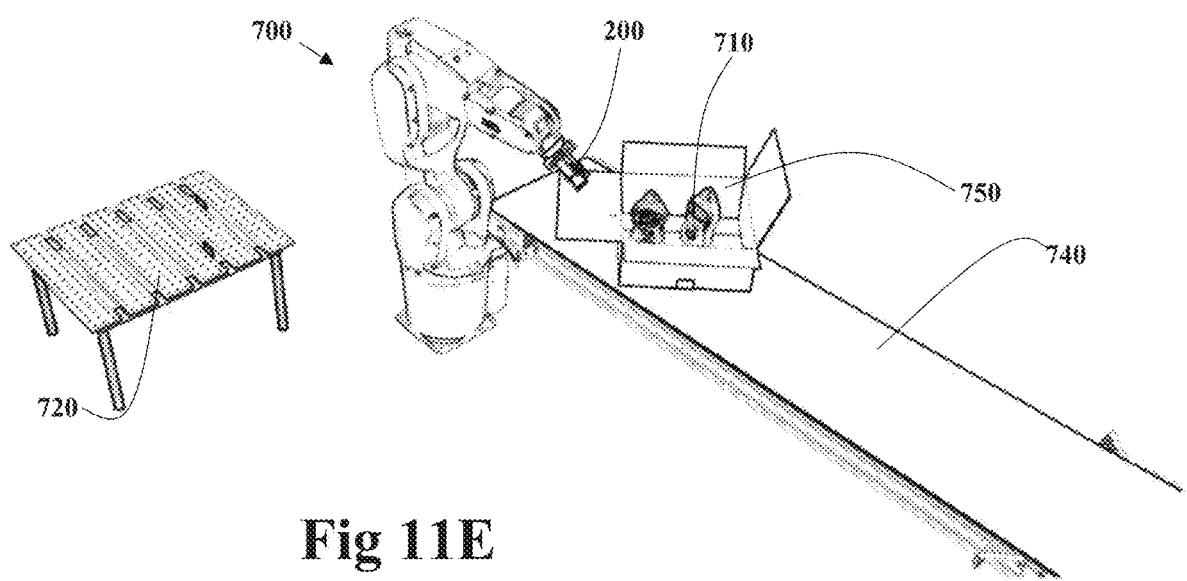

FIGS. 11A-11E show an example of a packing station scenario, in which a robotic arm 700 with a plurality of segments with joints therebetween and a distal gripper finger 200 maneuvers an object 710 from a packing surface 720 to a package box 750 on a conveyor belt 740. FIG. 11A shows the arm 700 engaging object 710 which is on surface 720. FIGS. 11B-11C show the arm 700 maneuvering object 710 towards package box 750. FIG. 11D shows arm 700 placing object 710 within package box 750. FIG. 11E shows arm 700 retreating after placing object 710 in package box 750.

Figure 12A:
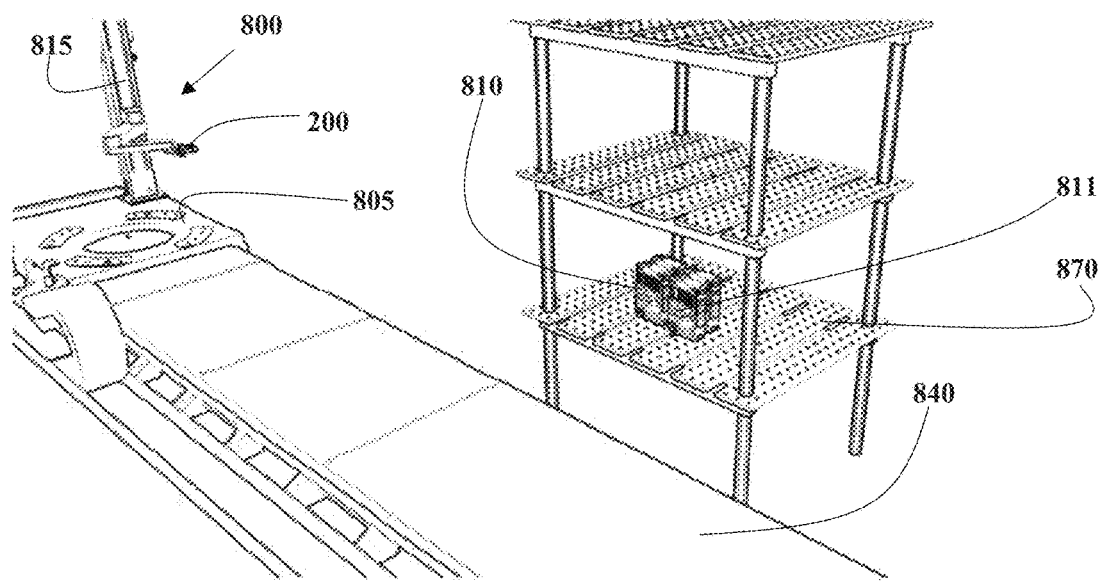
FIGS. 12A-12S show a robot packaging scenario according to an embodiment of the present invention.
Figure 12B:
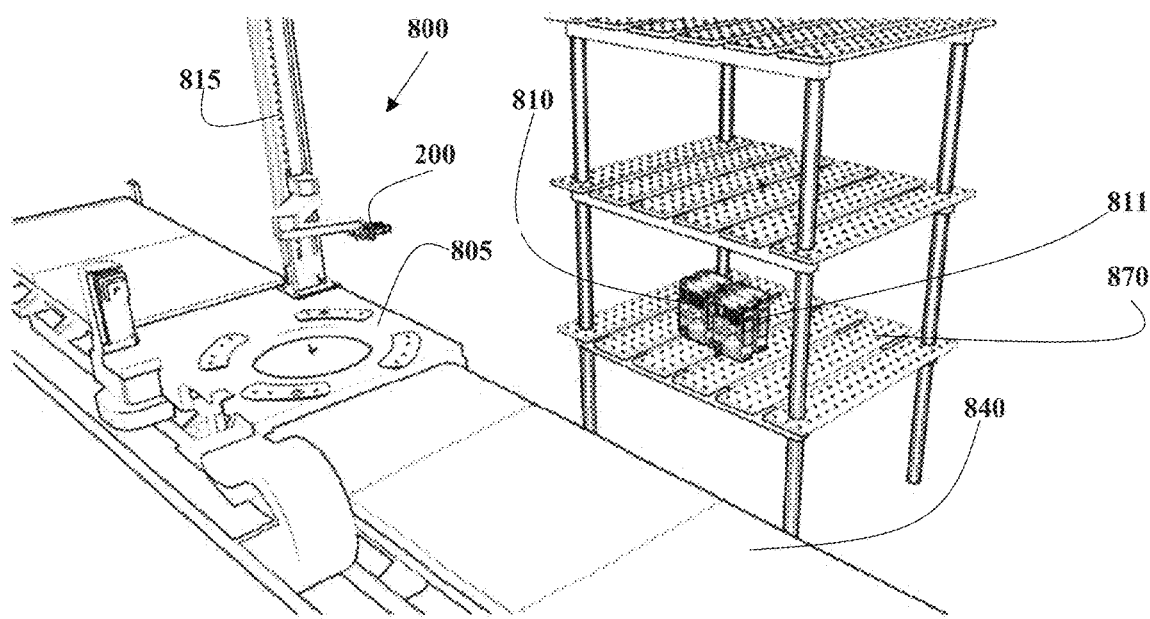
Figure 12C:
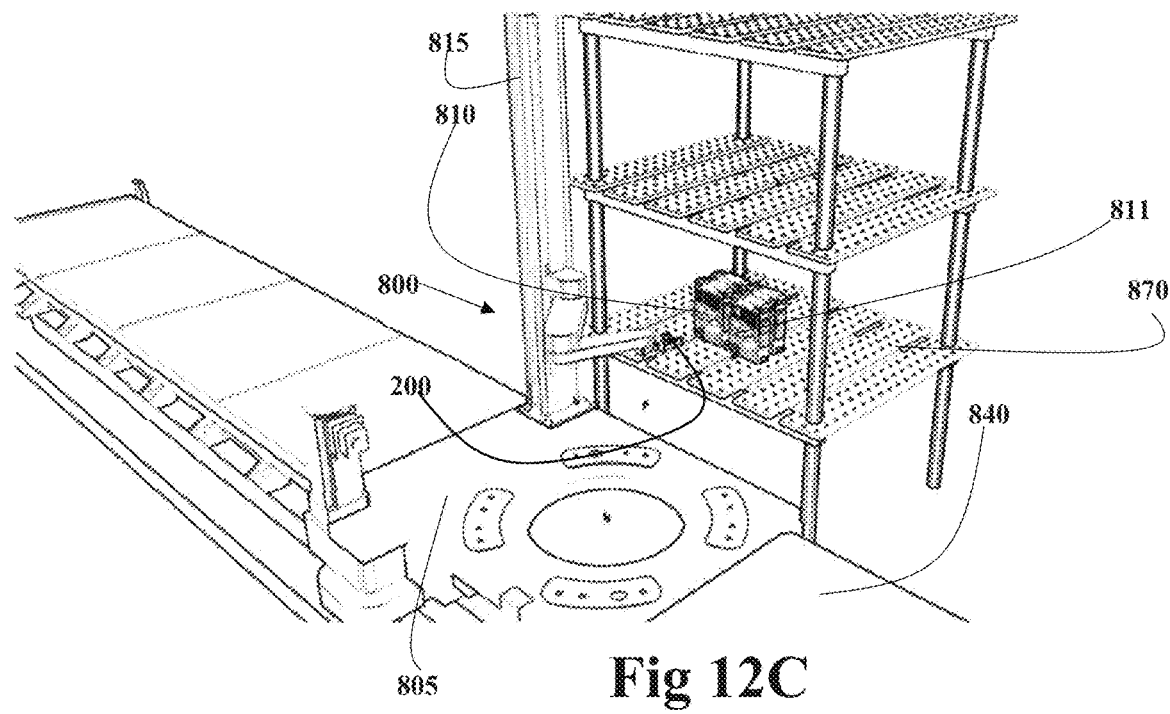
Figure 12D:
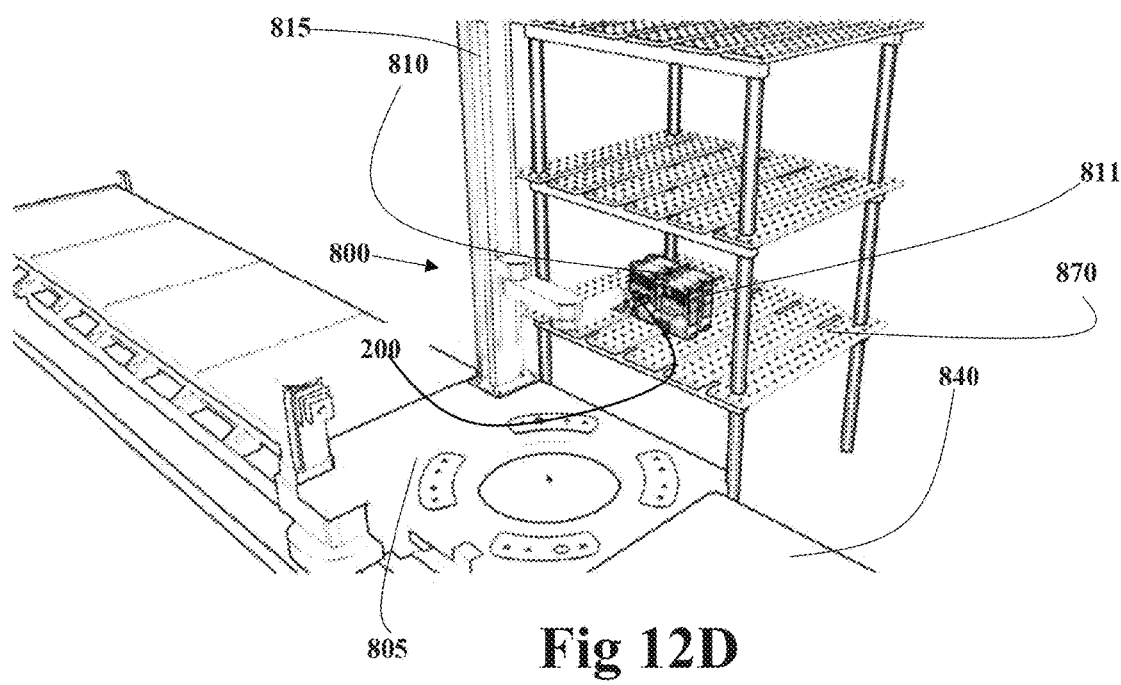
Figure 12E:
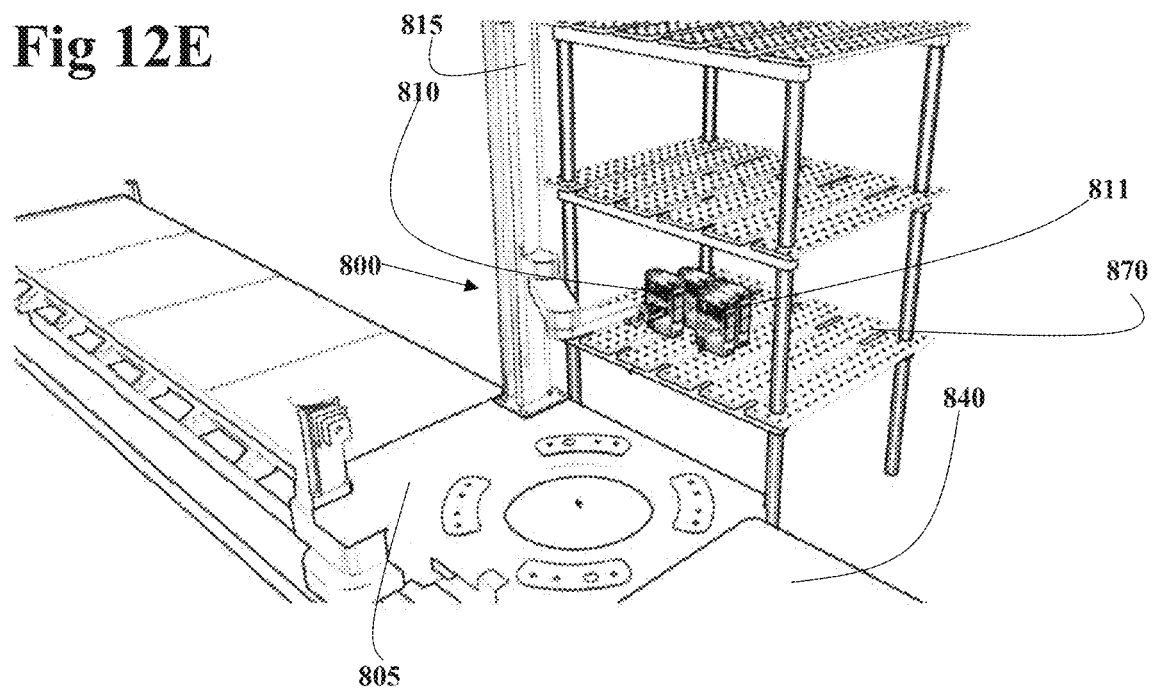
Figure 12F:
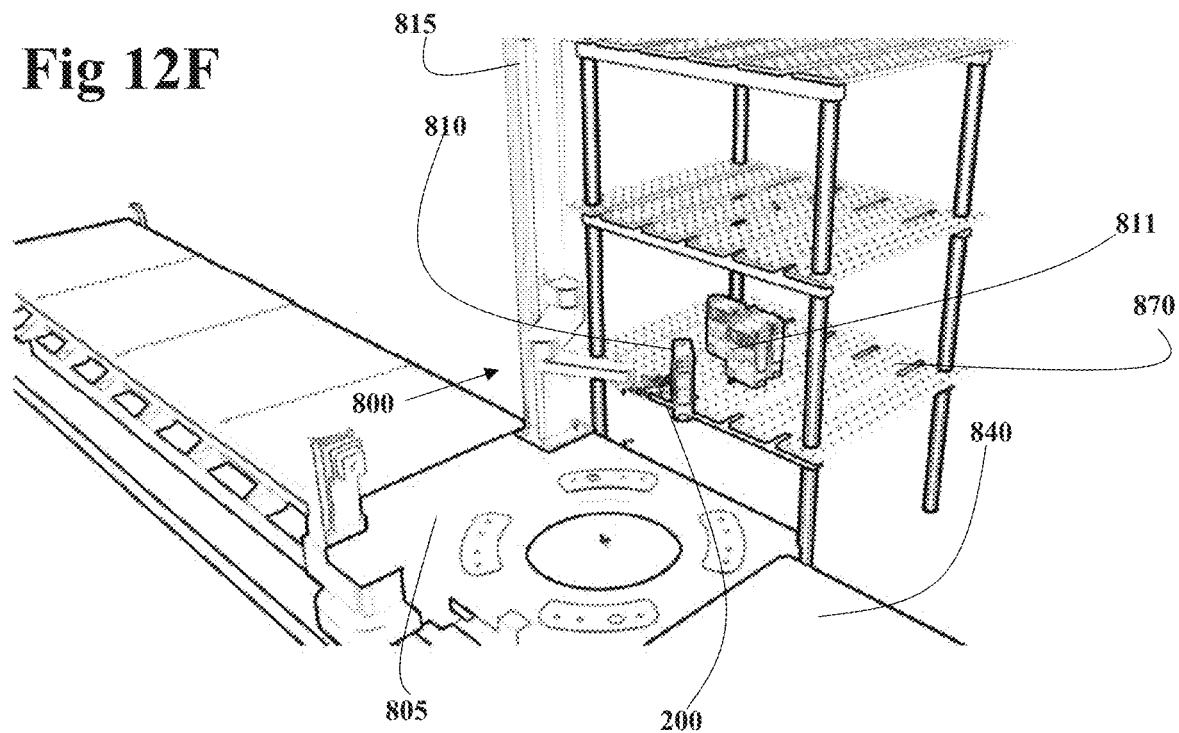
Figure 12G:
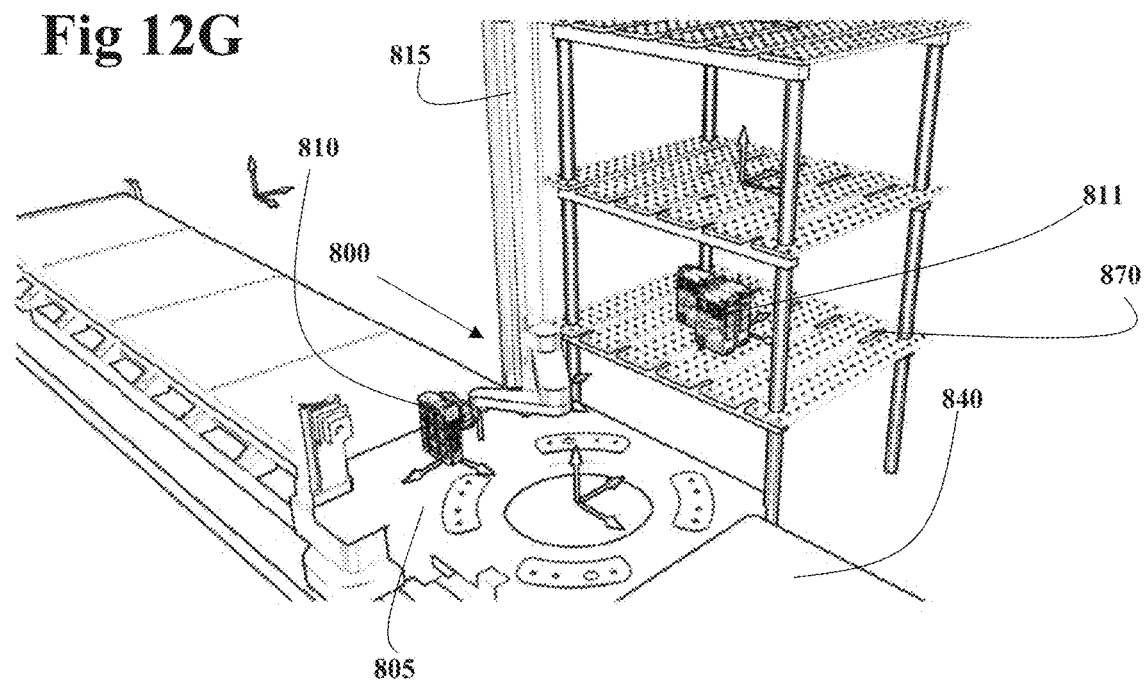
Figure 12H:
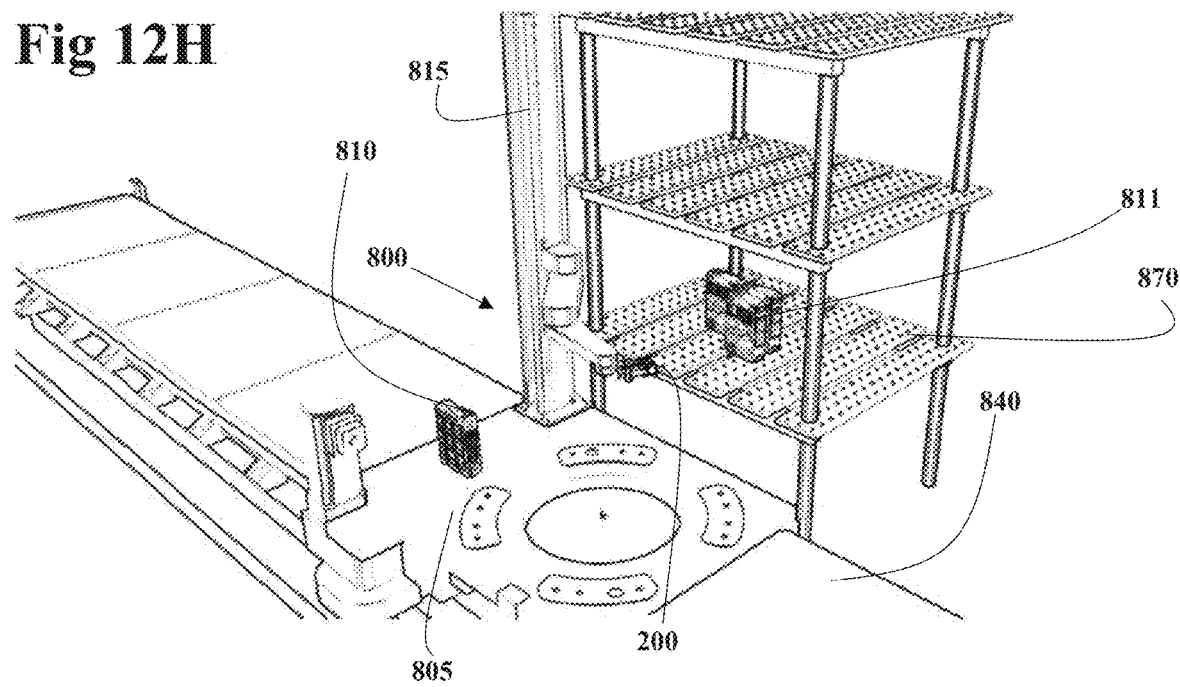
Figure 12I:
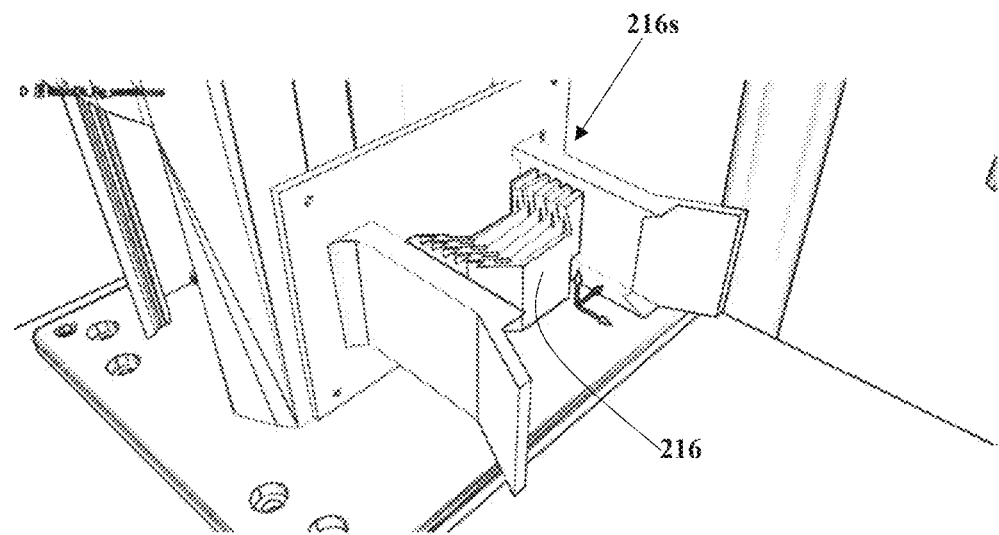
Figure 12J:
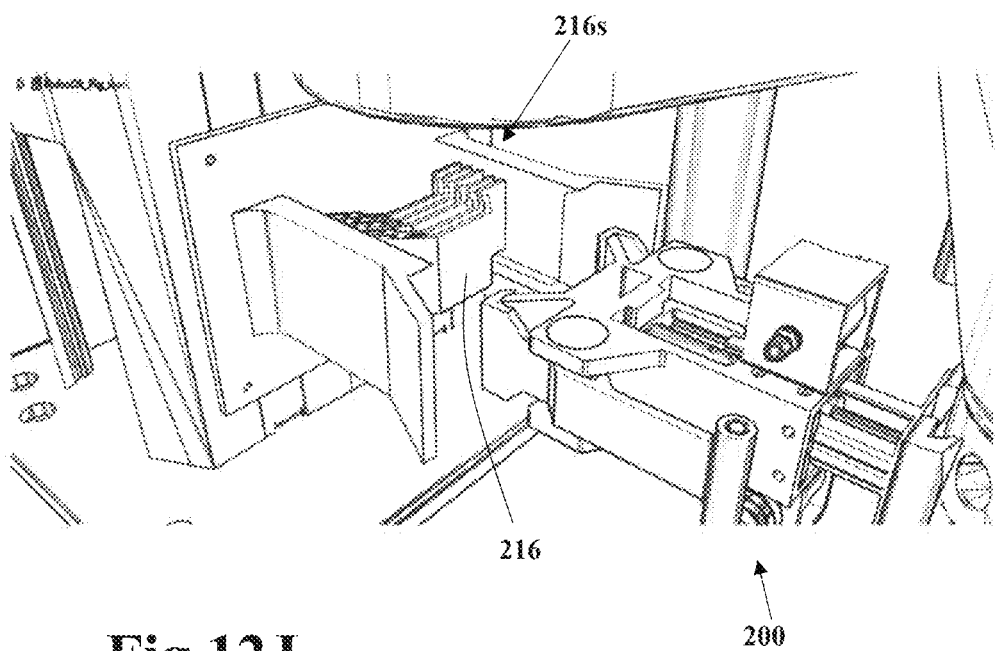
Figure 12K:
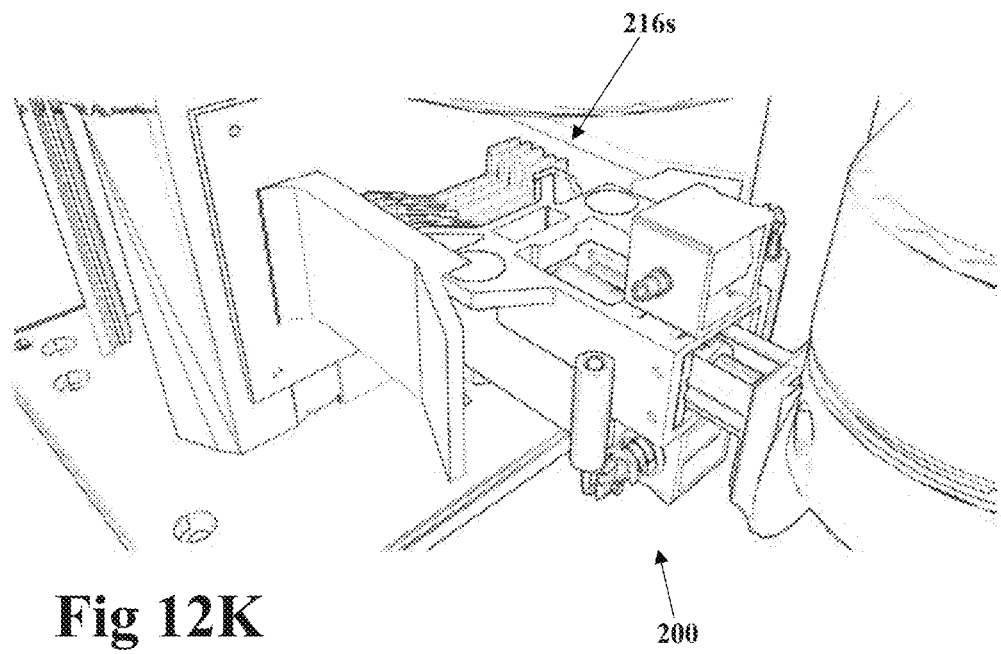
Figure 12L:
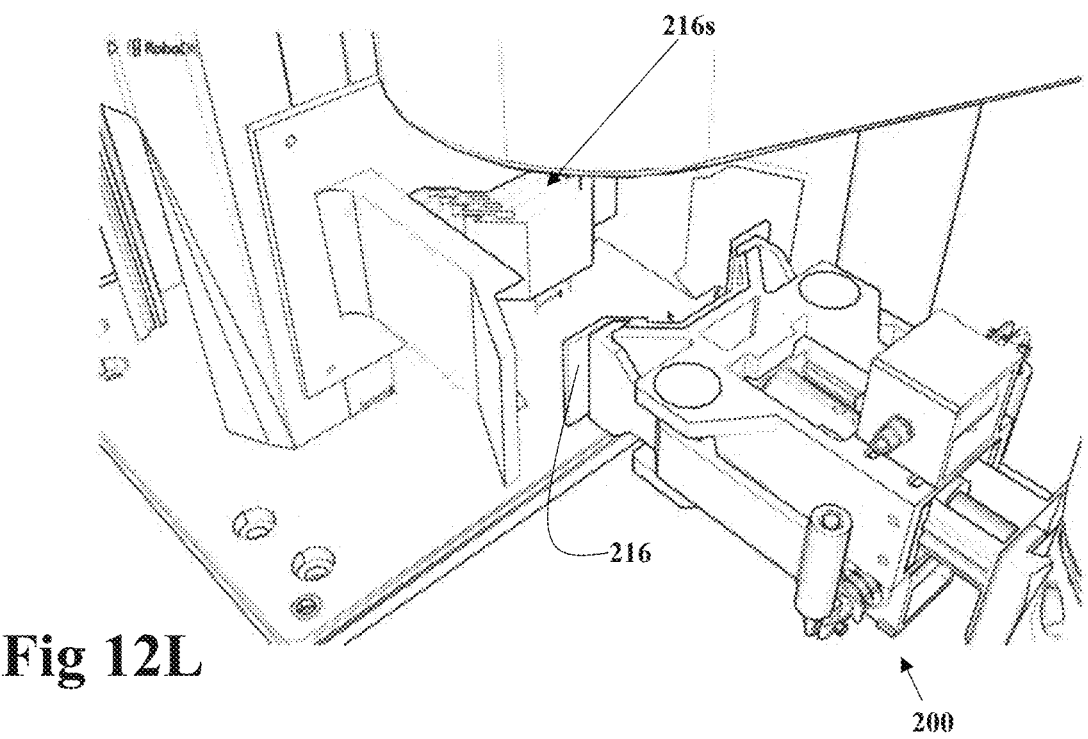
Figure 12M:
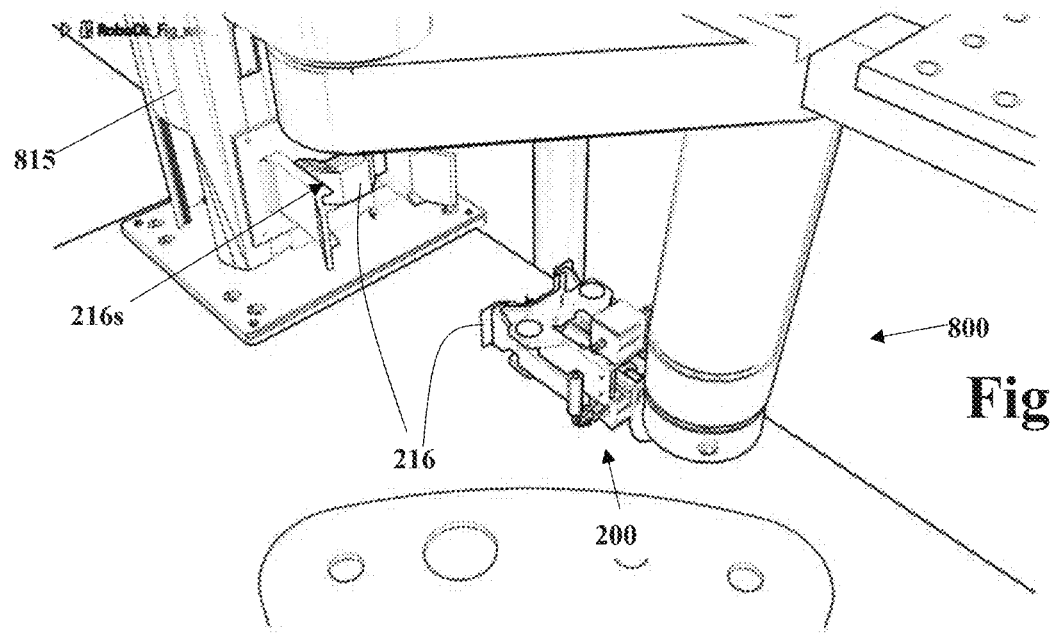
Figure 12N:
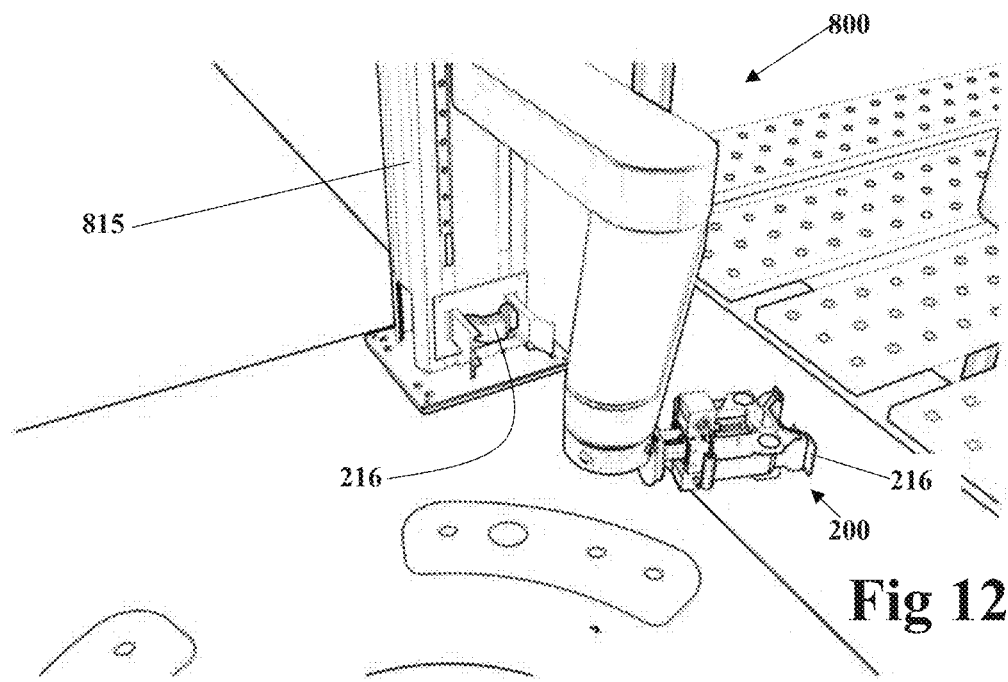
Figure 12O:
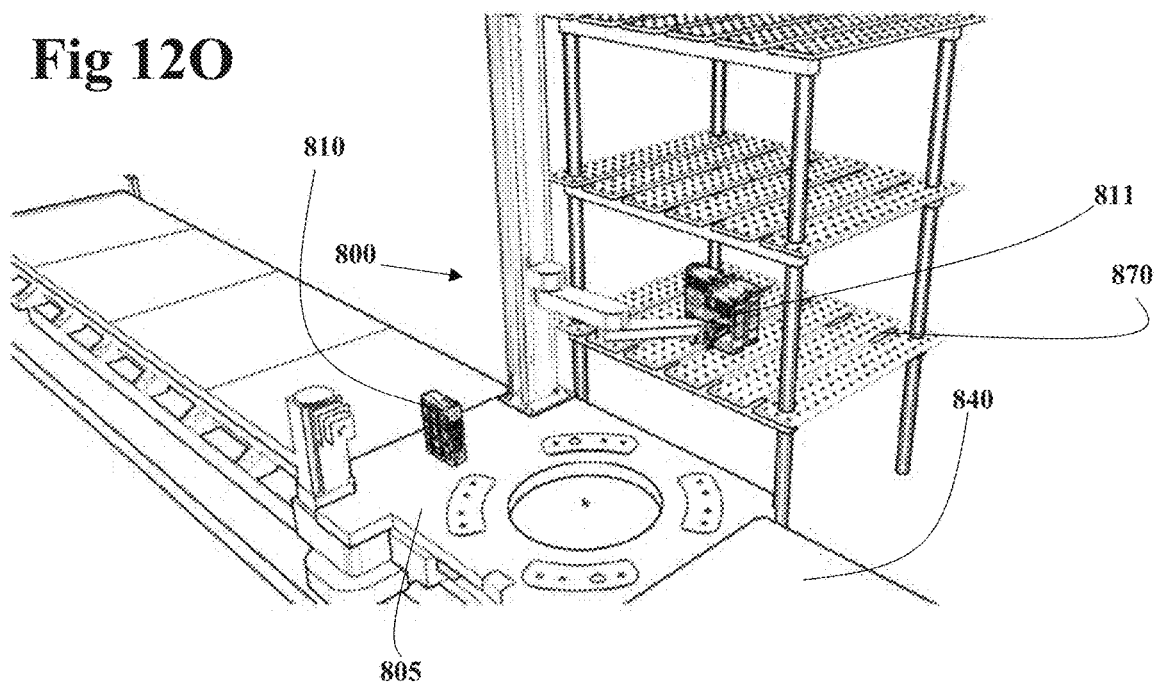
Figure 12P:
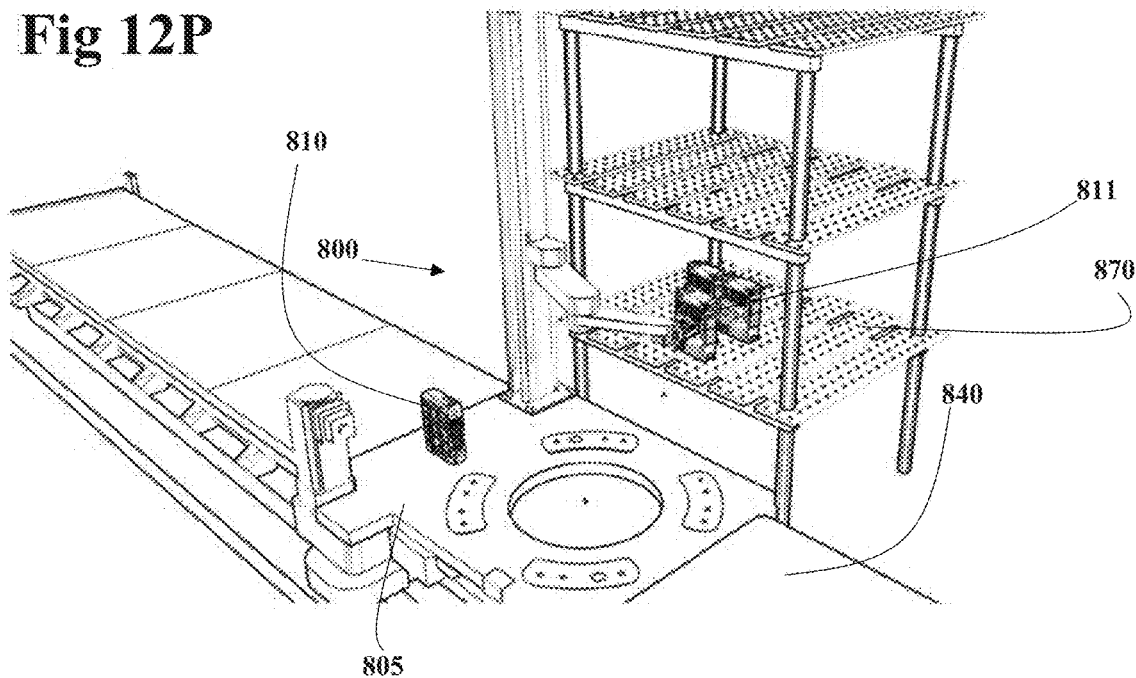
Figure 12Q:
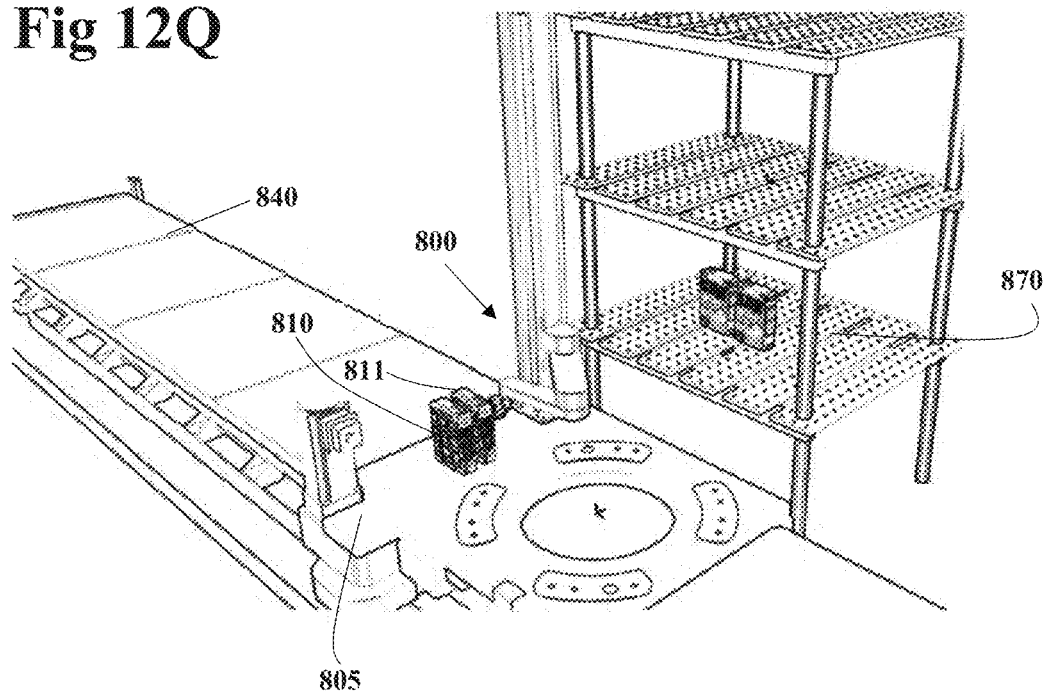
Figure 12R:
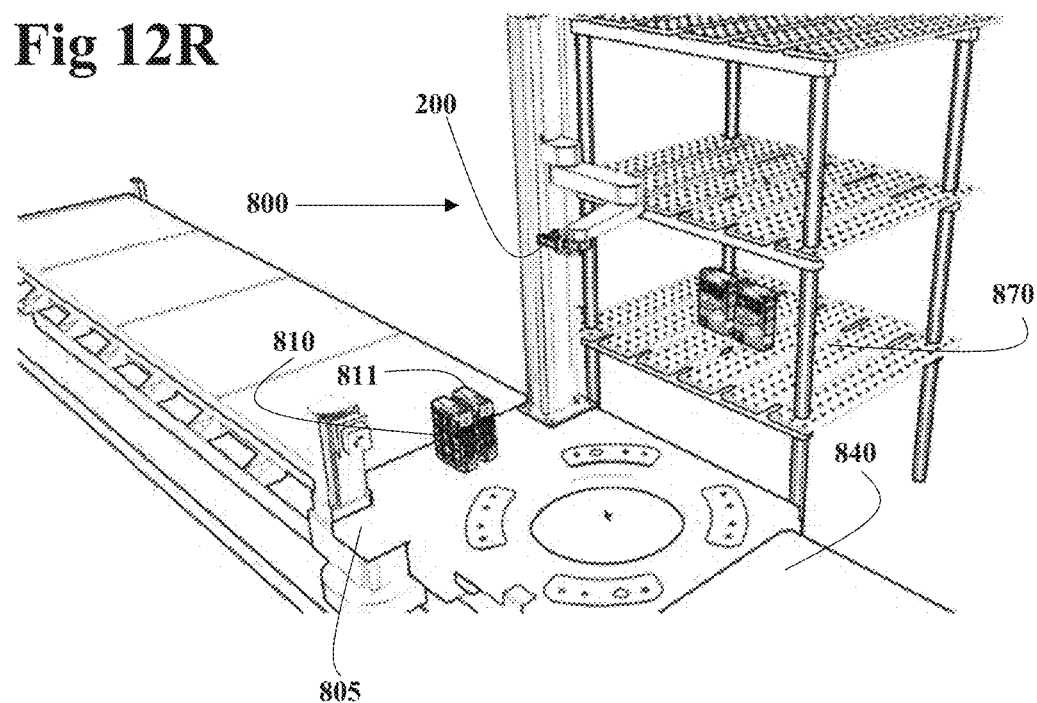
Figure 12S:
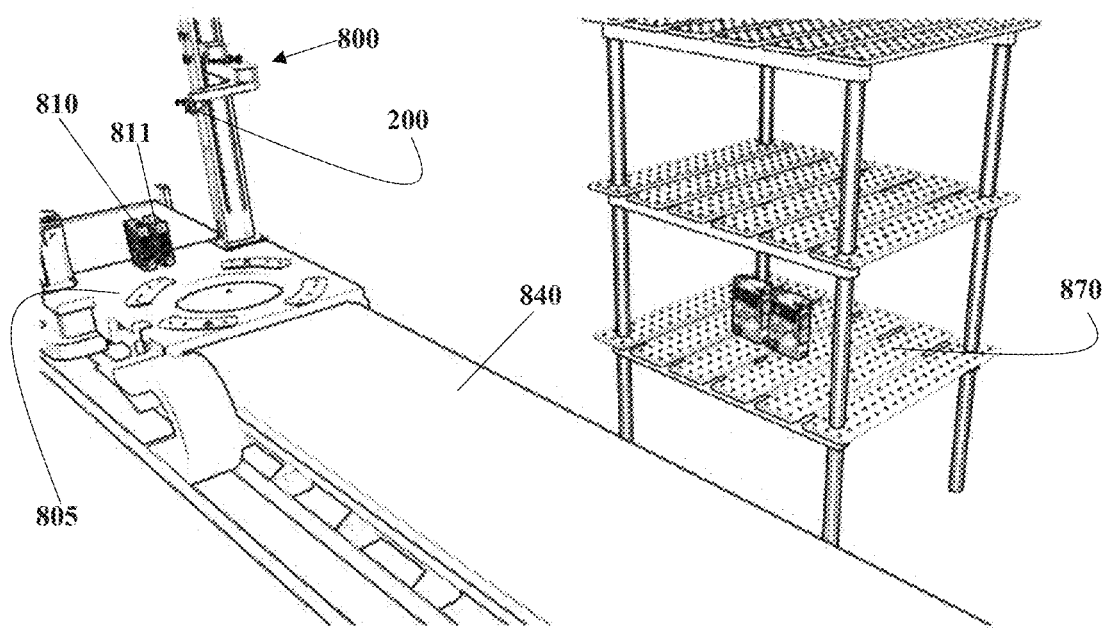

FIGS. 12A-12S show an embodiment of a robot packaging scenario with a mobile conveyor base 805 moveable on a conveyor belt 840. A robotic arm 800 is placed on a post 810 fixed on the conveyor base 805. The robotic arm 800 is vertically displaceable on said post 815. A gripper finger 200 is attached to the distal end of the arm 800. The arm 800 comprises three segments (bars), each two adjacent segments are attached by a revolute joint.

FIGS. 12A-12C show the robot traveling towards an object 810 to be picked up, in the case shown the object 810 is a food package box on a shelf 870. FIG. 12D Shows the distal arm finger 200 (having a sticker 216 attached thereto as explained herein) engaging the object 810. FIGS. 12E-12G show the object 810 being maneuvered from shelf 870 to base 805. In FIG. 12H the object 810 is shown released from the arm 800 (with the respective sticker kept on the object 810).

FIGS. 12I-12N show arm 800 obtaining another sticker 216 from a sticker stack 216s. FIG. 12I shows the sticker stack 216s in a type of magazine formation attached to the post 815. FIG. 12J shows the finger 200 approaching stack 216s. FIG. 12K shows the finger 200 engaging stack 216s. FIG. 12L shows the finger 200 retracting with a sticker element 216 connected thereto, from stack 216s. FIGS. 12M-12N show the arm 800 moving to the next object.

FIG. 12O shows the distal arm finger 200 (with sticker 216 attached thereto) engaging the next object 811. FIGS. 12P-12Q show the next object 811 being maneuvered from shelf 870 to base 805. In FIG. 12R the object 811 is shown released from the arm 800 (with the respective sticker kept on the object 811). FIG. 12S shows the base 805 retracting with object 810 and 811 thereon.

Figure 13A:
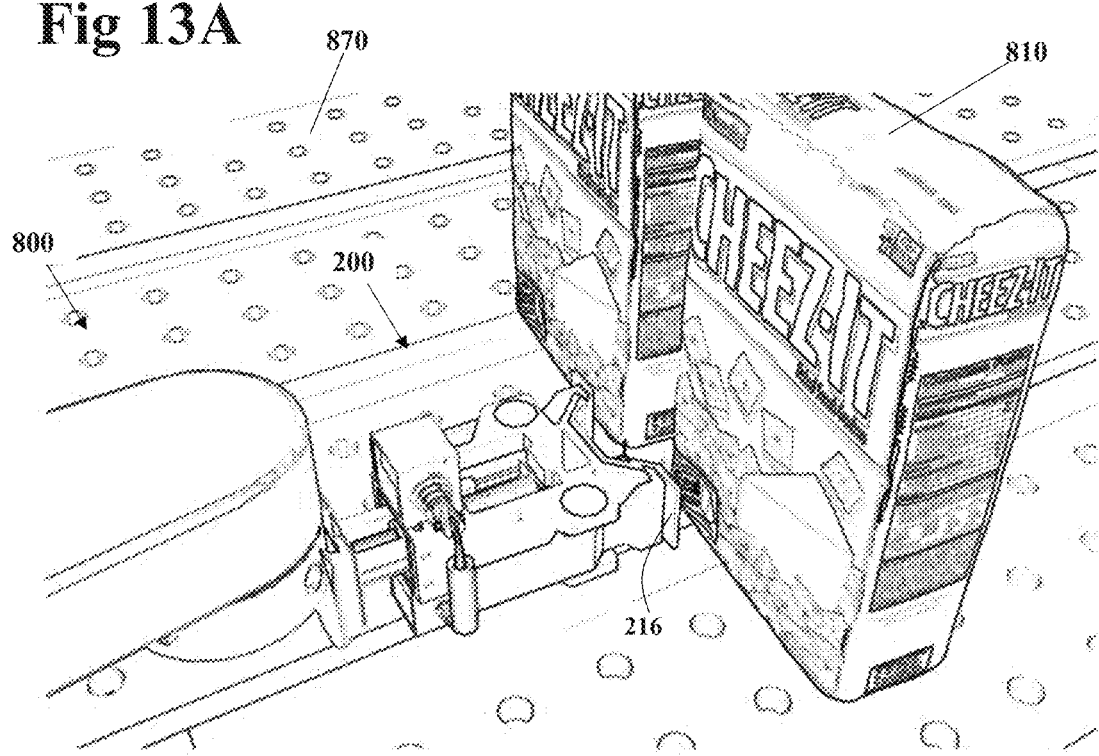
FIGS. 13A-13D show a close up of a portion of the robot packaging scenario of FIGS. 12A-12S according to an embodiment of the present invention.
Figure 13B:
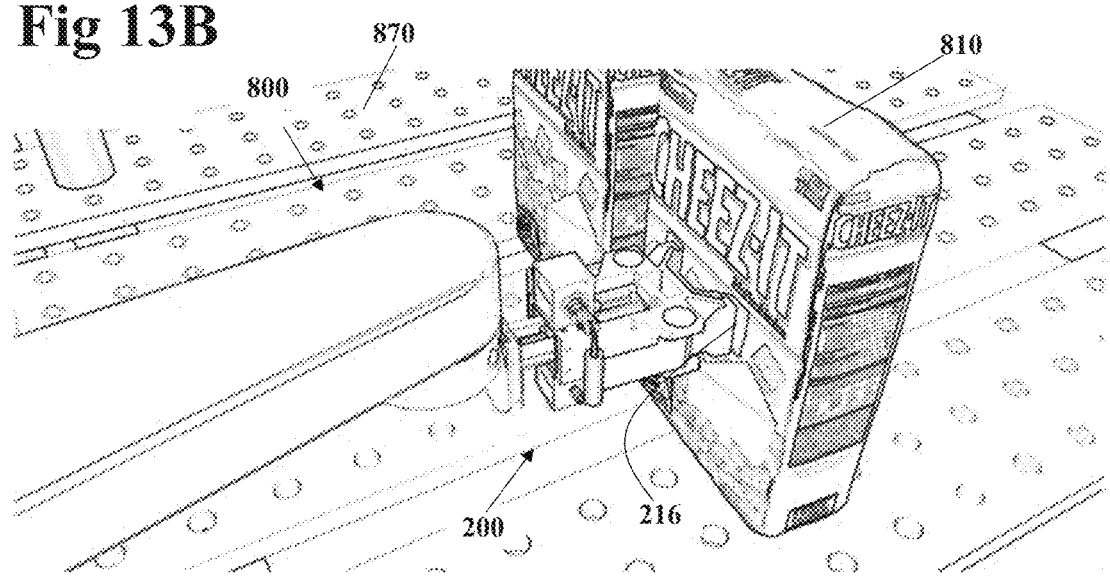
Figure 13C:
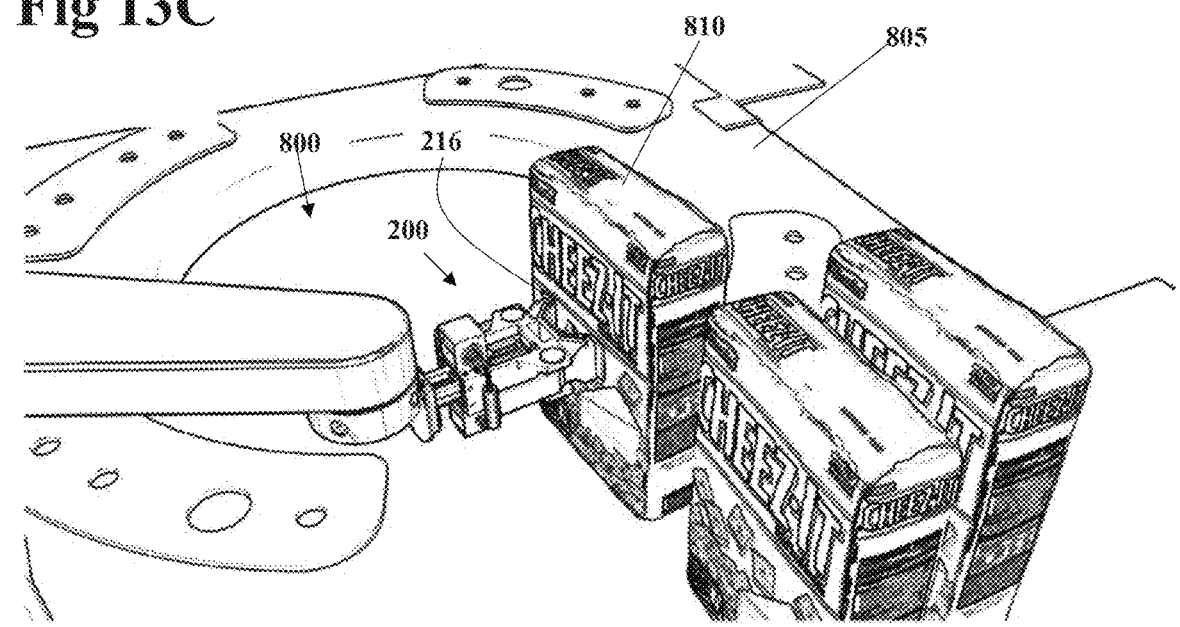
Figure 13D:
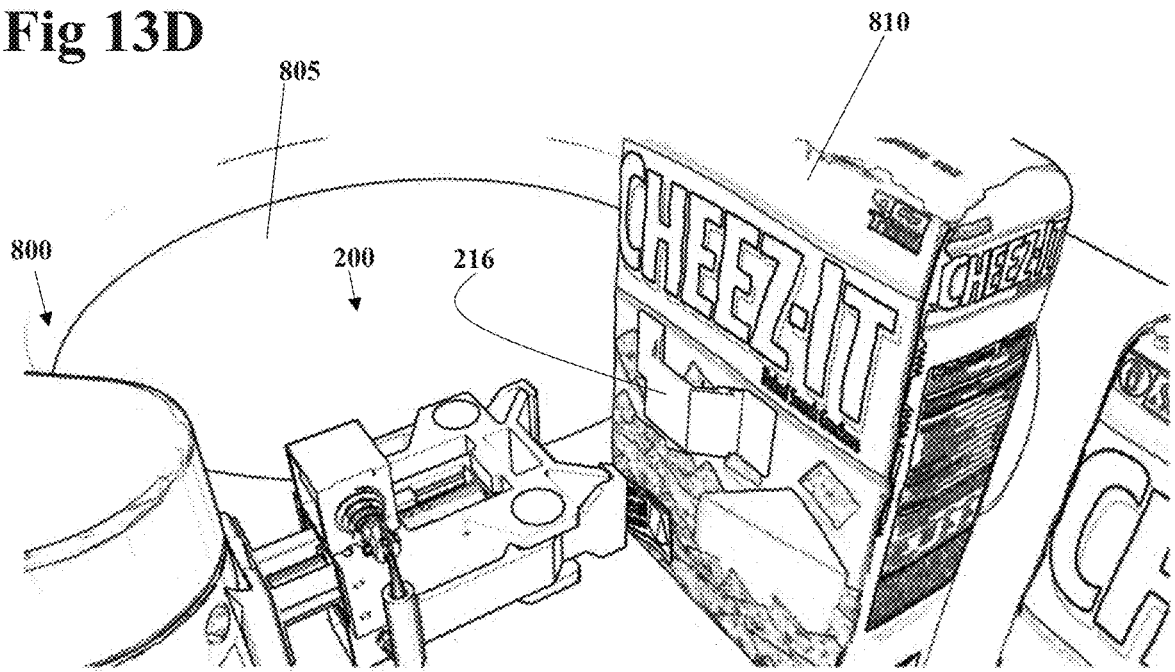

FIGS. 13A-13D show a close up of finger 200 of arm 800 (along with sticker 216 attached thereon) maneuvering an object—food package box 810—from shelf 870 to base 805. FIG. 13A shows the finger 200 approaching object 810. FIG. 13B shows the finger 200 engaging object 810. FIG. 13C shows the object 810 being placed on base 805. FIG. 13D shows finger 200 retracting from object 810 with sticker 216 remaining on object 810.

The length of the object engaging portion 14 (of sticker 16) is usually between 40 and 300 mm. Its width is usually between 20 and 150 mm. Its thickness is usually between 10 and 100 mm.

The length of tab 12 is usually between 20 and 50 mm. Its width is usually between 20 and 50 mm. Its thickness is usually between 0.5 and 2 mm. The diameter of aperture 12a is usually between 3 and 20 mm.

The length of hook 17 is usually between 50 and 100 mm. The thickness/diameter of the hook arm 17a is usually between 2 and 5 mm. The diameter of the curve of the curved portion 17b is usually between 10 and 30 mm.

The length of arc 11 is usually between 100 and 300 mm. Its width is usually between 20 and 50 mm. Its thickness is usually between 0.5 and 2 mm.

The length of gripper finger 100 is usually between 30 and 50 mm. Its width is usually between 50 and 80 mm. Its thickness is usually between 15 and 40 mm.

The diameter/thickness of the internal channel 120 is usually between 2 and 5 mm. The diameter of the circle formed by circular portion 117c is usually between 10 and 30 mm. The thickness of slit 118 is usually between 0.6 and 3 mm.

The diameter of rotating element 119 is usually between 5 and 15 mm. Its thickness is usually between 2 and 5 mm.

The total length of gripper finger 200 is usually between 80 and 180 mm. Its total width is usually between 60 and 100 mm. Its total thickness is usually between 30 and 70 mm.

The general length of the tiltable side arm 230 is usually between 60 and 150 mm. Its width is usually between 40 and 100 mm. Its thickness is usually between 2 and 5 mm.

The general length of sticker element 216 is usually between 60 and 100 mm. Its width is usually between 30 and 70 mm. Its height is usually between 10 and 30 mm. Its thickness is usually between 1 and 3 mm. The length of the notches 212n is usually between 0.4 and 3 mm.

The total length of gripper finger 400 is usually between 150 and 400 mm. Its total width is usually between 70 and 160 mm. Its total thickness is usually between 40 and 80 mm.

The radius of sticker reel 416 is usually between 50 and 150 mm. Its thickness is usually between 30 and 60 mm.

The length and width of square sticker tape dispenser 415 is usually between 70 and 120 mm. Its thickness is usually between 30 and 60 mm. The length of the central bulging element 421 is usually between 30 and 90 mm. Its width is usually between 20 and 50 mm. Its thickness is usually between 3 and 20 mm. the height of the protruding hooks 417 is usually between 1 and 4 mm.

The length of blade 422 is usually between 40 and 70 mm. Its thickness is usually between 1 and 3 mm. The thickness of slit 425 is usually between 2 and 5 mm.

The diameter of the opening of the distal opening of gripper finger 500 is usually between 15 and 50 mm.

The diameter of sticker 20 is usually between 18 and 65 mm. Its thickness is usually between 0.5 and 3 mm.

The length of the object adhesive engaging member 620 is usually between 50 and 90 mm. Its width/thickness/diameter is usually between 15 and 40 mm.

The length of arm 640 is usually between 180 and 240 mm. Its width is usually between 10 and 25 mm. Its thickness is usually between 10 and 25 mm.

The applicator 650 may have the shape of a cuboid usually with a length between 50 and 110 mm, a width between 40 and 100 mm, and a thickness between 30 and 60 mm.

The stickers and tabs (e.g. sticker element 16) preferably comprise material selected from the group consisting of:
  plastics, e.g. polyethylene terephthalate, high-density polyethylene, polyvinyl chloride, low-density polyethylene, polypropylene, polycarbonate, styrene, polylactide, acrylic, acrylonitrile butadiene, styrene, fiberglass, nylon;
  thin metallic sheets or polymers laced with metallic threads (for magnetic, mechanical and conductive properties).
  Polymers (that can also be laced with carbon fibers to enhance their mechanical, magnetic and conductive properties);
  Fabrics (e.g. for sticker substrate, including carbon fiber fabrics);
  Paper; and
  wood products.

The adhesion material detailed herein with reference to the direct adhesion embodiment, may also be used for the adhesion material of the stickers. For example, the adhesion material of the stickers may be VHB™ by 3M.

Hooks 17 and 117 preferably comprise material selected from the group consisting of: stainless steel alloys, aluminum alloys.

Arc 11 preferably comprises material selected from the group consisting of: textiles, plastics and metallic wire.

Rigid base portion 110b preferably comprises material selected from the group consisting of: plastics (e.g. ABS, PLA), aluminum alloys, brass and stainless steel alloys.

Flexible portion 110a preferably comprises material selected from the group consisting of: porous plastics (e.g. polyurethane foam) and organic porous materials (e.g. sponge).

Rotating element 119 preferably comprises material selected from the group consisting of:
  plastics (e.g. ABS, PLA), aluminum alloys, brass and stainless steel alloys.

Main body portion 210, arms 230, head portion 250 and connecting rod 260 preferably comprise material selected from the group consisting of:
  plastics (e.g. ABS, PLA), stainless steel alloys and aluminum alloys.

Main body portion 410, sticker reel 416, sticker tape dispenser 415, central bulging element 421 and protruding hooks 417 preferably comprise material selected from the group consisting of:
  plastics (e.g. ABS, PLA), stainless steel alloys and aluminum alloys.

The tape 416t on reel 416 preferably comprise materials such as plastics, layered with pressure sensitive adhesives.

Blade 422 preferably comprises material selected from the group consisting of: stainless steel alloys and plain carbon steel.

The object adhesive engaging member 620, arm 640 and applicator 650 preferably comprise material selected from the group consisting of: aluminum alloys, steel alloys and plastics (e.g. ABS, PLA).

The sticker elements (possibly including the links) as explained herein (e.g. 16, 116, 216, the sticker elements described in FIG. 2E) form another aspect of the present invention.

All of the gripper finger motors (and gripper finger pump) as explained herein are coupled to a power source (e.g. a battery, an electric power source that the gripper system is coupled to). The motors and pump are also coupled to a processor (e.g. a CPU) which they receive operational commands from. Typically, the processor which activates the entire gripping system (e.g. including the gripper system maneuvering arms) and the power source that powers the entire gripping system (e.g. including the gripper system maneuvering arms) also activates and powers the motors.

According to an embodiment of the present invention, barcodes may be printed on, or engraved in the stickers as explained herein, to provide information on the sticker type, or the item the sticker is adhered to, i.e. used to identify the item that it has been applied to. Similarly, RFID tags can be adhered to the stickers, or directly integrated in them, for identification purposes. Aesthetically, images and/or words can be printed on stickers, such as a company logo, product information, or even simple phrases such as "Packaged by a robot".

Virtually any combination of these materials and the aforementioned adhesive can produce a viable sticker.

Other embodiments may relate to a semi-rigid sticker used to grasp an object, so that the geometry of the sticker is used to connect with a gripping device designed to utilize the sticker geometry.

The present invention is applicable to all manners of object manipulation (such as lifting, pulling and pushing), tool operation, bin-picking and packing operations, logistic sorting and redistribution of warehouse orders, mail packages sorting and packing, aerospace manipulation, zero-gravity object retrieval and space manipulation, biological tissue manipulation and medical procedures, agriculture, and industrial assembly lines.

The present invention adhesive grasping system may use a program that sees an object, and determines the best points to adhere to, according to pre-written algorithms, e.g. relating to desired grasp points on the object, object weight, shape, surface properties etc.

The present invention relates to a method for adhesive manipulation. The present invention method comprises applying an adhesive item (a sticker element, adhesive material) to an object to be manipulated, securing/attaching a manipulating member to the adhesive item and manipulating the object to a required location. The manipulation is carried out by a gripper finger connected to an arm of a gripper system. The present invention method (with all its embodiments) is also partially explained herein, in conjunction with the gripper fingers device/system description.

Forces are applied to the sticker elements (or adhesive material) by the manipulating members, resulting in wrenches applied to the object via the adhesive contacts (e.g. sticker elements or adhesive material), manipulating the object.

The present invention relates to a method for grasping and displacing an object comprising:
  securing a sticker element to a gripper finger;
  maneuvering said gripper finger such that said sticker element engages the object to be displaced thereby adhering said sticker element to said object;
  maneuvering said sticker element and thereby said object to a required location;
  releasing said sticker element and thereby said object from said gripper finger.

According to one embodiment of the present invention method, securing the sticker element to the gripper finger comprises inserting a hook (e.g. hooks 17, 117) into an aperture (e.g. 12a, 112a) of a tab that extends proximally from an object engaging portion of said sticker element; and
  releasing said sticker element comprises removing the hook from said aperture.

Preferably, the hook is a rotatable hook (e.g. 117) having a circular portion with a gap (e.g. 121);
  wherein securing and releasing the sticker element comprises rotating said rotatable hook. The securing comprises inserting the hook into the aperture, and the releasing comprises removing the hook from the aperture, e.g. having the gap (e.g. 121) at the aperture location.

According to one embodiment of the present invention method, securing the sticker element to the gripper finger comprises moving two hooks (e.g. hooks 217, 317) towards each other and inserting them into corresponding side notches (e.g. 212n) of a proximally projecting connecting bridge portion, of the sticker element (e.g. 216), that connects two sticker object engaging portions that have distal adhesive sides; and
  wherein releasing said sticker element comprises moving said two hooks away from each other.

According to one embodiment of the present invention method, securing the sticker element to the gripper finger comprises:
  A) stretching a sticker tape (e.g. 416t) from a sticker reel (e.g. 416) and thrusting a plurality of protruding hook elements (e.g. 417) into a given portion of the stretched tape (e.g. at position 420b in FIG. 7);
  B) moving said given portion to a distal position (e.g. position 420c in FIG. 7) on the gripper finger; and
  wherein releasing said sticker element comprises cutting (e.g. by blade 422) said given portion (e.g. now at position 420c in FIG. 7) from said sticker tape. Additional aspects of this embodiment are explained in conjunction with the related gripper finger device description.

According to one embodiment of the present invention method, securing the sticker element to the gripper finger comprises:
  engaging the gripper finger to the proximal side of an object engaging portion of the sticker element (e.g. sticker 20);
  applying negative pressure from said gripper finger (e.g. the distal opening of finger 500, coupled to the internal negative pressure system) to said proximal side of said object engaging portion; and
  wherein releasing said sticker element comprises terminating said negative pressure.

According to one embodiment of the present invention method, securing the sticker element to the gripper finger comprises:
  engaging the gripper finger to the proximal side of an object engaging portion of the sticker element wherein said proximal side comprises a portion configured to be magnetized (e.g. a metal/magnet attached to the proximal side, the proximal side being of metal/magnetic material or comprising metal/magnetic material);
  applying a magnetic force from said gripper finger (e.g. from a distal electromagnetic element coupled to a magnetic application system) to said proximal side of said object engaging portion; and
  wherein releasing said sticker element comprises terminating said magnetic force.

The present invention relates to a method for grasping and displacing one or more objects comprising:
  securing a link (link 11), connecting two or more sticker elements, to a gripper finger;
  maneuvering said link such that said two or more sticker elements engage the one or more objects to be displaced thereby adhering said two or more sticker elements to said one or more objects;
  maneuvering said link and thereby said one or more objects to a required location;
  releasing said link and thereby said two or more sticker elements and said one or more objects, from said gripper finger. The two or more sticker elements may all be adhered to a single object at different locations, or alternatively, each one of the two or more sticker elements may be adhered to a different corresponding object. Of course, a first group of the two or more sticker elements may be adhered to a first object and a second group of the two or more sticker elements may be adhered to a second object.

The present invention relates to a method for grasping and displacing an object comprising:
  injecting adhesive material on an object;
  engaging a finger gripper adhesive engaging member (e.g. 620) to the injected adhesive material;
  securing the adhesive engaging member to the object by curing the adhesive material;
  maneuvering said object to a required location;
  releasing said object from said gripper finger by either:
    a) removing the adhesive from the gripper finger; or
    b) cutting the adhesive off the gripper finger.

The present invention also relates to a method for applying a sticker element to an object (e.g. a sticker dispenser mechanism) comprising:
  securing a sticker element to a gripper finger;
  maneuvering said gripper finger (functioning as an applicator) such that said sticker element engages the object thereby adhering said sticker element to said object;

releasing said sticker element from said gripper finger. This method may comprise the securing, maneuvering and adhering of the stickers to the object, carried out by the gripper fingers (according to all of the embodiments as explained in detail herein).

Preferably, adhering the sticker element to the object is carried out by applying force from the gripper finger towards the object via the sticker element.

Preferably, the finger gripper comprises a distal flexible portion (e.g. 10*a*, 110*a*);
wherein securing the sticker element to the gripper finger comprises attaching said sticker element to the distal flexible portion; and
wherein when applying force from the gripper finger towards the object, the distal flexible portion conforms to the shape of the object (e.g. as shown in FIG. 1B).

The present invention sticker dispenser mechanism may comprise a "magazine" type replenishing device for the applicator, such that a new sticker is mechanically delivered to the applicator upon request; or a "magazine" type replenishing device for the applicator, such that a new sticker is automatically delivered to the applicator upon release of the previous sticker (similar to a tissue paper box).

Alternatively, the stickers may be collected from a predetermined spot (e.g. stack 216*s*). The collection of stickers may be carried out by picking up a sticker from a stack or line of stickers.

Other embodiments may include application of a sticker element and manipulation of the sticker element by using a rigid manipulator and applicator, e.g. a gripper system grasping arms that grasp a sticker element tab that extends proximally from the sticker element object engaging portion (for example sticker elements 16, 116, 21, 22, 24, 26). Links (e.g. link 11, linked unit 16", linked unit 27) may be also grasped by the rigid manipulator and applicator. After the manipulation is complete, the manipulating members release the object, by releasing the tabs or links physically.

The preparation of the sticker element for application (and possibly for maneuvering) may be mechanical, i.e. manipulating a sticker towards the applicator.

The sticker or multiple stickers may be adhered to the object at the selected points by an applicator or a multitude of applicators. The applicators may prepare the object's surface then apply some "pushing" force to the object while applying the stickers.

It is advantageous if the maneuvering is carried out in tandem with the adhesive application thereof. This saves time to manipulate a gripper towards the applied adhesive items (e.g. stickers or sticker links) and establishing a secure grasp.

While some of the embodiments of the invention have been described by way of illustration, it will be apparent that the invention can be carried into practice with many modifications, variations and adaptations, and with the use of numerous equivalents or alternative solutions that are within the scope of a person skilled in the art, without departing from the spirit of the invention, or the scope of the claims.

The invention claimed is:

1. A robotic method for gripping, elevating, and displacing an object comprising:
    securing a sticker element to a gripper finger;
    maneuvering said gripper finger such that said sticker element engages the object to be displaced thereby adhering said sticker element to said object;
    maneuvering said sticker element and thereby said object to a required location; and
    releasing said sticker element and thereby said object from said gripper finger,
    wherein said engagement of the sticker element to the object is performed utilizing a constantly sticky surface at the sticker element, where the stickiness of the sticker's surface is independent of any force applied to it.

2. The method according to claim 1, wherein securing the sticker element to the gripper finger comprises moving two hooks towards each other and inserting them into corresponding side notches of a proximally projecting connecting bridge portion, of the sticker element, that connects two sticker object engaging portions that have distal adhesive sides; and
    wherein releasing said sticker element comprises moving said two hooks away from each other.

3. The method according to claim 1, wherein securing the sticker element to the gripper finger comprises:
    A) stretching a sticker tape from a sticker reel and thrusting a plurality of protruding hook elements into a given portion of the stretched tape;
    B) moving said given portion to a distal position on the gripper finger; and
    wherein releasing said sticker element comprises cutting said given portion from said sticker tape.

4. The method according to claim 1, wherein securing the sticker element to the gripper finger comprises:
    engaging the gripper finger to the proximal side of an object engaging portion of the sticker element;
    applying negative pressure from said gripper finger to said proximal side of said object engaging portion; and
    wherein releasing said sticker element comprises terminating said negative pressure.

5. The method according to claim 1, wherein securing the sticker element to the gripper finger comprises:
    engaging the gripper finger to the proximal side of an object engaging portion of the sticker element wherein said proximal side comprises a portion configured to be magnetized;
    applying a magnetic force from said gripper finger to said proximal side of said object engaging portion; and
    wherein releasing said sticker element comprises terminating said magnetic force.

6. A method for grasping and displacing one or more objects comprising:
    securing a link, connecting two or more sticker elements, to a gripper finger;
    maneuvering said link such that said two or more sticker elements engage the one or more objects to be displaced thereby adhering said two or more sticker elements to said one or more objects;
    maneuvering said link and thereby said one or more objects to a required location;
    releasing said link and thereby said two or more sticker elements and said one or more objects, from said gripper finger.

7. A method for grasping and displacing an object comprising:
    injecting adhesive material on an object;
    engaging a finger gripper adhesive-engaging-member to the injected adhesive material;
    securing the adhesive-engaging-member to the object by curing the adhesive material;
    maneuvering said adhesive object to a required location; and
    releasing said object from said gripper finger by either:
    a) removing the adhesive from the gripper finger;
    b) cutting the adhesive off the gripper finger; or c) applying a positive air pressure from the finger gripper adhesive-engaging-member to the adhesive material.

8. A method for applying a sticker element to an object comprising:
   securing a sticker element to a gripper finger;
   maneuvering said gripper finger such that said sticker element engages the object thereby adhering said sticker element to said object; and
   releasing said sticker element from said gripper finger;
   wherein adhering the sticker element to the object is carried out by applying force from the gripper finger towards the object via the sticker element;
   wherein the finger gripper comprises a distal flexible portion;
   wherein securing the sticker element to the gripper finger comprises attaching said sticker element to the distal flexible portion; and
   wherein when applying force from the gripper finger towards the object, the distal flexible portion conforms to the shape of the object.

9. A robotic method for gripping, elevating, and displacing an object comprising:
   providing a gripper configured to connect to a robot's arm at a first of its sides, and to adhesively attach to the object directly or indirectly at a second of its sides opposite to the first side; and
   adhesively grasping the object by one of:
   a. utilizing a sticker element that is connectable to the gripper and adhesively attachable to the object utilizing a constantly sticky surface at the sticker element, where said sticky characteristic of the surface is independent of any force applied to it, and where said gripper is configured to electrically release the sticker element while the sticker element is still being attached to the gripped object, following moving of the object to said another location;
   b. utilizing a sticker reel located within the gripper, that provides a sticker adhesively attachable to the object utilizing a constantly sticky surface at the sticker element, where said sticky characteristic of the surface is independent of any force applied to it; or
   c. pouring an adhesive material on the object thereby enabling the gripper to adhesively attach to the object through the adhesive material; and
   utilizing the robot, elevating the object attached to the gripper, maneuvering it to another location, and releasing the object.

* * * * *